(12) United States Patent
Kato et al.

(10) Patent No.: US 7,336,002 B2
(45) Date of Patent: Feb. 26, 2008

(54) VEHICLE POWER SUPPLY SYSTEM

(75) Inventors: Akira Kato, Anjo (JP); Katsunori Tanaka, Haguri-gun (JP); Masaru Kamiya, Toyoake (JP); Takashi Senda, Niwa-gun (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 10/546,036

(22) PCT Filed: Feb. 17, 2004

(86) PCT No.: PCT/JP2004/001755

§ 371 (c)(1),
(2), (4) Date: Aug. 17, 2005

(87) PCT Pub. No.: WO2004/071814

PCT Pub. Date: Aug. 26, 2004

(65) Prior Publication Data

US 2006/0097577 A1 May 11, 2006

(30) Foreign Application Priority Data

| Feb. 17, 2003 | (JP) | ............................. 2003-037634 |
| Apr. 9, 2003 | (JP) | ............................. 2003-105137 |
| Apr. 9, 2003 | (JP) | ............................. 2003-105194 |
| Jan. 20, 2004 | (JP) | ............................. 2004-011599 |

(51) Int. Cl.
*H02G 3/02* (2006.01)
*B60L 11/12* (2006.01)

(52) U.S. Cl. ....................... 307/10.6; 701/22

(58) Field of Classification Search ............... 307/10.6; 701/22

See application file for complete search history.

(56) References Cited

U.S. PATENT DOCUMENTS

| 5,418,401 | A | 5/1995 | Kaneyuki |
| 5,675,189 | A | 10/1997 | Anma et al. ................. 307/9.1 |
| 5,796,175 | A | 8/1998 | Itoh et al. .................. 307/10.1 |
| 5,994,789 | A | 11/1999 | Ochiai ....................... 307/10.1 |
| 6,229,279 | B1 | 5/2001 | Dierker ...................... 320/104 |
| 6,232,674 | B1 | 5/2001 | Frey et al. ................. 307/10.1 |
| 6,275,001 | B1 | 8/2001 | Dierker ..................... 320/103 |

(Continued)

FOREIGN PATENT DOCUMENTS

DE     199 03 427 A1    8/2000

(Continued)

*Primary Examiner*—Michael Sherry
*Assistant Examiner*—Hal I Kaplan
(74) *Attorney, Agent, or Firm*—Oliff & Berridge, PLC

(57) ABSTRACT

A main power source is, for example, an ordinary Pb battery. At the time of starting an engine, the main power source supplies power to a starter. The main power source is given a higher priority than an auxiliary power source to supply power to ordinary loads. The auxiliary power source is a high performance battery (e.g., Li ion battery), which has superior charge acceptance capability and better state detectability over the main power source. The auxiliary power source stores regenerative power, which is generated by a generator at the time of deceleration of a vehicle, and is used as a redundant power source for the main power source. The main power source and the auxiliary power source are connected to each other through a supply circuit, which has a DC/DC converter, and a second supply circuit, which has a switch.

72 Claims, 29 Drawing Sheets

U.S. PATENT DOCUMENTS

| | | | |
|---|---|---|---|
| 6,674,362 B2 | 1/2004 | Yoshioka et al. | 340/506 |
| 7,053,500 B2 * | 5/2006 | Furukawa et al. | 307/10.6 |
| 2002/0075165 A1 | 6/2002 | Yoshioka et al. | 340/901 |
| 2002/0158513 A1 | 10/2002 | Amano et al. | 307/10.6 |

FOREIGN PATENT DOCUMENTS

| | | |
|---|---|---|
| EP | 1 013 506 A2 | 6/2000 |
| JP | U 2-10754 | 1/1990 |
| JP | A 3-204360 | 9/1991 |
| JP | A 05-058231 | 3/1993 |
| JP | A 5-202834 | 8/1993 |
| JP | A 6-284509 | 10/1994 |
| JP | A 06-296332 | 10/1994 |
| JP | A 6-296332 | 10/1994 |
| JP | A 09-046921 | 2/1997 |
| JP | A 9-247856 | 9/1997 |
| JP | A 10-248263 | 9/1998 |
| JP | A-11-082259 | 3/1999 |
| JP | A 11-324873 | 11/1999 |
| JP | A 2000-312444 | 11/2000 |
| JP | A 2001-69683 | 3/2001 |
| JP | A 2001-503703 | 3/2001 |
| JP | A 2001-128305 | 5/2001 |
| JP | A 2001-186687 | 7/2001 |
| JP | A 2001-275201 | 10/2001 |
| JP | A 2002-118977 | 4/2002 |
| JP | A 2002-137698 | 5/2002 |
| JP | A 2002-325377 | 11/2002 |
| WO | WO 02/066293 A1 | 8/2002 |

* cited by examiner

VEHICLE POWER SUPPLY SYSTEM

BACKGROUND

The invention relates to a vehicle power supply system having two batteries (a main power source and an auxiliary power source).

A previously proposed vehicle power supply system having two batteries (2-battery system) is disclosed in, for example, JP-A-6-296332, JP-A-2001-186687 or U.S. Pat. No. 6,275,001.

The system set forth in JP-A-6-296332 includes a main power storage means and a backup power storage means, which are connected to each other through a DC/DC converter. Switching of the DC/DC converter is controlled in such a manner that regenerative energy (electric power), which is obtained during deceleration of the vehicle, is stored in the backup power storage means, and the stored electric power is supplied from the backup power storage means to the electrical loads of the vehicle at time (e.g., time of accelerating the vehicle, time of steady driving of the vehicle or time of idling the engine) other than the time of decelerating the vehicle at a higher priority over the main power storage means.

The system set forth in JP-A-2001-186687 has a power supply network battery and a starter battery. The power supply network battery is connected to a generator, and the starter battery is connected to a starter. These batteries are connected to each other through a DC/DC converter and a switch. Here, the switch is provided in parallel with the DC/DC converter.

The system set forth in U.S. Pat. No. 6,275,001 has a first battery, a second battery and a generator. The first battery supplies electric power to a starter at the time of starting the engine, and the second battery supplies electric power to electrical loads mounted on the vehicle. The generator charges the first battery and the second battery. With this construction, it is possible to supply power to the electrical loads from the second battery while power is supplied from the first battery to the starter to start the engine. Accordingly, there is no momentary stop of electrical loads (e.g., a navigation system), which would be otherwise caused by a voltage drop of the first battery due to flow of a large current (surge current) in the initial stage of supplying electric power to the starter, and the voltage to the electrical loads can be guaranteed by the second battery.

However, in the system set forth in JP-A-6-296332, there are the following disadvantages. Firstly, regenerative energy generated by an alternator during deceleration of the vehicle is stored in the backup power storage means through the DC/DC converter. Thus, due to the presence of the DC/DC converter between the alternator and the backup power storage means, the recovery efficiency is decreased to cause deterioration of fuel consumption. Also, since power stored in the backup power storage means also goes through the DC/DC converter at the time of supplying electric power to the electrical loads of the vehicle, the power supply efficiency is decreased. Furthermore, the operating voltage of the DC/DC converter is applied from the main power storage means. Thus, if the main power storage means becomes inoperable (e.g., at the time of battery death), energy recovery during deceleration becomes impossible, and also electric power cannot be supplied from the backup power storage means to the electrical loads. Thus, the reliability of the system is largely decreased.

In the system of JP-A-2001-186687, there are the following disadvantages. Firstly, since power generated by the generator is supplied to the starter battery through the DC/DC converter, energy efficiency is poor. Also, at the time of performing high power generation (e.g., regenerative power generation during vehicle deceleration) through use of the generator, large voltage fluctuations act on the power supply network battery and the electrical loads. Thus, troubles, such as flickering of lights and wiper speed fluctuations, occur. A safety measure for counteracting with a failure of one of the power supply network battery and the starter battery is not implemented for important devices (e.g., safety devices, such as an electric braking device, electric power steering device), which are among the electrical loads mounted on the vehicle and need stable electric power supply. For example, when the power supply network battery has shorted to the ground side, it is not possible to isolate the power supply network battery and to supply power to the important devices from the starter battery.

In the system set forth in U.S. Pat. No. 6,275,001, there are the following disadvantages. That is, at the time of starting the engine, the respective roles of the first battery and the second battery are limited, and engine starting is carried out with the first battery only. Thus, engine starting characteristics are not improved in comparison to an ordinary 1-battery vehicle power supply system.

For example, in a case of a vehicle equipped with an idle stop system (an eco-run system that automatically stops an engine at the time of stopping the vehicle and then automatically controls restarting of the engine based on, for example, a signal indicative of releasing of a brake), it is desirable to restart the engine within a short period of time at the time of moving the vehicle, for example, at the blue traffic signal after the automatic stopping of the engine at, for example, the intersection. However, when power supply to the starter is carried out using the first battery only, it is difficult to shorten the starting time, and thus a significant advantage cannot be expected from the system set forth in U.S. Pat. No. 6,275,001 when the system is implemented in the eco-run system.

The present invention addresses the above disadvantages, and it is a first objective of the invention to provide a more reliable vehicle power supply system, with which it is possible to efficiently recover energy regenerated during deceleration of a vehicle and also to supply a stable voltage to electrical loads.

It is a second objective to provide a vehicle power supply system, with which it is possible to carry out recovery of energy regenerated during deceleration of a vehicle and supply of power to electrical loads efficiently.

It is a third objective to provide a vehicle power supply system, with which it is possible to guarantee a voltage and furthermore shorten starting time of an engine.

SUMMARY

To achieve the first objective mentioned above, a first aspect of the present application provides a vehicle power supply system including: a generator, which is mounted on a vehicle; a main power source, to which an ordinary load, such as a lamp or an audio device, is connected; an auxiliary power source, which is connected to the generator, wherein the auxiliary power source recovers regenerative electric power, which is generated by the generator using kinetic energy, such as kinetic energy of deceleration, or thermal energy, such as thermal energy of exhaust heat, and the auxiliary power source stores electric power that is generated by the generator; a first supply circuit, which connects the auxiliary power source to the main power source and the ordinary load through a DC/DC converter; a second supply circuit, which is in parallel with the first supply circuit and which connects the auxiliary power source to the main power source and the ordinary load through a switch; and a control means for controlling operation of the DC/DC converter and operation of the switch, wherein the control means is enabled to select one of: a first control state, in which the DC/DC converter is driven, and the switch is opened; and a second control state, in which the DC/DC converter is stopped, and the switch is closed.

With this construction, since regenerative energy can be recovered directly to the auxiliary power source from the generator without passing through the DC/DC converter, energy recovery can be carried out efficiently. Since the main power source is charged by the auxiliary power source via the first supply circuit and the second supply circuit (i.e. it is not connected to the generator directly), for example when the generator is carrying out regeneration during deceleration of the vehicle, no large voltage fluctuations act on the main power source, and it is possible to supply power stably to the electrical loads connected to the main power source.

Since the control means can select a first control state and a second control state in correspondence with the running state of the vehicle and the charge states of the main power source and the auxiliary power source, the efficiency of charging from the auxiliary power source to the main power source or from the main power source to the auxiliary power source can be raised.

The vehicle power supply system described above is preferably constructed so that the generator is driven by the engine, and the auxiliary power source, which is connected to the generator, recovers regenerative electric power, which is generated by the generator at time of deceleration of a vehicle, and the auxiliary power source stores electric power that is generated by the generator through driving of the generator by the engine.

With this construction, since energy regenerated during vehicle deceleration can be recovered directly to the auxiliary power source without going through the DC/DC converter, energy recovery can be carried out with good efficiency.

In the vehicle power supply system described above, the control means may be also enabled to select a third control state, in which the DC/DC converter is driven, and the switch is closed. In this case, for example when there is no surplus in the output capability of the DC/DC converter, since power can be supplied from the auxiliary power source to the main power source or from the main power source to the auxiliary power source with the third control state selected, the thermal affects can be reduced.

In the vehicle power supply system described above, preferably the main power source has a greater nominal voltage or nominal capacity over the auxiliary power source. In this case, power can be supplied from the main power source to the auxiliary power source just by the switch being turned on. Furthermore, since the voltage of the auxiliary power source is lower, the voltage difference between the generator and the auxiliary power source is greater than in an ordinary combination of a generator and a main power source only, and power generated by the generator can be stored more efficiently.

In the vehicle power supply system described above, the main power source has a smaller nominal voltage or nominal capacity over the auxiliary power source. In this case, when power regenerated during deceleration is stored in the auxiliary power source, since the voltage of the auxiliary power source is higher than that of the main power source, regenerative electric power can be supplied to the ordinary loads from the auxiliary power source just by turning on the switch.

In the vehicle power supply system described above, alternatively, the nominal voltage of the main power source may coincide with the nominal voltage of the auxiliary power source. In this case, when power regenerated during deceleration is stored in the auxiliary power source, the charge percentage of the auxiliary power source becomes higher than that of the main power source to cause an increase in the voltage of the auxiliary power source. Thus, regenerative power can be supplied from the auxiliary power source to the ordinary loads just by closing the switch.

In the vehicle power supply system described above, preferably the main power source and the auxiliary power source have a common operational range, in which a working voltage of the main power source generally coincides with a working voltage of the auxiliary power source. In this case, when one of the power sources has failed, redundancy of a power source can be ensured easily, and the safety of the vehicle as dependent on the power supply system improves. When the second control state is selected and power is exchanged between the main power source and the auxiliary power source, voltage fluctuation caused by voltage difference when the switch is turned on/off can be suppressed. Also, with a combination of two power sources (main power source and auxiliary power source) having a small voltage difference so that their working voltages have ranges where they are approximately the same, when a series regulator is used as the DC/DC converter, voltage adjustment with that series regulator becomes possible (since the voltage difference is small and thermal losses are small), and the power supply system can be constructed cheaply. The reason why it can be made inexpensive is that compared to a commonly known switching-type DC/DC converter, the provision of a reactor or the like for power supply noise reduction is unnecessary, and the construction becomes simple.

In the vehicle power supply system described above, preferably the main power source has superior low-temperature discharge characteristics over the auxiliary power source. By connecting the starter to a main power source having good low-temperature discharge characteristics, it is possible to improve the startability of the engine at low temperatures.

In the vehicle power supply system described above, preferably the auxiliary power source has superior charge acceptance capability and better state detectability over the main power source. In this case, energy recovery during vehicle deceleration can be carried out efficiently.

In the vehicle power supply system described above, preferably, the main power source is one of a lead battery, a Li ion battery and a Ni hydrogen battery, and the auxiliary power source is one of a lead battery, a Li ion battery, a Ni hydrogen battery and an electrical double-layer capacitor. When lead batteries are used for the main power source and the auxiliary power source, it is possible to keep down their cost and achieve both energy recovery during deceleration and stable power supply to the ordinary loads. When a Li ion battery or a Ni hydrogen battery is used as the main power source, the life of the power supply system as a whole can be increased. When a Li ion battery, a Ni hydrogen battery or an electrical double-layer capacitor is used as the auxiliary power source, the regeneration capability during deceleration can be increased and its charge acceptance capability is also excellent.

In the vehicle power supply system described above, preferably, at time of supplying power from the auxiliary power source to the main power source and the ordinary load, the control means selects the second control state when the voltage of the auxiliary power source has fallen to or below an allowable rated voltage of the ordinary load. In this case, power can be supplied with an efficient switch (the second supply circuit) without applying stress to the ordinary loads.

In the vehicle power supply system described above, when a level of power supplied from the auxiliary power source to the main power source and the ordinary load, or a level of power supplied from the main power source to the auxiliary power source and the ordinary load, is called as a power supply level, the control means selects one of the first control state and the second control state in accordance with the power supply level. Since the characteristics of the DC/DC converter and the switch differ (may be suitable or unsuitable) depending on the power supply level, by selecting either the first control state or the second control state in accordance with the power supply level it is possible to optimize the combination.

In the vehicle power supply system described above, preferably the control means selects the first control state when the power supply level is equal to or below a predetermined value, and the control means selects the second control state when the power supply level is above the predetermined value. In this case, by using the DC/DC converter only when the power level is low (the power supply level is below the predetermined value), the DC/DC converter, which is more expensive than a switch, can be made low-capacity and its cost thereby kept down. By the switch being used when the power level is high (when the power supply level is above the predetermined value), the supply efficiency can be increased.

In the vehicle power supply system described above, the control means may select one of the first control state and the second control state in accordance with a voltage difference between the main power source and the auxiliary power source. In this case, the states of the main power source and the auxiliary power source can be sensed by their voltages only, and an optimal control state can be selected in accordance with the sensed voltage difference between the two power sources.

In the vehicle power supply system described above, preferably the control means selects the second control state when the voltage difference between the main power source and the auxiliary power source is equal to or below a predetermined value, and the control means selects the first control state when the voltage difference between the main power source and the auxiliary power source is above the predetermined value. In this case, when the voltage difference between the two power sources is large, the voltages can be adjusted in the DC/DC converter and supplied in a low voltage difference state, and when the voltage difference between the two power sources is small, the power can be supplied with an efficient switch (the second supply circuit).

In the vehicle power supply system described above, when a level of power supplied from the auxiliary power source to the main power source and the ordinary load, or a level of power supplied from the main power source to the auxiliary power source and the ordinary load, is called as a power supply level, the control means may select one of the first control state and the second control state in accordance with the voltage difference between the main power source and the auxiliary power source and the power supply level. By selecting the control state based on both the power supply level and the voltage difference between the two power sources instead of the power supply level alone or the voltage difference between the two power sources alone, it is possible to select a more optimal control state.

In the vehicle power supply system described above, preferably, the control means first selects the first control state when the voltage of the auxiliary power source is higher than that of the main power source and also the power level supplied from the auxiliary power source to the main power source and the ordinary load is greater than a predetermined value and the control means then shifts from the first control state to the second control state after the voltage of the auxiliary power source falls to or below the allowable rated voltage of the ordinary load. In this case, no overvoltage is applied to electrical loads such as lights, and reduction in the lives of the electrical loads can be suppressed. Efficient power supply using a switch becomes possible.

In the vehicle power supply system described above, preferably, there are further provided third and fourth supply circuits. The third supply circuit supplies electric power from the auxiliary power source to an important load, which is involved in a basic running operation or a safety operation of the vehicle. The fourth supply circuit supplies electric power from the main power source to the important load, wherein each of the third supply circuit and the fourth supply circuit has a diode, which limits a reverse flow of an electric current therethrough. With this construction, since it is possible to provide redundancy of a power source with respect to the important loads, even when one or the other of the main power source and the auxiliary power source has failed, power can be supplied to the important loads without fail, and the safety of the vehicle improves. By the third supply circuit and the fourth supply circuit each being provided with a diode, since reverse currents can be prevented with certainty, a stable power supply to the important loads can be ensured.

In the vehicle power supply system described above, preferably, there are further provided third and fourth supply circuits, which are different from the above ones. The third supply circuit supplies electric power from the auxiliary power source to an important load, which is involved in a basic running operation or a safety operation of the vehicle. The fourth supply circuit supplies electric power from the main power source to the important load, wherein the third supply circuit has a diode, which limits a reverse flow of an electric current therethrough, in a case where the main power source has a higher nominal voltage or nominal capacity over the auxiliary power source. With this construction, since it is possible to provide redundancy of a power source with respect to the important loads, even when one or the other of the main power source and the auxiliary power source has failed, power can be supplied to the important loads without fail, and the safety of the vehicle improves. By the third supply circuit being provided with a diode, since current can be prevented from flowing reversely through the third supply circuit from the main power source, which has a higher nominal voltage than the auxiliary power source, a stable power supply to the important loads can be ensured. Also, since a diode is provided in the third supply circuit only, compared to a case where diodes are provided in both the third supply circuit and the fourth supply circuit, a reduction in cost corresponding to the reduction in the number of diodes is possible. Furthermore, when power is supplied to the important loads from the main power source, the power can be supplied efficiently, without suffering a loss due to a diode.

In the vehicle power supply system described above, preferably, there are further provide third and fourth supply circuits, which are different from the above ones. The third supply circuit supplies electric power from the auxiliary power source to an important load, which is involved in a basic running operation or a safety operation of the vehicle, and the fourth supply circuit supplies electric power from the main power source to the important load, wherein the fourth supply circuit has a diode, which limits a reverse flow of an electric current therethrough, in a case the main power source has a lower nominal voltage or nominal capacity over the auxiliary power source. With this construction, since it is possible to provide redundancy of a power source with respect to the important loads, even when one or the other of the main power source and the auxiliary power source has failed, power can be supplied to the important loads without fail, and the safety of the vehicle improves. By the fourth supply circuit being provided with a diode, since current can be prevented from flowing reversely through the fourth supply circuit from the auxiliary power source, which has a higher nominal voltage than the main power source, a stable power supply to the important loads can be ensured. Also, since a diode is provided in the fourth supply circuit only, compared to a case where diodes are provided in both the third supply circuit and the fourth supply circuit, a reduction in cost corresponding to the reduction in the number of diodes is possible. Furthermore, when power is supplied to the important loads from the auxiliary power source, the power can be supplied efficiently, without suffering a loss due to a diode.

In the vehicle power supply system described above, preferably, the control means opens the switch when one of the main power source and the auxiliary power source fails in a state where the second control state is selected by the control means. For example, when the main power source has failed (e.g., grounded), since by turning the switch off it is possible to separate the failed main power source from the auxiliary power source, power can be supplied stably from the auxiliary power source to the important loads, and the redundancy of a power source with respect to the important loads can be ensured.

In the vehicle power supply system described above, preferably, the control means opens the switch when short-circuiting occurs between a cathode and an anode of one of the main power source and the auxiliary power source. Since this separates the main power source from the auxiliary power source, redundancy of a power supply to the ordinary loads from the power source functioning normally can be realized.

In the vehicle power supply system described above, preferably, the control means opens the switch when performance of the main power source falls. Since this separates the main power source from the auxiliary power source, redundancy of a power supply to the ordinary loads from the auxiliary power source can be realized.

In the vehicle power supply system described above, preferably, the control means opens the switch when performance of the auxiliary power source falls. Since this separates the main power source from the auxiliary power source, redundancy of a power supply to the ordinary loads from the main power source can be realized.

In the vehicle power supply system described above, preferably, the control means stops the DC/DC converter when one of the main power source and the auxiliary power source fails in a state where the first control state is selected by the control means. For example when the main power source has failed (e.g., grounded), since by stopping the DC/DC converter it is possible to separate the failed main power source from the auxiliary power source, power can be supplied stably from the auxiliary power source to the important loads, and redundancy of a power source with respect to the important loads can be ensured.

In the vehicle power supply system described above, preferably, the control means switches from the second control state to the third control state when a temperature of the switch is increased beyond a predetermined value in a state where the second control state is selected by the control means. In this case, when the temperature of the switch rises above the predetermined value, since the second supply circuit having the switch and the first supply circuit having the DC/DC converter are used together to supply power, heating of the switch can be suppressed.

In the vehicle power supply system described above, the ordinary load, which is connected to the main power source, may include an electrical load, which requires a dark current after stopping of the engine. The dark current is a current that is required to maintain a minimum function of the electrical load even when an ignition key of the vehicle is turned off. In this case, after the engine has stopped, with respect to the electrical loads needing a dark current from the main power source, power can be supplied from the main power source.

In the vehicle power supply system described above, preferably, at time of shifting from the first control state to the second control state or at time of shifting from the second control state to the first control state, the control means increases an output voltage of the DC/DC converter to a higher one of a voltage of the main power source and a voltage of the auxiliary power source or decreases the output voltage of the DC/DC converter to a lower one of the voltage of the main power source and the voltage of the auxiliary power source, and then the control means shifts from the first control state to the second control state or shifts from the second control state to the first control state. Since this makes it possible to suppress voltage fluctuations occurring when the control state is changed over, flickering of lights and so on can be prevented.

In the vehicle power supply system described above, preferably, the control means senses a working sate, such as a temperature or a voltage, of the DC/DC converter in a state where the first control state is selected by the control means, and the control means shifts from the first control sate to the second control state when the sensed working state of the DC/DC converter exceeds a predefined value. In this case, since it is possible to keep the working state of the DC/DC converter within a predefined value, failure of the DC/DC converter can be prevented and the DC/DC converter can be made small.

In the vehicle power supply system described above, preferably, the control means makes an output voltage of the DC/DC converter generally equal to an output voltage of the generator. In this way, it is possible to limit voltage fluctuations of the main power source, and thereby it is possible to implement stable voltage supply to the electrical loads. Furthermore, a contact arcing of the switch provided in the second power supply circuit can be made small to allow a size reduction.

In the vehicle power supply system described above, preferably, the control means may control an output voltage of the generator such that the output voltage of the generator generally coincides with an output voltage of the DC/DC converter when the first control state is selected by the control means. Since this makes it possible to suppress voltage fluctuation of the main power source, it is possible to realize a stable voltage supply to the electrical loads. Contact arcing of the switch provided in the second supply circuit can be made small and the switch can be made small.

In the vehicle power supply system described above, the control means may sense a charge acceptance capability of the main power source based on an output state of the DC/DC converter when the first control state is selected by the control means. In this case, since it is not necessary for the charge acceptance capability of the main power source to be sensed with a sensor, a low-cost system can be realized.

In the vehicle power supply system described above, the control means may sense a voltage of the auxiliary power source and an output voltage of the DC/DC converter based on a running state of the vehicle, and the control means may control an output of the generator based on a sensed result of the voltage of the auxiliary power source and of the output voltage of the DC/DC converter. By this means it is possible to control the output of the generator efficiently in accordance with the running state of the vehicle.

In the vehicle power supply system described above, the auxiliary power source may supply electric power to an electrical load, which does not require a dark current. For example, with respect to battery death of the main power source that would normally occur when the vehicle is parked for a long period or left with a door half-open, by cutting the power supply to devices of which resetting is allowable, it is possible to prevent life and performance reduction of the main power source, and with respect to electrical loads not needing a dark current, power can be supplied from the auxiliary power source.

The electrical load, which does not require the dark current, may be one of an electrical load, such as an ECU that does not have an internal memory, and an electrical load, such as an ECU that always uses an initial constant of an internal memory.

In the vehicle power supply system described above, there may be further provided a dark current blocking means for blocking the dark current, wherein the auxiliary power source supplies electric power to an electrical load (e.g., an electrical load, such as an ECU, which allows resetting of its internal memory), which enables blocking of dark current. By this means, even when dark current has been blocked by the dark current blocking means, power can be supplied from the auxiliary power source.

In the vehicle power supply system described above, an auxiliary power source switch may be connected in series with the auxiliary power source. In this case, for example when the auxiliary power source has failed, since the auxiliary power source can be separated from the main system by the auxiliary power source switch being turned off, the safety of the main system can be ensured.

In the vehicle power supply system described above, preferably, the auxiliary power source switch is disposed between the generator and the auxiliary power source in such a manner that the auxiliary power source switch is positioned on a generator side of an input side connection of the DC/DC converter. In this case, the input voltage of the DC/DC converter can be limited to the voltage of the auxiliary power source, and the cost of the DC/DC converter can be reduced.

In the vehicle power supply system described above, the DC/DC converter may include a series regulator. The objective of this is to remove noise caused by power device switching by taking advantage of the fact that the voltage difference between the main power source and the auxiliary power source is small (or their voltages are the same), and by this means it is possible to prevent the circuit being complicated by noise countermeasures.

In the vehicle power supply system described above, preferably, in a case where a fully charged state of the auxiliary power source is sensed at time of performing regenerative power generation of the generator during, for example, deceleration of the vehicle, the generator carries out the regenerative power generation at a voltage that is lower than a voltage of the auxiliary power source measured in the fully charged state of the auxiliary power source and supplies electric power to the ordinary load in one of the first control state and the second control state. When the auxiliary power source is charged further after it has become fully charged, there is a risk of battery deterioration or the like caused by overcharging. To avoid this, preferably, when it has been sensed by voltage or charge level detecting means or the like that the auxiliary power source is fully charged, the generator is controlled to a voltage such that it cannot charge the auxiliary power source (a lower voltage than the that of the auxiliary power source), and power supply to the ordinary loads is effected by means of the first control state or the second control state. In this case, for example on roads such as long downhill slopes, even after the auxiliary power source has become fully charged by regenerative power generation, by consuming regenerative electric power with the ordinary loads, it is possible to utilize the regenerative electric power effectively.

In the vehicle power supply system described above, in a case where a fully charged state of the auxiliary power source is sensed at time of performing regenerative power generation of the generator during, for example, deceleration of the vehicle, the generator may carry out the regenerative power generation at a voltage that is lower than a voltage of the auxiliary power source measured in the fully charged state of the auxiliary power source and may supply electric power to the ordinary load in one of the first control state, the second control state and the third control state.

In the vehicle power supply system described above, the main power source may be maintained in a fully charged state in the first control state. By the battery state of the main power source being sensed based on a battery voltage or discharge current and power from the auxiliary power source or the generator being supplied to the ordinary loads using the DC/DC converter (the first control state), it is possible to keep the main power source in a fully charged state. By this means, whereas when the main power source is for example a lead battery or the like a phenomenon of the battery life deteriorating due to cumulative discharge is known, this can be suppressed and increased life can be achieved.

Next, to achieve the second objective mentioned earlier, a second aspect of the present application provides a vehicle power supply system including: a generating means for generating regenerative energy at time of decelerating a vehicle; a high-performance main power storage means for directly storing the regenerative energy, which is generated by the generating means, and for supplying electric power to an electrical load, which is mounted on the vehicle; an auxiliary power storage means for receiving and storing the electric power supplied from the main power storage means, wherein the auxiliary power storage means has superior discharge characteristics at a low temperature over the main power storage means; and a starting device power source switching means for selecting one or both of the main power storage means and the auxiliary power storage means as a power source based on an engine starting temperature to supply electric power to a starting device for starting an engine at time of starting the engine, wherein an engine temperature or an engine temperature related temperature, which is measured at the time of starting the engine, is called as the engine starting temperature.

With the construction described above, since regenerative energy produced by the generating means during deceleration of the vehicle is directly recovered to the high-performance main power storage means without passing through a DC/DC converter or the like, the recovery efficiency can be increased. Furthermore, since power is supplied to the electrical loads from this main power storage means without passing through a DC/DC converter or the like, power supply can be effected efficiently. Also, since one or the other of the main power storage means and the auxiliary power storage means is selected or both are used together as the power supply of the starting device in correspondence with the engine starting temperature, the main power storage means and the auxiliary power storage means can be used effectively in accordance with their respective characteristics.

In the vehicle power supply system according to this second aspect of the application, preferably, a temperature range below a predetermined temperature T1 is called as an extremely low temperature range; a temperature range between the predetermined temperature T1 and a predetermined temperature T2 (T1<T2) is called as a low temperature range; a temperature range between the predetermined temperature T2 and a predetermined temperature T3 (T2<T3) is called as a normal temperature range; a temperature range above the predetermined temperature T3 is called as a high temperature range; the starting device power source switching means selects the main power storage means when the engine starting temperature is in the normal temperature range; and the starting device power source switching means switches to use both the main power storage means and the auxiliary power storage means when the engine starting temperature is in one of the extremely low temperature range and the high temperature range. With this construction, since it is possible to select the main power storage means, which is optimal for use in the normal temperature range, or both of the storage means together, which can supply a larger power, under the large torque conditions of the extremely low temperature range and the high temperature range, the two storage means (the main power storage means and the auxiliary power storage means) can be used effectively. By this means it is possible to make the storage means small and low in cost.

In the vehicle power supply system according to the second aspect, preferably, the auxiliary power storage means may supply electric power to the starting device at the time of starting the engine when the engine starting temperature is in the low temperature range. With this construction, since it is possible to reduce the temperature range over which the main power storage means and the auxiliary power storage means are used together, a stable supply of power using the storage means not being used for starting, which will be discussed below, is possible.

In the vehicle power supply system of the second aspect, preferably, the auxiliary power storage means supplies electric power to the electrical load, which requires a guaranteed voltage, when the main power storage means supplies electric power to the starting device at the time of starting the engine, and the main power storage means supplies electric power to the electrical load, which requires the guaranteed voltage, when the auxiliary power storage means supplies electric power to the starting device at the time of starting the engine. When a large current flows to the starting device from the main power storage means or the auxiliary power storage means, the main power storage means or the auxiliary power storage means suffers a voltage drop. With respect to this, when the engine starting temperature is in the normal temperature range, since power is supplied to the starting device from the main power storage means, by supplying power to the electrical loads that need a guaranteed voltage from the auxiliary power storage means, it is possible to secure the required voltage to the electrical loads needing a guaranteed voltage without suffering an affect of the voltage drop of the main power storage means. When the engine starting temperature is in the low temperature range (including the extremely low temperature range) or the high temperature range, since power is being supplied to the starting device from the auxiliary power storage means, by supplying power to the electrical loads needing a guaranteed voltage from the main power storage means, it is possible to secure the required voltage to the electrical loads needing a guaranteed voltage without suffering an affect of the voltage drop of the auxiliary power storage means.

In the vehicle power supply system of the second aspect, preferably, there is provided an automatic engine stopping/starting control device, which automatically controls stopping and restarting of an engine, and a starting device power source switching means selects the auxiliary power storage means at time of starting the engine first time and selects the main power storage means at time of restarting the engine through use of the automatic engine stopping/starting control device. With this construction, since either the main power storage means or the auxiliary power storage means is selected as the power source of the starting device depending on whether the engine is being started for the first time or being restarted after being automatically stopped, the main power storage means and the auxiliary power storage means can be used effectively in accordance with their respective characteristics.

In the vehicle power supply system of the second aspect, preferably, the main power storage means provides electric power to the electrical load, which requires a guaranteed voltage, at the time of starting the engine first time, and the auxiliary power storage means provides electric power to the electrical load, which requires the guaranteed voltage, at the time of restarting the engine through use of the automatic engine stopping/starting control device. When a large current flows to the starting device from the main power storage means or the auxiliary power storage means, the main power storage means or the auxiliary power storage means suffers a voltage drop. With respect to this, when the engine is being started for the first time, since power is supplied to the starting device from the auxiliary power storage means, by supplying power to the electrical loads that need a guaranteed voltage from the main power storage means, it is possible to secure the required voltage to the electrical loads needing a guaranteed voltage without suffering an affect of the voltage drop of the auxiliary power storage means. When the engine is being restarted after being automatically stopped, since power is supplied to the starting device from the main power storage means, by supplying power to the electrical loads needing a guaranteed voltage from the auxiliary power storage means it is possible to secure the required voltage to the electrical loads needing a guaranteed voltage without suffering an affect of the voltage drop of the main power storage means.

In the vehicle power supply system of the second aspect, preferably, the main power storage means provides electric power to the electrical load while the engine is automatically stopped. In a vehicle in which stopping and restarting of the engine are automatically controlled, since the frequency of automatic engine stops is inevitably high, it is desirable to prevent deterioration of the auxiliary power storage means by supplying power to the electrical loads from the high-performance main power storage means.

In the vehicle power supply system of the second aspect, preferably, there is further provided a state sensing means for sensing a charge state of the main power storage means, wherein when it is determined that the main power storage means alone is not enough to supply start-up electric power to the starting device based on a sensed result of the state sensing means, the start-up electric power is supplied to the starting device from the auxiliary power storage means alone or from both the auxiliary power storage means and the main power storage means. By this means it is possible to effect restarting of the engine after an automatic stop without fail.

In the vehicle power supply system of the second aspect, there may be further provided a charging circuit, which supplies electric power from the main power storage means to the auxiliary power storage means, and the charging circuit includes a DC/DC converter, and the auxiliary power storage means is charged with a micro current, which is supplied from the main power storage means to the auxiliary power storage means through the DC/DC converter. With this construction, since the auxiliary power storage means is charged with a micro current from the main power storage means, the DC/DC converter can be made small (low-capacity).

In the vehicle power supply system of the second aspect, there may be further provided a charging circuit, which supplies electric power from the main power storage means to the auxiliary power storage means, wherein the charging circuit includes a relay switch, and the auxiliary power storage means is charged with electric power supplied from the main power storage means when the relay switch is turned on. With this construction, since the auxiliary power storage means can be charged from the main power storage means without the interposition of a DC/DC converter, the charging efficiency can be made high.

In the vehicle power supply system of the second aspect, preferably, when a voltage difference between the main power storage means and the auxiliary power storage means is smaller than a predetermined value, the DC/DC converter is operated, or the relay switch is turned on, so that the auxiliary power storage means is charged with electric power supplied from the main power storage means. In this case, since the auxiliary power storage means is charged from the main power storage means with a micro current, heat losses due to resistance of the DC/DC converter, the relay switch, wiring, and the two storage means can be reduced, and more efficient charging becomes possible.

In the vehicle power supply system of the second aspect, preferably, the auxiliary power storage means is charged with electric power supplied from the main power storage means when the generating means stops its power generating operation. Since the accuracy of detection of the charging state of the main power storage means is good, it becomes possible for the charging power to be sensed with good accuracy.

In the vehicle power supply system of the second aspect, there may be further provided two current sensing means and a voltage sensing means. One of the two current sensing means is provided in a conductor portion, which supplies electric power from the main power storage means to the starting device and the electrical load, and the other one of the two current sensing means is provided in a conductor portion, which supplies electric power from the main power storage means to the auxiliary power storage means. The voltage sensing means is for sensing a voltage of the main power storage means, wherein a measured value of each current sensing means and a measured value of the voltage sensing means are compared with a measured value of the charge state of the main power storage means obtained through the state sensing means, so that a power consumption level and a charge level of the auxiliary power storage means are sensed with relatively high accuracy. In this way, it becomes possible to make up the consumed power using a precise state detection value of the main power storage means, and the management of electrical energy becomes easy. Even if the detection precision of the charge state of the auxiliary power storage means itself is poor (the detection precision of lead batteries, which is one example of the auxiliary power storage means, is poor), if the power consumption of the electrical loads can be established precisely, by obtaining the difference between this and the discharge level of the main power storage means it becomes possible to establish the charge state of the auxiliary power storage means more exactly.

In the vehicle power supply system of the second aspect, preferably, when the charge state of the main power storage means deviates from a predetermined state, the main power storage means is switched to the auxiliary power storage means to supply electric power to the electrical load, which requires the guaranteed voltage. By this means, even when the charge state of the main power storage means is other than a predetermined state, the required voltage can be supplied to the electrical loads needing a guaranteed voltage from the auxiliary power storage means.

In the vehicle power supply system of the second aspect, preferably, supply of a dark current is performed from the main power storage means after the engine is stopped through operation of a key by a driver.

Next, to achieve the third objective mentioned earlier, a third aspect of the present application provides a vehicle power supply system including: a generator, which is driven by an engine to generate electric power; a first battery, which is charged with electric power generated by the generator; a second battery, which has an output voltage lower than that of the first battery, wherein the second battery supplies electric power to a starter at time of starting the engine; a charging circuit, which supplies electric power from one of the generator and the first battery to the second battery; and an assist circuit, which provides power assistance from the first battery to the starter in addition to power supply from the second battery to the starter.

With this construction, when at the time of engine starting power is supplied to the starter from the second battery, power assistance to the starter from the first battery through the assist circuit is possible. In this case, since the first battery produces a higher voltage than the second battery, the output of the starter increases, and engine starting can be completed sooner. Furthermore, since the output voltages of the first battery and the second battery are different and the first battery produces a higher voltage than the second battery, it is possible to realize the charging circuit provided between the two batteries with a simple construction.

In the vehicle power supply system of the third aspect of the application, preferably, the power assistance from the first battery is executed at a predetermined timing after initiation of the power supply from the second battery to the starter. In this case, since power is supplied to the starter from only the second battery, which has a lower output voltage, in the initial stage of engine starting, the load on the starter can be reduced in comparison to a case where power assistance with the first battery, which has the higher output voltage, is carried out from the beginning. Furthermore, since in the initial stage of engine starting (before power assistance with the first battery is executed), power can be supplied to the electrical loads from the first battery, there is no momentary cutting off of electrical loads due to a voltage drop of the second battery caused by a large current (surge current) flowing in the initial stage of excitation of the starter, and the voltage to the electrical loads can be guaranteed.

In the vehicle power supply system of the third aspect, preferably, the predetermined timing, at which the power assistance from the first battery is executed, is determined based on elapsed time since the time of starting the engine or based on transition of a voltage value of the second battery. With this construction, since the timing at which to execute power assistance can be determined without it being necessary specially to use a current sensor or the like, the control logic can be simplified and cost can be reduced.

In the vehicle power supply system of the third aspect, preferably, an internal resistance per unit capacity of the first battery is smaller than that of the second battery. When the internal resistance per unit capacity of the first battery is smaller than that of the second battery, voltage drop on discharging is suppressed. Thus, a higher voltage can be applied to the starter, and the assisting effect can be increased.

In the vehicle power supply system of the third aspect, preferably, the power assistance from the first battery is stopped when the voltage of the first battery is lower than a predetermined value. When the charge state of the first battery is low, there is little merit (earlier starting of the engine) in power assistance. Thus, when the voltage of the first battery is below a predetermined value, power assistance with the first battery is stopped.

In the vehicle power supply system of the third aspect, preferably, the second battery has superior low-temperature discharge characteristics over the first battery. By allocating the first half of the engine starting period, in which a large current flows through the starter, to a second battery having superior low-temperature discharge characteristics, it is possible to ensure engine starting at low temperatures also.

In the vehicle power supply system of the third aspect, preferably, the charging circuit includes an ON-OFF means for turning on and turning off supply of the electric power to the second battery at a certain time ratio (i.e., a ratio between an ON time period and an OFF time period), and the assist circuit includes one of a relay and a semiconductor switch. By this means it is possible to make the charging circuit a simple construction having the ON-OFF means. The construction of the assist circuit also can be made simple by the use of a relay or a semiconductor switch.

As the ON-OFF means provided in the charging circuit, an electronic switching device (e.g., a MOSFET) using a semiconductor can be used. Or, as the ON-OFF means provided in the charging circuit, a DC/DC converter can be used. When a DC/DC converter is used as the ON-OFF means, the DC/DC converter is preferably provided in the generator. In this case, since it is possible to construct a charging circuit connected to the second battery from the first battery via the generator, the circuit construction of the system can be simplified.

In the vehicle power supply system of the third aspect, preferably, there is further provided a distributor, which is connected to the first battery and the second battery to control an output voltage of the first battery and an output voltage of the second battery, wherein supply of electric power to an important load, which is involved in a basic running operation or a safety operation of a vehicle, is carried out through the distributor. With this construction, since power can be supplied to the important electrical loads from either of the first battery and the second battery through the distributor, a guaranteed voltage to the important electrical loads can be obtained, and the reliability and redundancy of the system as a whole increase.

In the vehicle power supply system of the third aspect, preferably, the first battery stores regenerative energy, which is generated by the generator at time of decelerating a vehicle. In this case, by the regenerative energy of deceleration being stored in a battery having a small internal resistance per unit capacity, the regenerative energy can be taken in more efficiently.

In the vehicle power supply system of the third aspect, preferably, the second battery provides dark current to an electrical load after the engine is stopped through operation of a key by a driver. With this construction, by the supplying of dark current being allocated to the second battery, the load on the first battery is reduced. Thus, the first battery can be made smaller. As a result, for example when an expensive Li ion battery or the like is used as the first battery, it is possible to keep down its cost.

A vehicle power supply system according to the third aspect can be applied to a vehicle that has an automatic engine stopping/starting control device, which automatically controls stopping and restarting of the engine. With the third aspect, since engine starting can be effected more quickly, a highly beneficial effect can be obtained when the engine is restarted for example after it has been automatically stopped at, for example, an intersection.

DETAILED DESCRIPTION OF EMBODIMENTS

Best modes for practicing the invention will be described in detail based on the following embodiments.

First Embodiment

Figure 1:
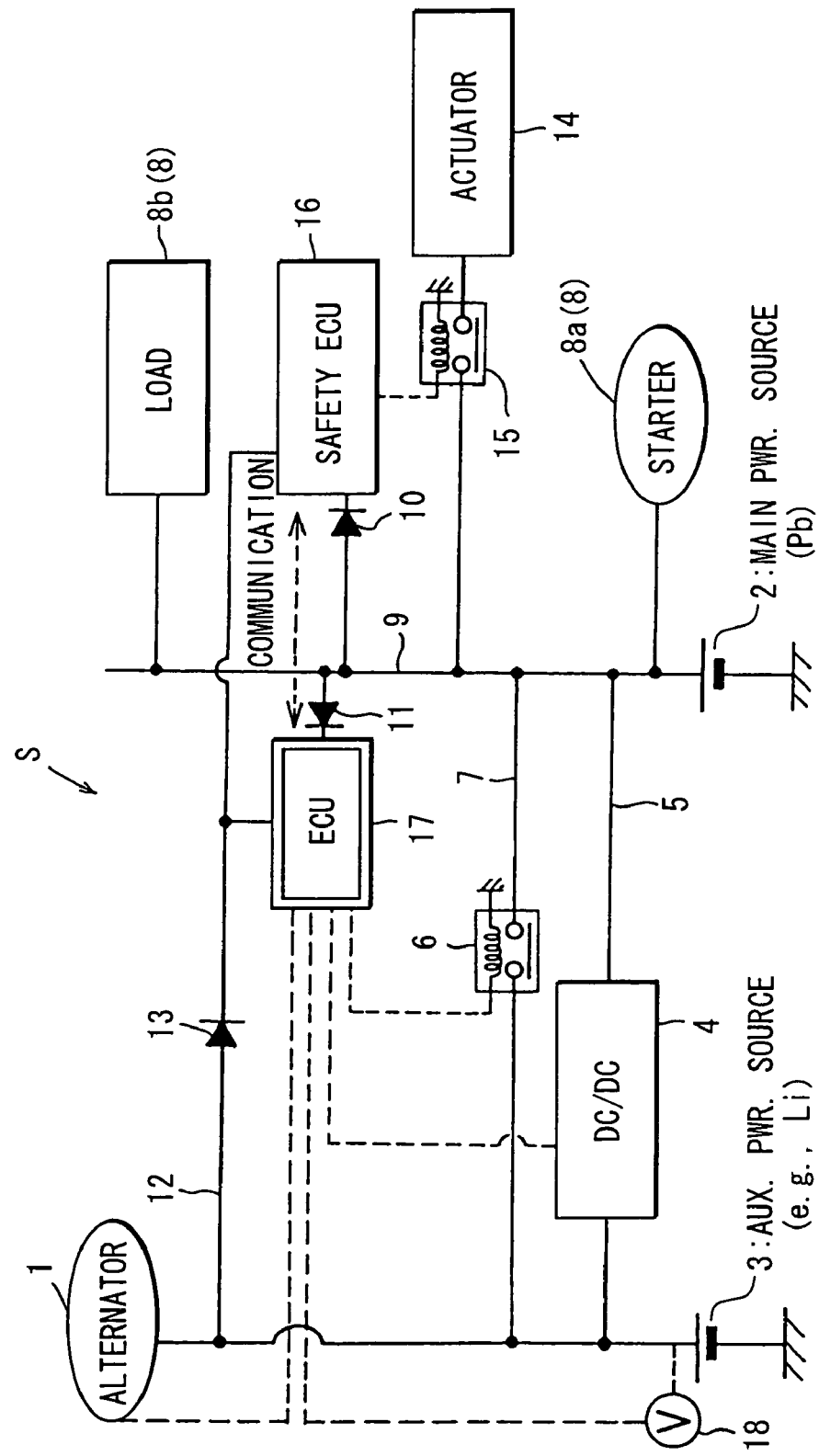
FIG. 1 is an electrical circuit diagram of a vehicle power supply system according to a first embodiment.
Figure 2:
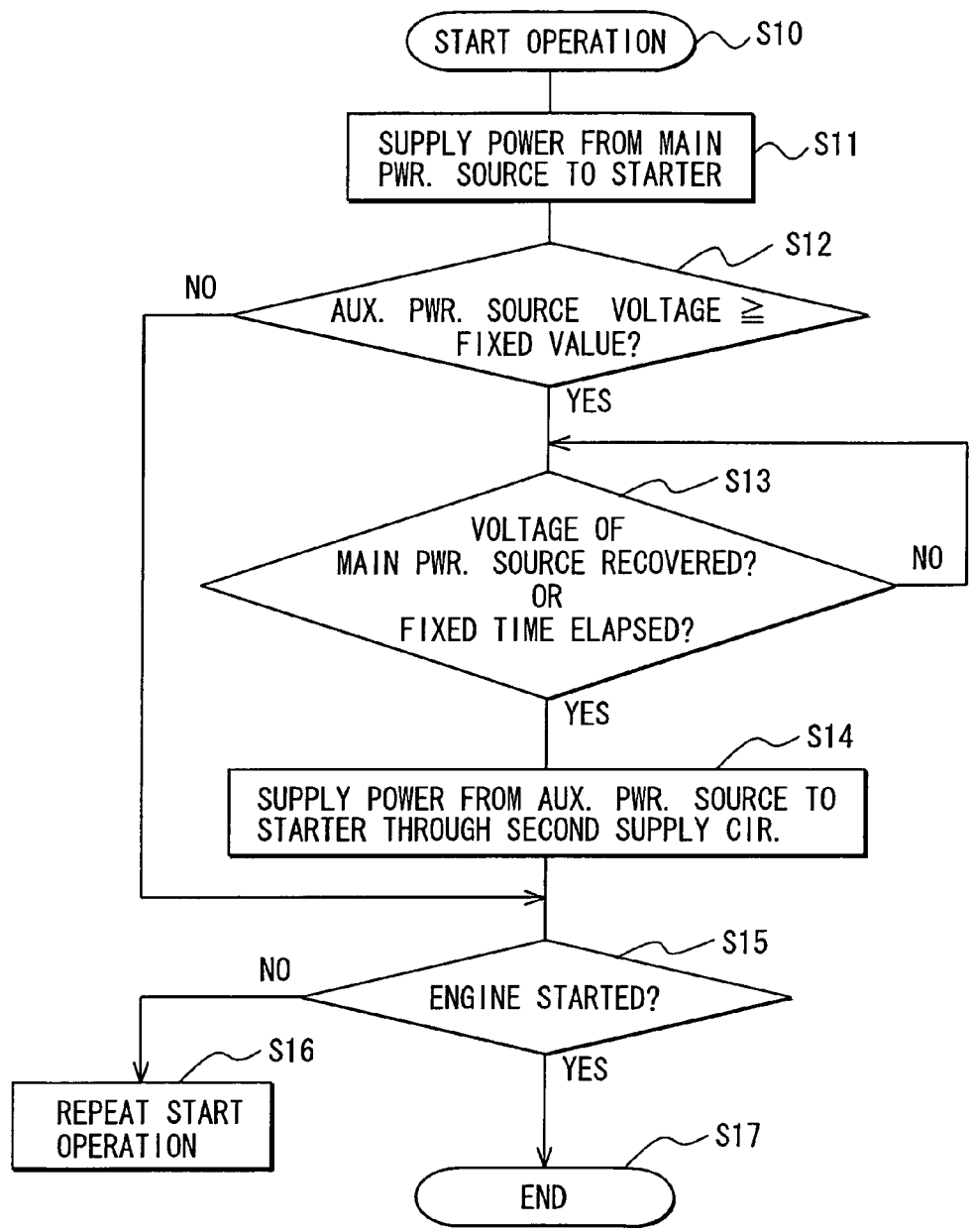
FIG. 2 is a flowchart showing a control procedure for engine starting according to the first embodiment.

FIG. 1 is an electrical circuit diagram of a power supply system (hereinafter, referred to as a power supply system S) for an automotive vehicle according to a first embodiment. FIG. 2 is a flowchart showing a control procedure for starting an engine.

The power supply system S includes a generator 1 and two power sources (a main power source 2 and an auxiliary power source 3) and supplies electric power to electrical loads (described below) mounted on the vehicle. The generator 1 is driven by the engine (not shown).

The generator 1 is an alternator, which has an IC regulator. The generator 1 is driven by the engine through a drive belt and generates a voltage of, for example, 13 to 14 V. The generator 1 is connected directly to the auxiliary power source (sub-power source) 3 and is also connected to the main power source 2 through a power supply circuit described below.

The power supply circuit includes a first supply circuit 5 and a second supply circuit 7, which are connected in parallel between the auxiliary power source 3 and the main power source 2. The first supply circuit 5 includes a DC/DC converter 4, which uses, for example, a series regulator. The second supply circuit 7 includes a switch 6. Although in FIG. 1, a relay-type switch 6 is shown in the second supply circuit 7, a semiconductor switch may be alternatively used instead of the relay-type switch 6.

The main power source 2 is, for example, an ordinary Pb (lead) battery and produces a voltage of 12 to 13 V (nominal voltage 12 V). The main power source 2 is given a higher priority for supplying electric power to the ordinary electrical loads 8 than the auxiliary power source 3. Important loads (further discussed later), which are involved in a basic running operation and a safety operation of the vehicle, are connected to the main power source 2 through a third supply circuit 9. The third supply circuit 9 includes diodes 10, 11, which limit a reverse flow of an electric current from the auxiliary power source 3 side.

The auxiliary power source 3 is a high-performance battery (e.g., a Lithium ion battery), which has superior charge acceptance capability over the main power source 2 and which allows easy state detection. Furthermore, the auxiliary power source 3 has a smaller internal resistance per unit capacity over the main power source 2 and produces a voltage of, for example, 9 to 12 V (nominal voltage 10.8 V). The auxiliary power source 3, for example, recovers regenerative electric power, which is generated by the generator 1 during deceleration of the vehicle. Also, the auxiliary power source 3 stores other electric power generated by the generator 1 such as electric power generated by the generator 1 in a non-deceleration period. The above-mentioned important loads are connected to the generator 1 and the auxiliary power source 3 through a fourth supply circuit 12. The fourth supply circuit 12 includes a diode 13, which limits a reverse flow of an electric current from the main power source 2 side.

The above-mentioned ordinary loads 8 include a starter 8a and other ordinary loads 8b mounted on the vehicle. The starter 8a starts (cranks) the engine. The other ordinary loads 8b include, for example, lamps, wipers, audio devices and an air-conditioning system. Again, the main power source 2 is given the higher priority for supplying electric power to these ordinary loads 8b than the auxiliary power source 3. However, when a power supply capability of the main power source 2 is reduced to a low level, the auxiliary power source 3 or the generator 1 is used to supply electric power to the ordinary loads 8b.

The important loads, which are involved in the basic running operation and the safety operation of the vehicle, include, for example, a control unit (hereinafter, referred to as a safety ECU 16) and an electronic control unit (hereinafter, referred to as a system ECU 17). The control unit (the safety ECU 16) electronically controls various actuators 14 through a relay 15. The actuators 14 are involved in the basic running operation and/or the safety operation of the vehicle. The electronic control unit (the system ECU 17) electronically controls the power supply system S (e.g., the generator 1, the DC/DC converter 4, the switch 6). Even in a case where either the main power source 2 or the auxiliary power source 3 fails, the important loads can directly receive electric power from the remaining one of the main power source 2 and the auxiliary power source 3. That is, redundancy of a power source with respect to the important loads is provided.

The system ECU 17 can appropriately select one of a first control state, a second control state and a third control state, which are discussed below, depending on the operational state of the DC/DC converter 4 and the switch 6.

The first control state is for supplying electric power through use of the first supply circuit 5. In the first control state, the DC/DC converter 4 is driven (ON), and the switch 6 is opened (OFF). The second control state is for supplying electric power through use of the second supply circuit 7. In the second control state, the DC/DC converter 4 is stopped (OFF), and the switch 6 is closed (ON). The third control state is for supplying electric power through use of both the first supply circuit 5 and the second supply circuit 7. In the third control state, the DC/DC converter 4 is driven (ON), and the switch 6 is closed (ON).

Next, a control procedure of the system ECU 17 at the time of starting the engine will be described with reference to a flowchart shown in FIG. 2.

At step 10, an IG key (ignition key), which is an engine start switch, is turned to an ST position (a position for supplying electric power to the starter 8*a*). At step 11, power is supplied from the main power source 2 to the starter 8*a*. At step 12, it is determined whether the output voltage of the auxiliary power source 3 is equal to or above a fixed value. The voltage of the auxiliary power source 3 can be sensed by, for example, a voltmeter 18 shown in FIG. 1. When the result of this determination is YES, control proceeds to the following step 13. In contrast, when the determination result is NO, control jumps to step 15 where the supply of electric power from the auxiliary power source 3 to the starter 8*a* is stopped.

Figure 3:
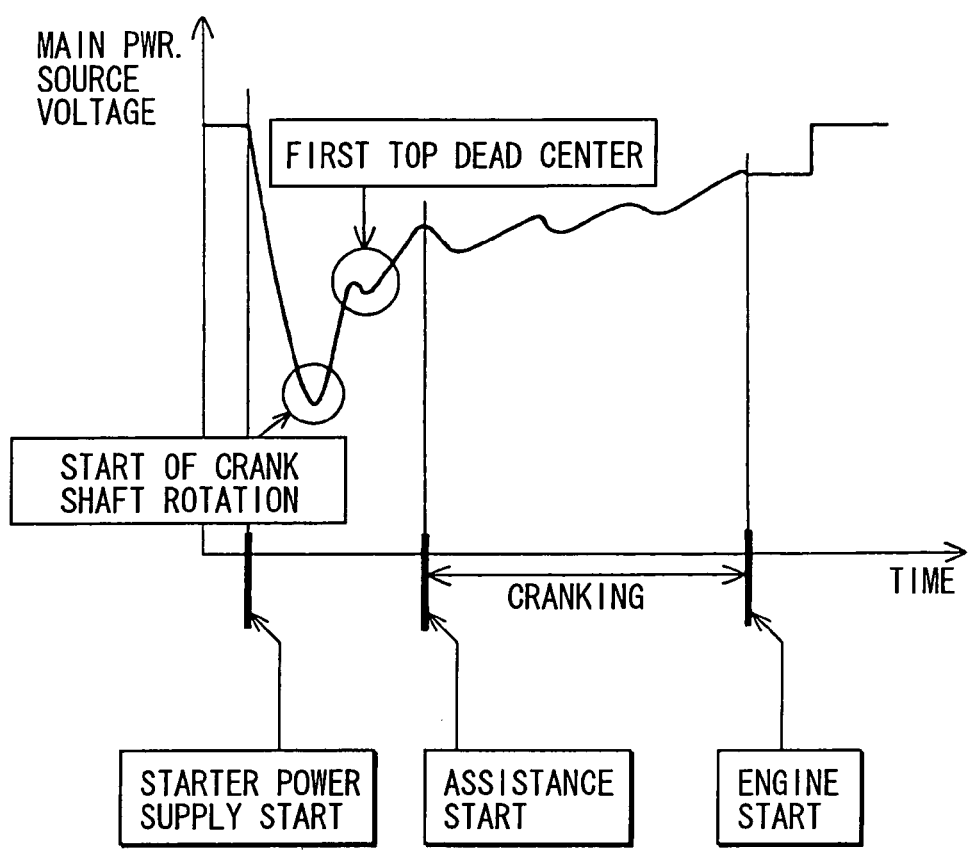
FIG. 3 is a voltage waveform graph of a main power source on engine starting in the first embodiment.

At step 13, a timing for supplying electric power from the auxiliary power source 3 to the starter 8*a* is determined. Specifically, it is determined whether the voltage across the terminals of the main power source 2 has recovered to a predetermined voltage. Alternatively, it may be determined whether fixed time has elapsed from the start of power supply to the starter 8*a*. As shown in FIG. 3, the voltage across the terminals of the main power source 2 drops sharply when a large current flows to the starter 8*a* in an initial stage and then gradually recovers while dipping slightly each time a piston passes a top dead center. Accordingly, it is possible to determine the timing for supplying electric power from the auxiliary power source 3 to the starter 8*a* by monitoring the voltage across the terminals of the main power source 2.

At step 14, when the determination result of step 13 is YES, the switch 6 provided in the second supply circuit 7 is switched on, i.e., turned on, so that power is supplied from the auxiliary power source 3 to the starter 8*a* through the second supply circuit 7 (this will be called power assistance). At step 15, it is determined whether the engine has started. This starting determination can be made based on, for example, the engine speed or the voltage across the terminals of the main power source 2. When the result of this determination is NO, control proceeds to step 16. In contrast, when the determination result is YES, control proceeds to step 17. At step 16, the engine start operation is carried out once again. At step 17, the IG key is turned from the ST position to an OFF position, and the present control operation is terminated.

According to the first embodiment, by performing the power assistance through use of the auxiliary power source 3 at the predetermined timing after the initiation of the power supply from the main power source 2 to the starter 8*a*, the output of the starter 8*a* is increased, and the engine can be started more quickly. In particular, in a vehicle equipped with an automatic stopping and restarting device (idle stop device), each time the engine is restarted after being automatically stopped, the starting feeling experienced by the occupants of the vehicle can be improved since the starting time is shorter.

Furthermore, there are the two electric power supply paths to the safety ECU 16, which is an important load. These two power supply paths include a first supply path, which connects the main power source 2 to the safety ECU 16 through the third supply circuit 9, and a second supply path, which connects the auxiliary power source 3 to the safety ECU 16 through the fourth supply circuit 12. Thus, even when one of the two power sources or one of the two paths fails, power can be still supplied by means of the remaining power source and the remaining path, thereby implementing the redundancy. Furthermore, since the third supply circuit 9 and the fourth supply circuit 12 are provided with the diodes 10 and 13, respectively, for limiting a reverse flow of current, the two power sources (the main power source 2 and the auxiliary power source 3) are never connected to each other through the third supply circuit 9 or the fourth supply circuit 12.

In the first embodiment, as the exemplary case of regenerative power generation, there is described the case where electric power is generated using the kinetic energy available during the deceleration of the vehicle. Besides this, the present invention can be equally applied to, for example, the power generation using thermal energy of exhaust heat or cooling heat of the engine, or to the power generation using flow energy of exhaust gas. Such power generations also include those in which electric power is generated directly from thermal energy using a thermoelectric device and those in which thermal energy is first converted into kinetic energy, and then electric power is generated from it.

Also, in the case of the power supply system S set forth in the first embodiment, the main power source 2 has the higher output voltage (nominal voltage) over the auxiliary power source 3. However, it should be noted that the present invention is equally applicable to a case where the auxiliary power source 3 has a higher output voltage (nominal voltage) than the main power source 2. For example, the main power source 2 may produce a voltage of 12 to 13 V (nominal voltage 12 V) as in the first embodiment, and the auxiliary power source 3 may produce a voltage of 12 to 16.4 V (nominal voltage 14.4 V). In such an instance, since the output voltage of the auxiliary power source 3 is higher, the generating capacity of the generator 1 should be correspondingly high to produce a voltage of 13 to 17 V.

Further alternatively, the output voltage (nominal voltage) of the main power source 2 may be set to be the same as the output voltage (nominal voltage) of the auxiliary power source 3. In this case, when regenerative electric power derived from the deceleration is stored in the auxiliary power source 3, the State of Charge (SOC), which is an available capacity of a battery expressed as a percentage of its rated capacity, of the auxiliary power source 3 becomes higher than that of the main power source 2. Thus, the voltage of the auxiliary power source 3 is higher, and therefore the regenerative electric power can be supplied from the auxiliary power source 3 to the ordinary loads by simply closing the switch 6.

Second Embodiment

Figure 4:
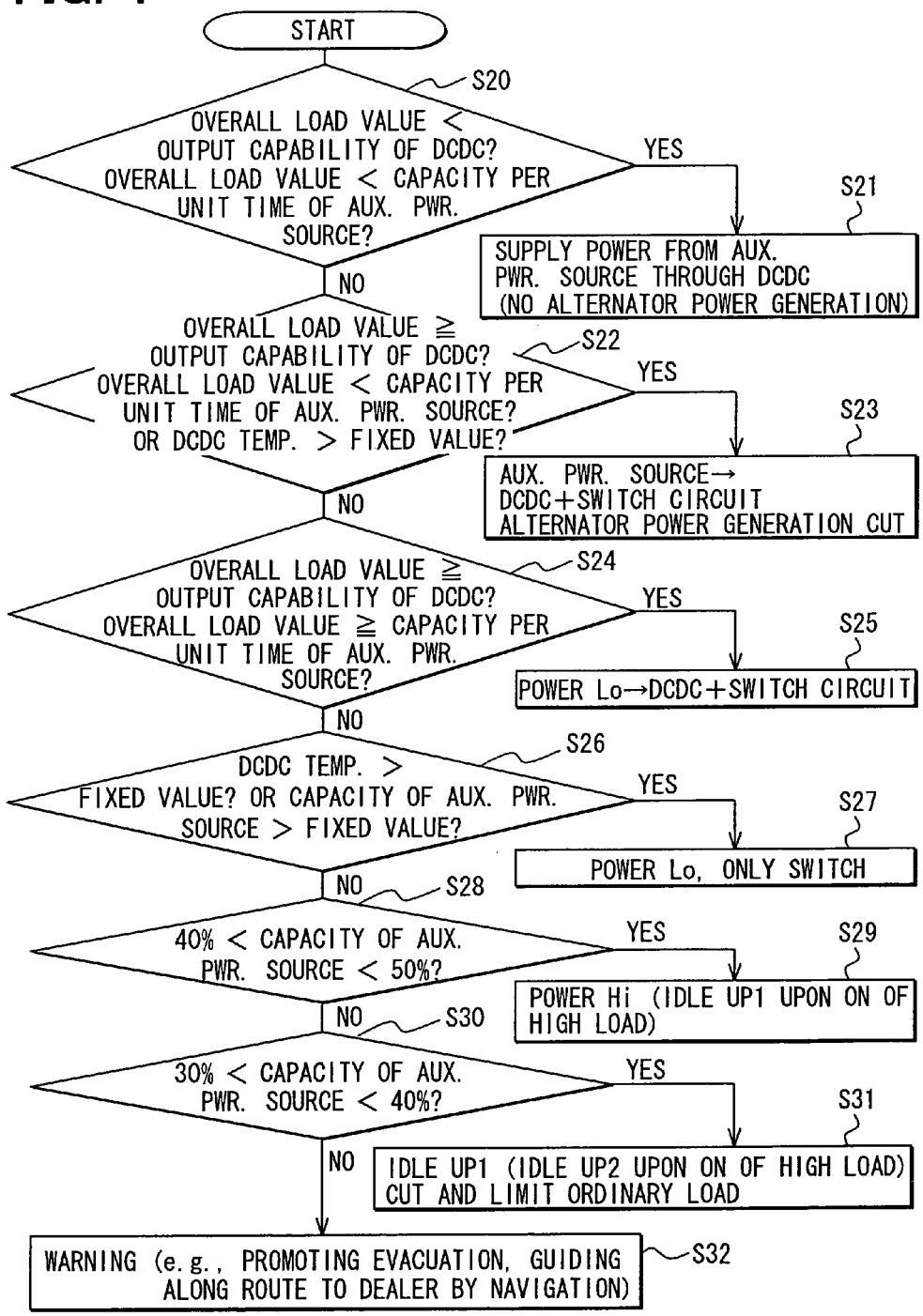
FIG. 4 is a control flowchart of a power supply system according to a second embodiment.

Next, as a second embodiment, a power supply control operation for controlling supply of power from the generator 1 or the auxiliary power source 3 to the main power source 2 will be described with reference to a flowchart shown in FIG. 4. This is a method in which the charge level of the auxiliary power source 3 is sensed and is used for the power supply control operation.

At step 20, it is determined whether the output capability of the DC/DC converter 4 is greater than the total power consumption of all of the electrical loads (this will be referred to as an overall load value), and the charge capacity per unit time of the auxiliary power source 3 is greater than the overall load value. When the determination result is YES, control proceeds to step 21. In contrast, when the determination result is NO, control proceeds to step 22. At step 21, since there is the surplus in the charge capacity of the auxiliary power source 3 with respect to the overall load value, and there is also the surplus in the output capability of the DC/DC converter 4, the power generation by the generator 1 is cut off, and electric power is supplied from the auxiliary power source 3 to the main power source 2 through the first supply circuit 5 having the DC/DC converter 4 (first control state).

At step 22, it is determined whether the output capability of the DC/DC converter 4 is below the overall load value, and furthermore the capacity per unit time of the auxiliary power source 3 is greater than the overall load value, or alternatively the temperature of the DC/DC converter 4 is higher than a fixed value. When the determination result is YES, control proceeds to step 23. In contrast, when the determination result is NO, control proceeds to step 24. At step 23, since there is the surplus in the charge capacity of the auxiliary power source 3 with respect to the overall load value, but there is no surplus in the output capability of the DC/DC converter 4 (or alternatively, the temperature of the DC/DC converter 4 is high), power generation by the generator 1 is cut off, and electric power is supplied from the auxiliary power source 3 to the main power source 2 through the first supply circuit 5 and the second supply circuit 7 (shown as a switch circuit in the figure) (third control state).

At step 24, it is determined whether the output capability of the DC/DC converter 4 is equal to or below the overall load value, and furthermore the capacity per unit time of the auxiliary power source 3 is equal to or below the overall load value. When the determination result is YES, control proceeds to step 25. In contrast, when it is NO, control proceeds to step 26. At step 25, since there is no surplus in the charge capacity of the auxiliary power source 3 with respect to the overall load value, and furthermore there is no surplus in the output capability of the DC/DC converter 4 (but, the temperature of the DC/DC converter 4 is equal to or below a fixed value), power generation (at a Lo level) by the generator 1 is carried out, and electric power is supplied from the generator 1 to the main power source 2 through the first supply circuit 5 and the second supply circuit 7 (third control state).

At step 26, it is determined whether the temperature of the DC/DC converter 4 is higher than a fixed value, or the auxiliary power source 3 capacity is higher than a fixed value. When the determination result is YES, control proceeds to step 27. In contrast, when it is NO, control proceeds to step 28. At step 27, to prevent heat-induced failure of the DC/DC converter 4, and to prevent overcharging of the auxiliary power source 3, electric power is supplied from the generator 1 to the main power source 2 using the second supply circuit 7 only (second control state). At this time, the power generation level (Lo) of the generator 1 is a level, at which power supply that corresponds to the ordinary loads 8b is possible even if the auxiliary power source 3 is fully charged.

At step 28, it is determined whether the charge capacity of the auxiliary power source 3 is within a first corresponding predetermined range (e.g., between 40% and 50%). When the determination result is YES, control proceeds to step 29. In contrast, when the determination result is NO, control proceeds to step 30. At step 29, since the charge capacity of the auxiliary power source 3 is low, the generating capacity of the generator 1 is raised (to a Hi level. The Lo and Hi levels are relative terms. That is, the Lo level is used to express a relatively low power generation level of the generator, and the Hi level is used to express a relatively high power generation level of the generator, which is higher than the Lo level). Also, when high loads, which consume a large amount of electric power, have been turned on, an idle speed is increased by a predetermined amount (first idle increase).

At step 30, it is determined whether the charge capacity of the auxiliary power source 3 is within a second corresponding predetermined range (e.g., between 30% to 40%). When the determination result is YES, control proceeds to step 31. In contrast, when the determination result is NO, control proceeds to step 32. At step 31, since the charge capacity of the auxiliary power source 3 is low, or the charge capacity of the auxiliary power source 3 is not increased even though the power generation capacity of the generator 1 has been increased, the first idle increase is carried out, and also the supply of power to the ordinary loads 8b is cut off (or limited). When the high load, which is among the ordinary loads 8b and consumes a large amount of electric power, has been turned on, the idle speed is increased further by a predetermined amount (second idle increase). In contrast, at step 32, abnormality (failure) of the auxiliary power source 3 is reported, i.e., is warned to the driver (e.g., asking the driver to evacuate to a safe place, or guiding the vehicle along a route to an automobile dealer through use of, for example, a navigation system).

According to the second embodiment, when the output capability of the DC/DC converter 4 is equal to or below the overall load value, the switch 6 is switched on, and the second supply circuit 7 is used. In this way, it is possible to supply electric power from the generator 1 or the auxiliary power source 3 to the main power source 2 even at the time of shortage of the supply of electric power from the DC/DC converter 4 or at the time of failure of the DC/DC converter 4.

When the temperature of the DC/DC converter 4 has become higher than the fixed value, the supply capability of the DC/DC converter 4 is limited, or the switch 6 is switched on, and only the second supply circuit 7 is used. In this way, the heat-induced failure of the DC/DC converter 4 can be limited. Thus, as discussed above, the second supply circuit 7, which has the switch 6, is provided between the auxiliary power source 3 and the main power source 2 in parallel with the first supply circuit 5, which has the DC/DC converter 4. In this way, it is possible to reduce the capacity and the size of the DC/DC converter 4.

Also, as discussed with reference to step 27, even in the fully charged state of the auxiliary power source 3, the power generation level (Lo) of the generator 1 is kept to a level which enables the supply of electric power in the amount that corresponds to the ordinary loads 8b. In this way, the power is supplied from the generator 1 to the ordinary loads 8b instead of charging the auxiliary power source 3 during the deceleration of the vehicle. For example, on a long downward slope, even after the amount of regenerative electric power is stored in the auxiliary power source 3 (the fully charged state), the regenerative electric power is consumed by the ordinary loads 8b. Thus, the regenerative electric power can be used effectively.

The control operation of the second embodiment can be used irrespective of which of the main power source 2 and the auxiliary power source 3 has the higher output voltage (nominal voltage). That is, it can be used in the case where the output voltage (nominal voltage) of the main power source 2 is higher than that of the auxiliary power source 3, or in the case where the output voltage (nominal voltage) of the auxiliary power source 3 is higher than that of the main power source 2.

Third Embodiment

Figure 5:
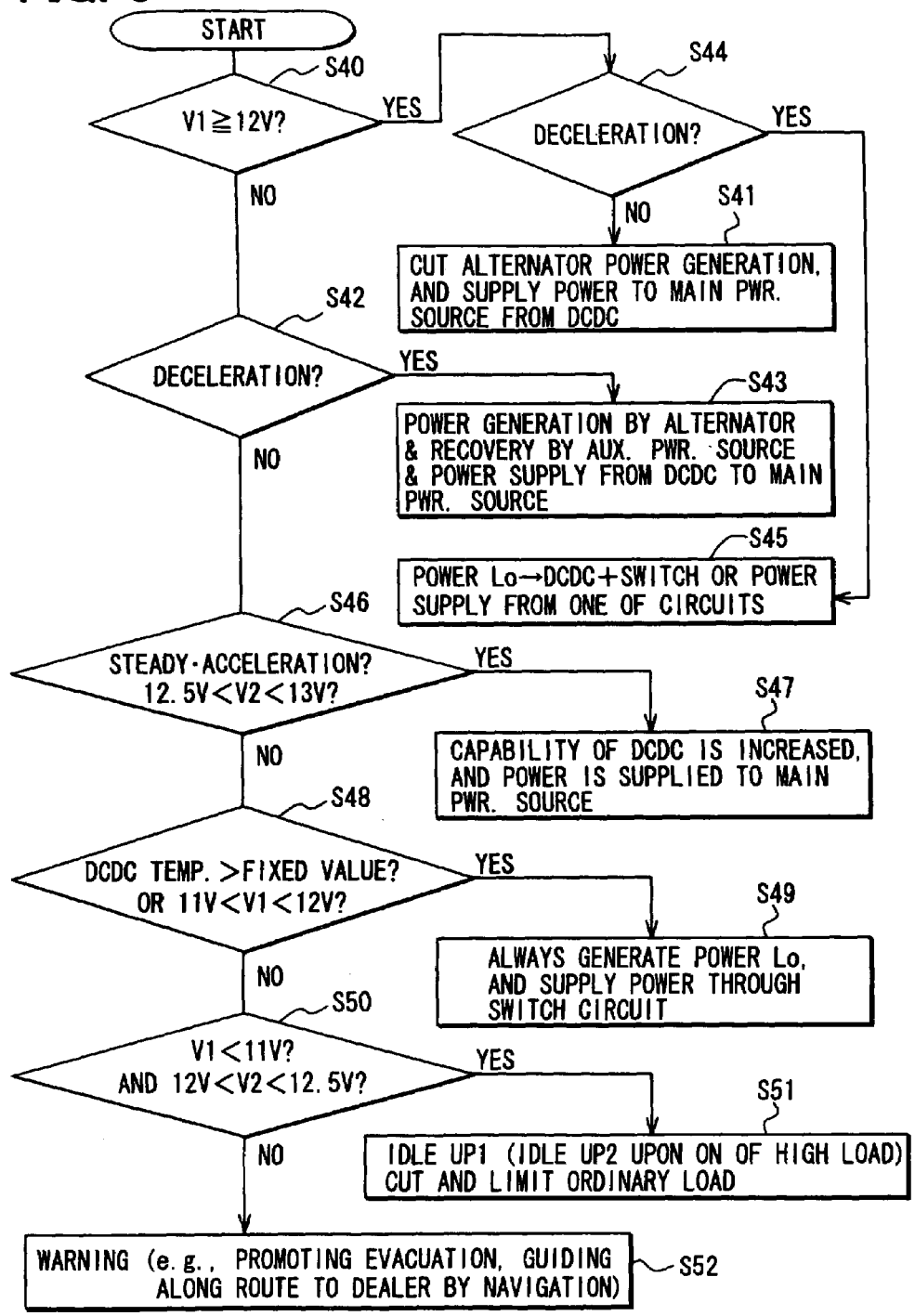
FIG. 5 is a control flowchart of a power supply system according to a third embodiment.

Next, as a third embodiment, a control operation of the generator 1 will be described with reference to a flowchart shown in FIG. 5. In this method, the control operation is carried out based on the power source voltages only without using a sensing means of a State of Charge (SOC).

At step 40, it is determined whether the output voltage V1 of the auxiliary power source 3 is equal to or above a fixed value (e.g., 12 V). When the determination result is YES, control proceeds to step 44. In contrast, when the determination result is NO, control proceeds to step 42. At step 44, it is determined whether the vehicle is decelerating. When the determination result at step 44 is NO, control proceeds to step 41. At step 41, since there is the surplus in the charge capacity of the auxiliary power source 3, power generation by the generator 1 is cut off, and electric power is supplied from the auxiliary power source 3 to the main power source 2 through the first supply circuit 5 (the DC/DC converter 4) (first control state).

At step 42, it is determined whether the vehicle is decelerating. When the determination result is YES, control proceeds to step 43. In contrast, when the determination result is NO, control proceeds to step 46. At step 43, regenerative electric power, which is generated by the generator 1, is recovered into the auxiliary power source 3, and electric power is also supplied to the main power source 2 through the first supply circuit 5 (first control state).

Returning to step 44, when the determination result is YES, control proceeds to step 45. At step 45, since the output voltage V1 of the auxiliary power source 3 is larger than the fixed value although the vehicle is in the decelerating state, regenerative electric power (Lo level), which is generated by the generator 1, is supplied to the main power source 2 through the first supply circuit 5 and the second supply circuit 7 (shown as a switch in the figure) (third control state). Alternatively, electric power is supplied to the main power source 2 through one the first supply circuit 5 and the second supply circuit 7. In this way, power supply, which corresponds to the ordinary loads 8b, is effected even in the fully charged state of the auxiliary power source 3, and it is possible to realize regeneration on deceleration by supplying power to the ordinary loads 8b instead of by charging.

At step 46, it is determined whether the vehicle is in the steady traveling state or in the accelerating state, and furthermore, whether the output voltage V2 of the DC/DC converter 4 is within a predetermined range (e.g., between 12.5 V and 13 V). When the determination result is YES, control proceeds to step 47. In contrast, when the determination result is NO, control proceeds to step 48. At step 47, the supply capability of the DC/DC converter 4 is increased, and electric power is supplied from the generator 1 to the main power source 2 through the first supply circuit 5 (first control state). This corresponds to the state where the charge level of the main power source 2 is reduced, and the output instruction to the DC/DC converter 4 is insufficient. Thus, in such a case, to counteract against this situation, the output of the DC/DC converter 4 is increased, and the charge level of the main power source 2 is kept to a relatively high level, so that deterioration of the main power source 2 caused by electrical discharge is limited.

At step 48, it is determined whether the temperature of the DC/DC converter 4 is greater than a fixed value, or whether the output voltage V1 of the auxiliary power source 3 is within a predetermined range (e.g., between 11 V and 12 V). When the determination result is YES, control proceeds to step 49. In contrast, when the determination result is NO, control proceeds to step 50. At step 49, the generator 1 is controlled to always generate electric power (Lo level), and electric power is supplied from the generator 1 to the main power source 2 through the second supply circuit 7 (second control state). This is performed to limit temperature increase of the DC/DC converter 4.

At step 50, it is determined whether the output voltage V1 of the auxiliary power source 3 is smaller than a fixed value (e.g., 11 V), and furthermore the output voltage V2 of the DC/DC converter 4 is within a predetermined range (e.g., between 12 V and 12.5 V). When the determination result is YES, control proceeds to step 51. In contrast, when the determination result is NO, control proceeds to step 52. At step 51, the first idle increase is carried out to increase the idle speed, and the supply of power to the ordinary loads 8b is cut off (or limited) since the charge capacity of the auxiliary power source 3 is low, and the output voltage V2 of the DC/DC converter 4 is also low even though the generator 1 is generating (at the Lo level). Furthermore, when the high load, which is among the ordinary loads 8b and which consumes a large amount of electric power, is turned on, the second idle increase is carried out to raise the idle speed further. Here, since the generated power level is low, and the supply of electric power from the DC/DC converter 4 cannot keep up, the idle increase is carried out to correspond with this situation. At step 52, the driver is notified, i.e., is warned about an abnormality of the power supply system S (the same as step 32).

According to the third embodiment, the output of the generator 1 can be effectively controlled according to the output voltage V1 of the auxiliary power source 3 and the output voltage V2 of the DC/DC converter 4.

Furthermore, since the generator 1 is connected to the high-performance auxiliary power source 3, the charge acceptance of which is higher than that of the main power source 2 and which allows easy detection of its operational state with high accuracy, it is possible to recover regenerative electric power generated by the generator 1 to the auxiliary power source 3 with good efficiency during the deceleration of the vehicle. That is, in order to recover a large amount of regenerative energy in the short time of deceleration, it is important to have a relatively large difference between the voltage of the generator 1 and the voltage of the power source (e.g., the voltage of the auxiliary power source 3).

Figure 6:
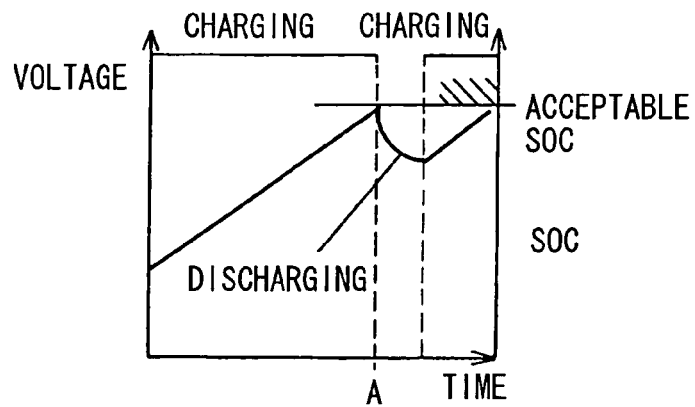
FIG. 6 is a graph illustrating regenerative charging during deceleration in the third embodiment.
Figure 6:
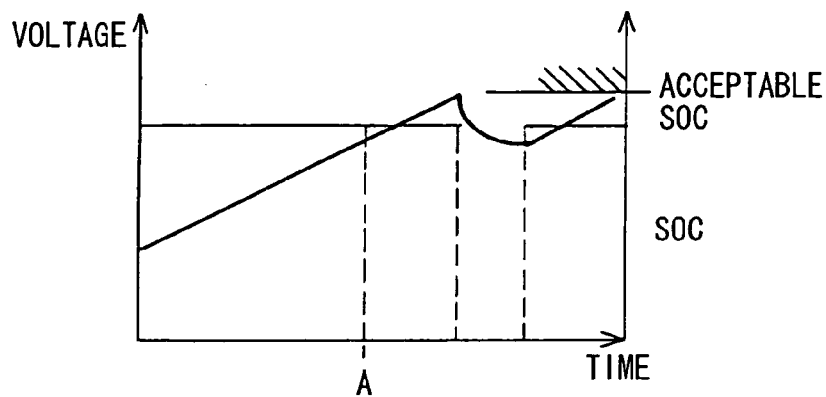
Figure 6:
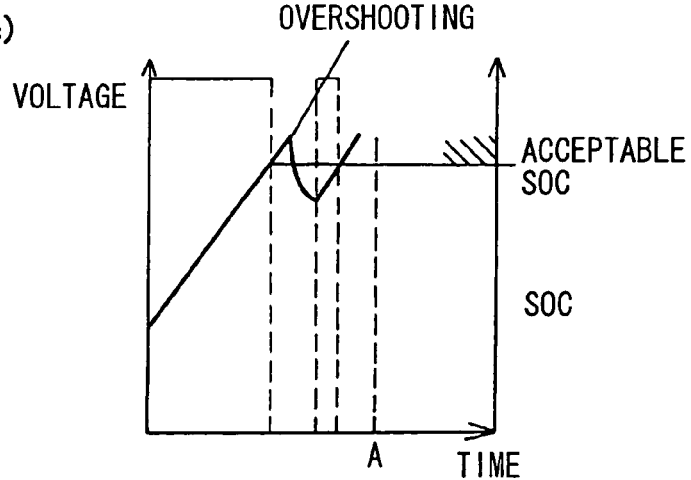

However, in the case (e.g., the case of the main power source 2, the charge acceptance of which is lower than that of the auxiliary power source 3) where the difference between the voltage of the generator 1 and the voltage of the power source is relatively small, and the internal resistance of the power source is relatively large, the power source 2 is not charged to an acceptable SOC within a predetermined deceleration time A, as shown in FIG. 6(b). In such a case, the power source cannot be charged sufficiently. Furthermore, when the difference between the voltage of the generator 1 and the voltage of the power source becomes excessively large, overshooting beyond the acceptable SOC occurs, as shown in FIG. 6(c). In such a situation, in the high performance battery, such as the auxiliary power source 3 (Li ion battery), heat production becomes large, and performance may be deteriorated due to increased internal resistance and so on.

In contrast, in the power supply system S, since the output voltage of the auxiliary power source 3, which recovers regenerative electric power during the deceleration of the vehicle, is smaller than that of the main power source 2 and the internal resistance of the auxiliary power source 3 is also small, the charge acceptance capability of the auxiliary power source 3 is good. Thus, as shown in FIG. 6(a), it is possible to recover a large amount of regenerative energy in the predetermined deceleration time A. As a result, it is possible to carry out maximum regenerative charging from the generator 1 to the auxiliary power source 3 within a short time of deceleration. Also, through the cutting of the power generation of the generator 1 in the steady traveling state or in the accelerating state, the load on the engine is reduced, thereby contributing to a reduction in the fuel consumption.

Figure 7:
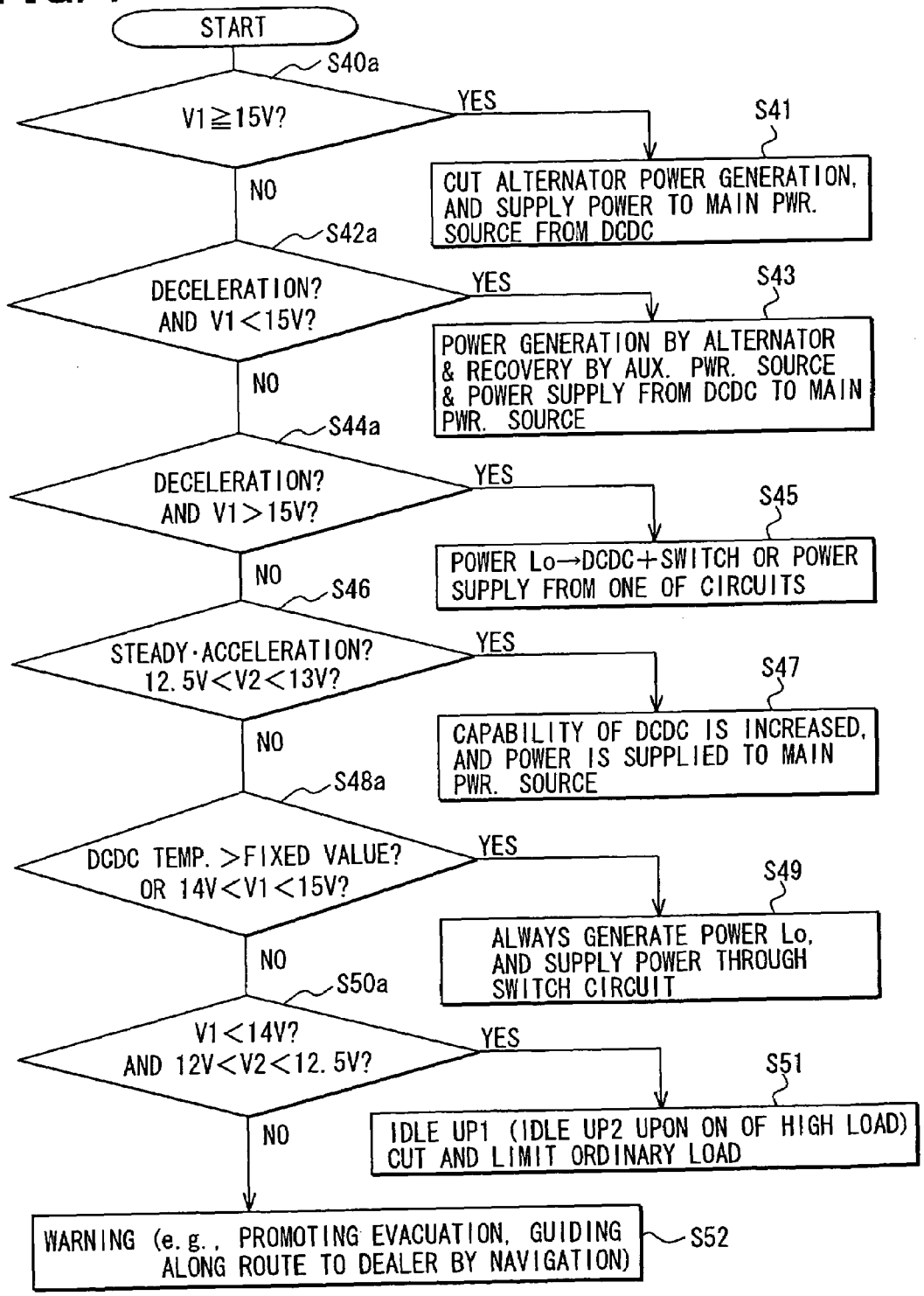
FIG. 7 is a control flowchart of a power supply system according to the third embodiment.

In the third embodiment, there is described the case where the output voltage (nominal voltage) of the auxiliary power source 3 is lower than that of the main power source 2. However, the same control operation can also be applied to a case where the auxiliary power source 3 has a higher output voltage (nominal voltage) over the main power source 2. However, since the output voltage of the auxiliary power source 3 becomes higher, the voltage determination values of the respective steps (S40, S42, S44, S48, S50 in FIG. 5) used in the determination of the output voltage V1 of the auxiliary power source 3 need to be changed accordingly. For example, the voltage determination values, which are used in the case where the output voltage (nominal voltage) of the auxiliary power source 3 is set to be 14.4 V, are shown in the flowchart of FIG. 7 (S40a, S42a, S44a, S48a, S50a).

Fourth Embodiment

Figure 8:
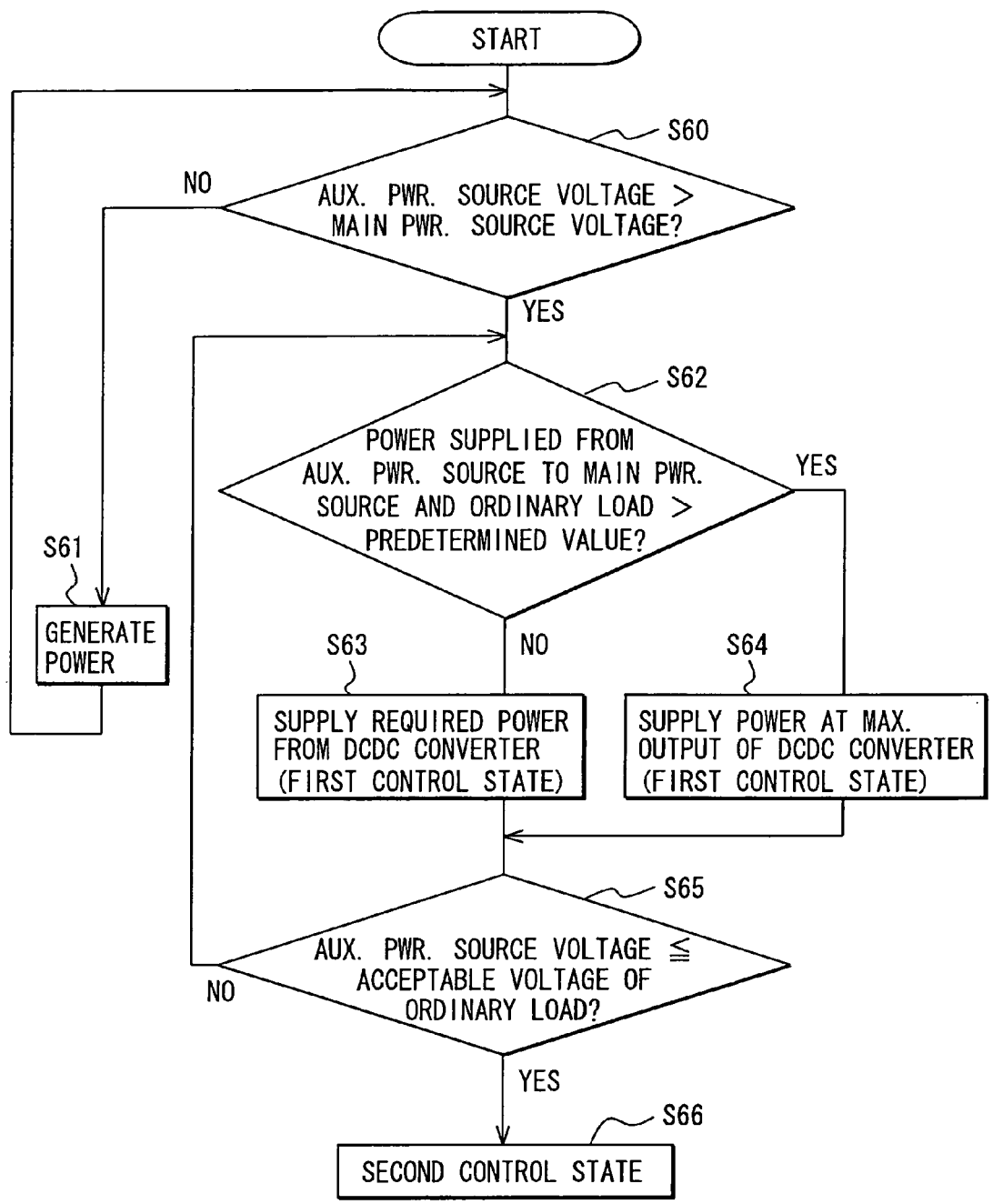
FIG. 8 is a control flowchart of a power supply system according to a fourth embodiment.

Next, as a fourth embodiment, a control operation in a case where the output voltage of the auxiliary power source 3 is higher than that of the main power source 2, will be described with reference to a flowchart shown in FIG. 8.

At step 60, it is determined whether the output voltage of the auxiliary power source 3 is higher than that of the main power source 2. When the determination result is NO (i.e. auxiliary power source voltage≦main power source voltage), control proceeds to step 61. In contrast, when the determination result is YES, control proceeds to step 62. At step 61, power generation is carried out by the generator 1, and the auxiliary power source 3 is charged. This process is continued until the output voltage of the auxiliary power source 3 becomes higher than that of the main power source 2.

At step 62, it is determined whether the level of electric power, which is supplied from the auxiliary power source 3 to the main power source 2 and the ordinary loads 8b, is above a predetermined value. When the determination result is NO, control proceeds to step 63. In contrast, when the determination result is YES, control proceeds, to step 64. At step 63, the first control state is selected. That is, the DC/DC converter 4 is driven (ON), and the switch 6 is opened (OFF). Thus, the required power is supplied from the auxiliary power source 3 to the main power source 2 and the ordinary loads 8b through the first supply circuit 5. In this control operation, for example, the voltage of the output side of the DC/DC converter 4 is controlled to have a fixed value. After that, control proceeds to step 65. In contrast, at step 64, the large amount of electric power needs to be supplied, so that the electric power is supplied at the maximum output of the DC/DC converter 4 (shortage of the electric power being compensated through discharge from the main power source 2).

At step 65, it is determined whether the output voltage of the auxiliary power source 3 is equal to or below the acceptable rated voltage of the ordinary loads 8b. When the determination result is YES, control proceeds to step 66. In contrast, when the determination result is NO, control returns to step 62. At step 66, the second control state is selected. That is, the DC/DC converter 4 is stopped (OFF), and the switch 6 is closed (ON). Thus, the electric power is supplied from the auxiliary power source 3 to the main power source 2 and the ordinary loads 8b through the second supply circuit 7.

According to the control operation of the fourth embodiment, an excessive voltage is not applied to the ordinary loads 8b, such as the lights, and therefore a reduction in the lifetime of the ordinary loads 8b can be limited. Furthermore, in the case where the output voltage of the auxiliary power source 3 has fallen to or below the acceptable rated voltage of the ordinary loads 8b, the path is shifted from the DC/DC converter 4 to the switch 6. Therefore, a loss associated with the DC/DC converter is eliminated, and thereby effective power supply can be implemented.

Fifth Embodiment

Figure 9:
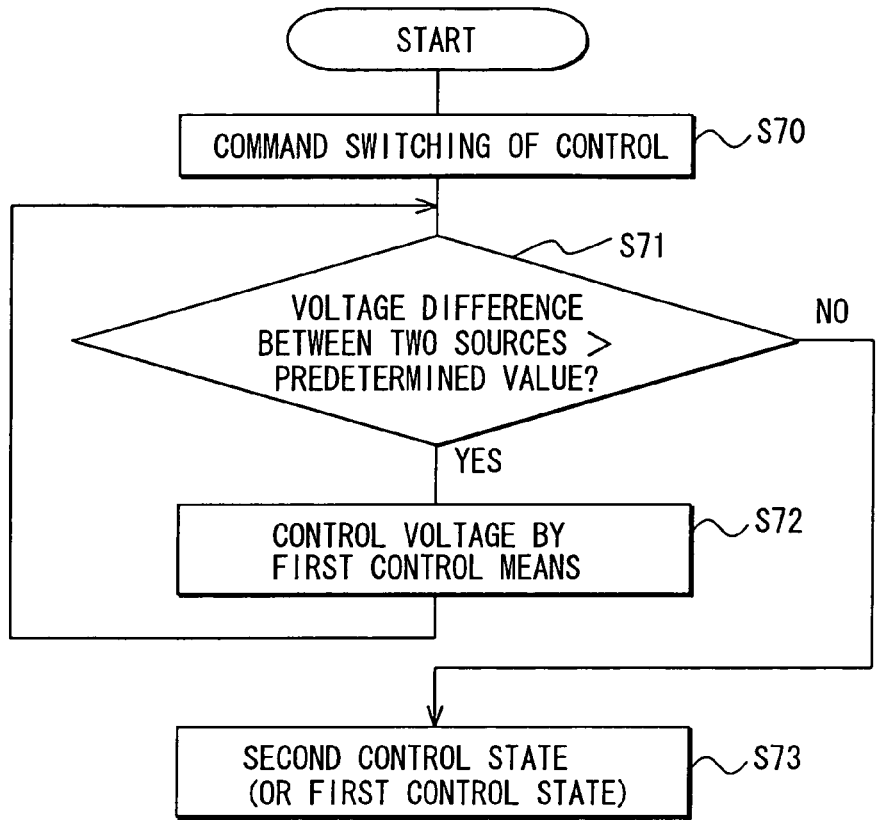
FIG. 9 is a control flowchart of a power supply system according to a fifth embodiment.

Next, as a fifth embodiment, a control operation performed at the time of switching from the first control state to the second control state or at the time of switching from the second control state to the first control state will be described with reference to a flowchart of FIG. 9.

At step 70, a switch command for switching the control state is issued. Specifically, switch command is a command for switching from the first control state to the second control state or a command for switching from the second control state to the first control state. At step 71, it is determined whether the voltage difference between the main power source 2 and the auxiliary power source 3 is greater than a predetermined value. When the determination result is YES, control proceeds to step 72. In contrast, when the determination result is NO, control jumps to step 73.

At step 72, the ECU 17 (serving as a first control means) controls the output voltage of the DC/DC converter 4. More specifically, at step 72, the output voltage of the DC/DC converter 4 is increased to a higher one of the voltage of the main power source 2 and the voltage of the auxiliary power source 3 or is decreased to a lower one of the voltage of the main power source 2 and the voltage of the auxiliary power source 3. Thereafter, control returns to step 71. At step 73, the second control state (or the first control state) is selected since the voltage difference between the main power source 2 and the auxiliary power source 3 is smaller than the predetermined value.

According to the control operation of the fifth embodiment, the voltage fluctuations at the time of switching the control state (e.g., at the time of switching on of the switch 6 provided in the second supply circuit 7) are limited, so that, for example, flickering of the lights can be limited.

Sixth Embodiment

Figure 10:
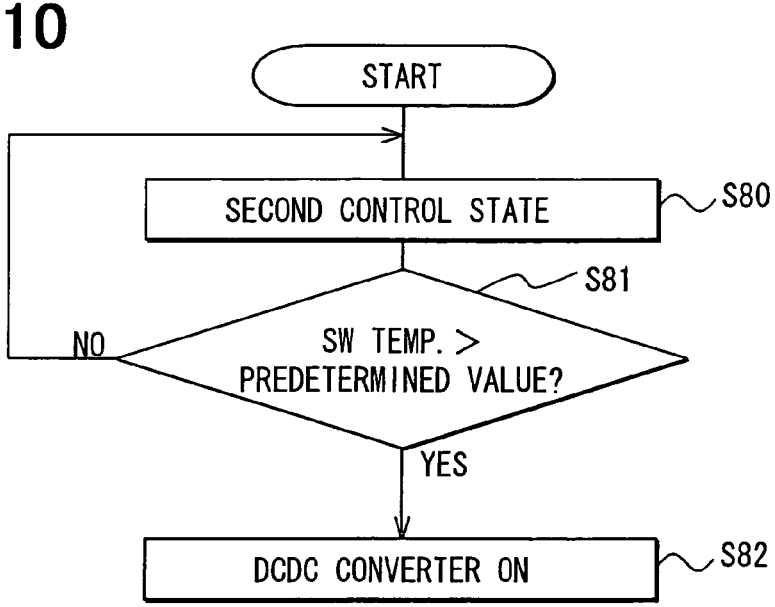
FIG. 10 is a control flowchart of a power supply system according to a sixth embodiment.

Next, as a sixth embodiment, a control operation at the time of switching from the second control state to the third control state (i.e., at the time of supplying electric power through use of both the DC/DC converter 4 and the switch 6) will be described with reference to a flowchart shown in FIG. 10.

At step 80, the second control state is selected. That is, the switch 6 is closed (ON), and electric power is supplied through the second supply circuit 7. At step 81, it is determined whether the temperature of the switch 6 is increased beyond a predetermined value. When the determination result is YES, control proceeds to the following step 82. In contrast, when the determination result is NO, control returns to step 80.

At step 82, the DC/DC converter 4 is driven (ON), and the control state is switched to the third control state. That is, power supply is carried out using both the first supply circuit 5 and the second supply circuit 7.

According to the sixth embodiment, when the temperature of the switch 6 is increased beyond the predetermined value, electric power is supplied through the second supply circuit 7, which has the switch 6, and also through the first supply circuit 5, which has the DC/DC converter 4. Thus, the heat generation of the switch 6 can be limited.

Seventh Embodiment

Figure 11:
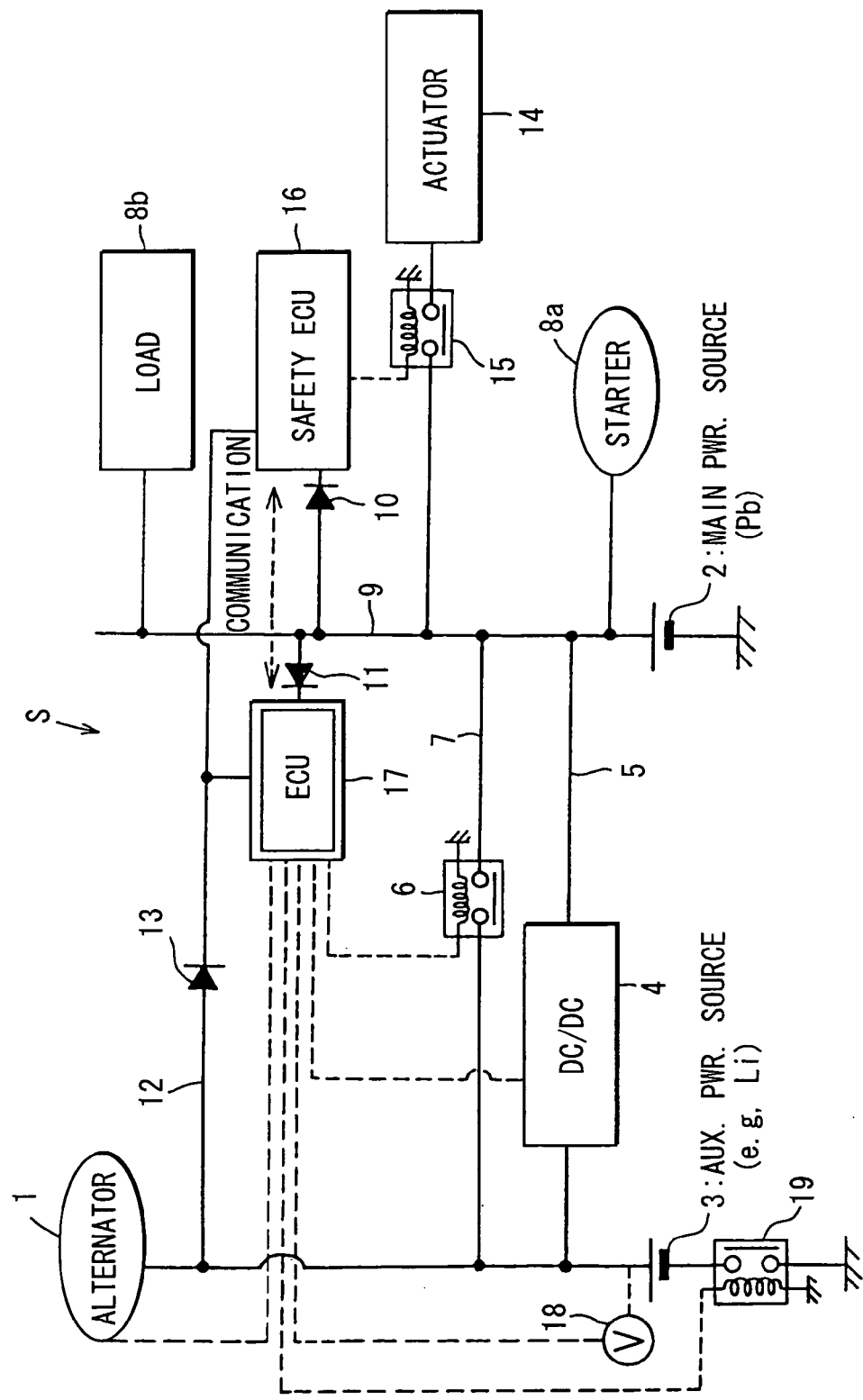
FIG. 11 is an electrical circuit diagram of a power supply system according to a seventh embodiment.

FIG. 11 is an electrical circuit diagram of a power supply system S according to a seventh embodiment. In the power supply system S of the seventh embodiment, as shown in FIG. 11, an auxiliary power source switch 19 (e.g., a relay switch) is connected to the anode side of the auxiliary power source 3, and the auxiliary power source switch 19 is controlled by the system ECU 17.

With this construction, for example, when the auxiliary power source 3 fails, the auxiliary power source switch 19 is switched off at the time of evacuating the vehicle to a safe place or at the time of driving the vehicle to an automobile dealer. Thus, the auxiliary power source 3 is electrically isolated from the power system S. As a result, the safety of the power supply system S is ensured.

In the case where electrical loads, which consume a relatively large amount of electric power among ordinary loads 8b, are operated, the auxiliary power source switch 19 may be switched off to reliably supply the electric power from the generator 1 to the main power source 2 and the ordinary loads 8b. This is true even when the electric power is supplied from the generator 1 through the first supply circuit 5 or through the second supply circuit 7 or through both the first and second supply circuits 5, 7.

Also, in a case where the vehicle is equipped with an idle stop device, which automatically stops the engine when the vehicle has stopped, for example, at a red traffic light at an intersection, the auxiliary power switch 19 may be turned off at the time of stopping the engine, for example, at the red traffic light to effectively enable the next engine start (re-starting after the automatic stop). By turning off the auxiliary power source switch 19, the required electrical capacity that is required for the restarting of the engine can be ensured at the time of restarting the engine.

Also, when rapid charging is carried out on the deceleration of the vehicle in the state where the 100% capacity voltage of the auxiliary power source 3 is smaller than the output voltage of the generator 1, the auxiliary power source switch 19 may be turned off. In this way, in a case of encountering a failure, such as control failure of the power generation, the excessive charging of the auxiliary power source 3 can be cut by turning off the auxiliary power switch 19.

Figure 12:
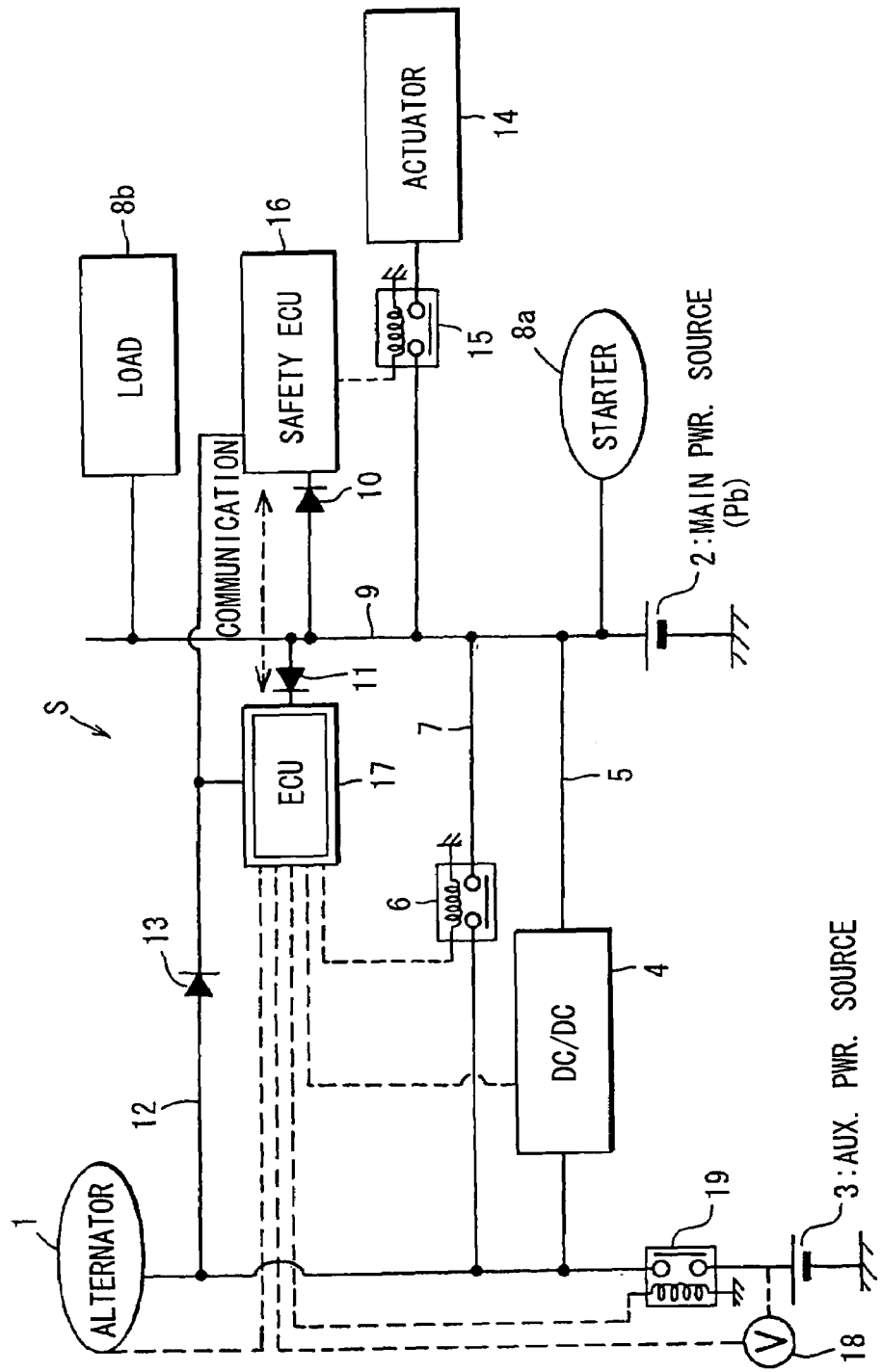
FIG. 12 is an electrical circuit diagram of a power supply system according to the seventh embodiment.
Figure 13:
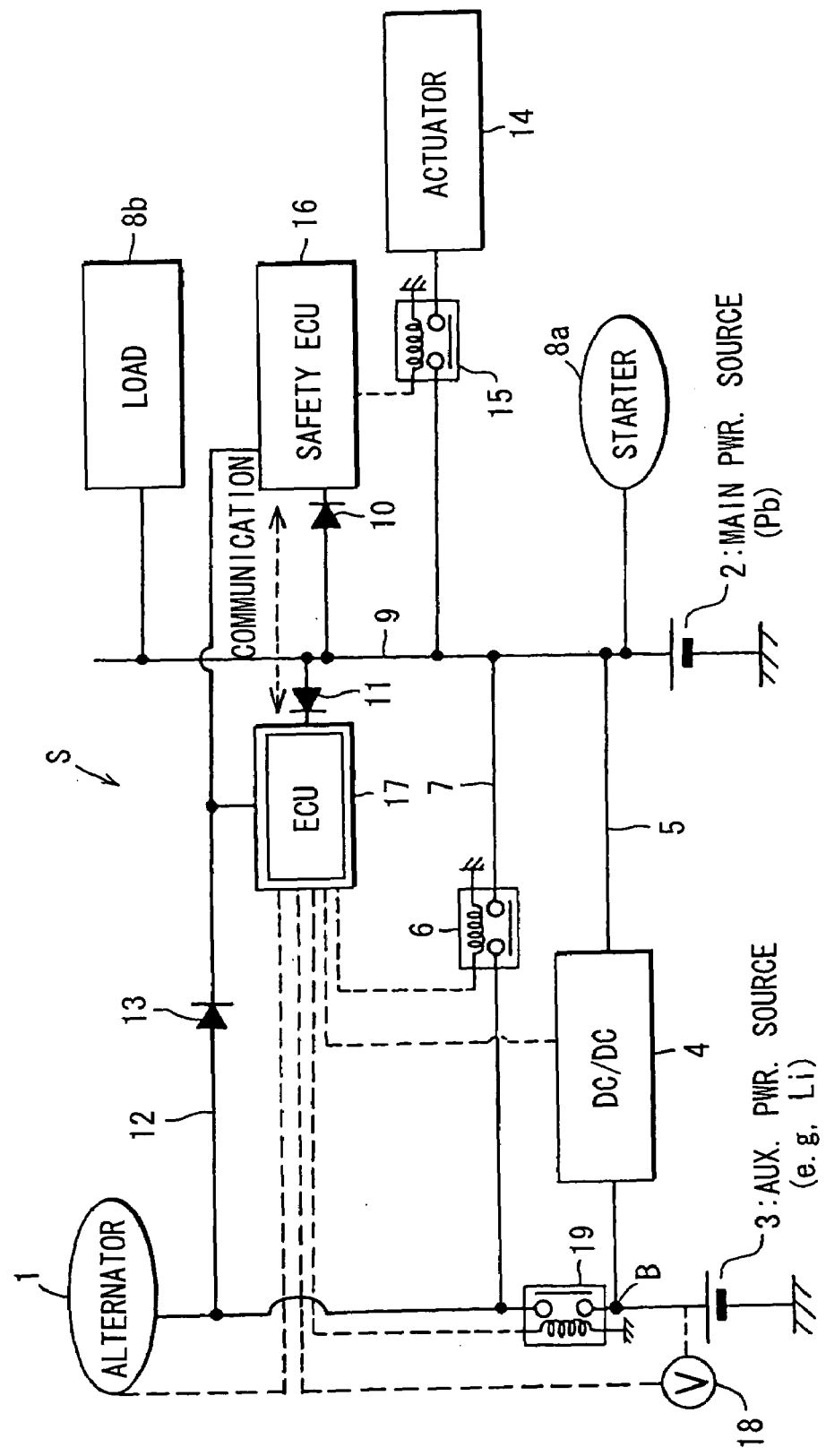
FIG. 13 is an electrical circuit diagram of a power supply system according to the seventh embodiment.

The auxiliary power source switch 19 may be alternatively connected to the cathode side of the auxiliary power source 3, as shown in FIG. 12 or FIG. 13. In the example shown in FIG. 13, the auxiliary power source switch 19 is disposed between the generator 1 and the auxiliary power source 3 on the generator 1 side of the input side connection point B of the DC/DC converter 4.

Eighth Embodiment

Figure 14:
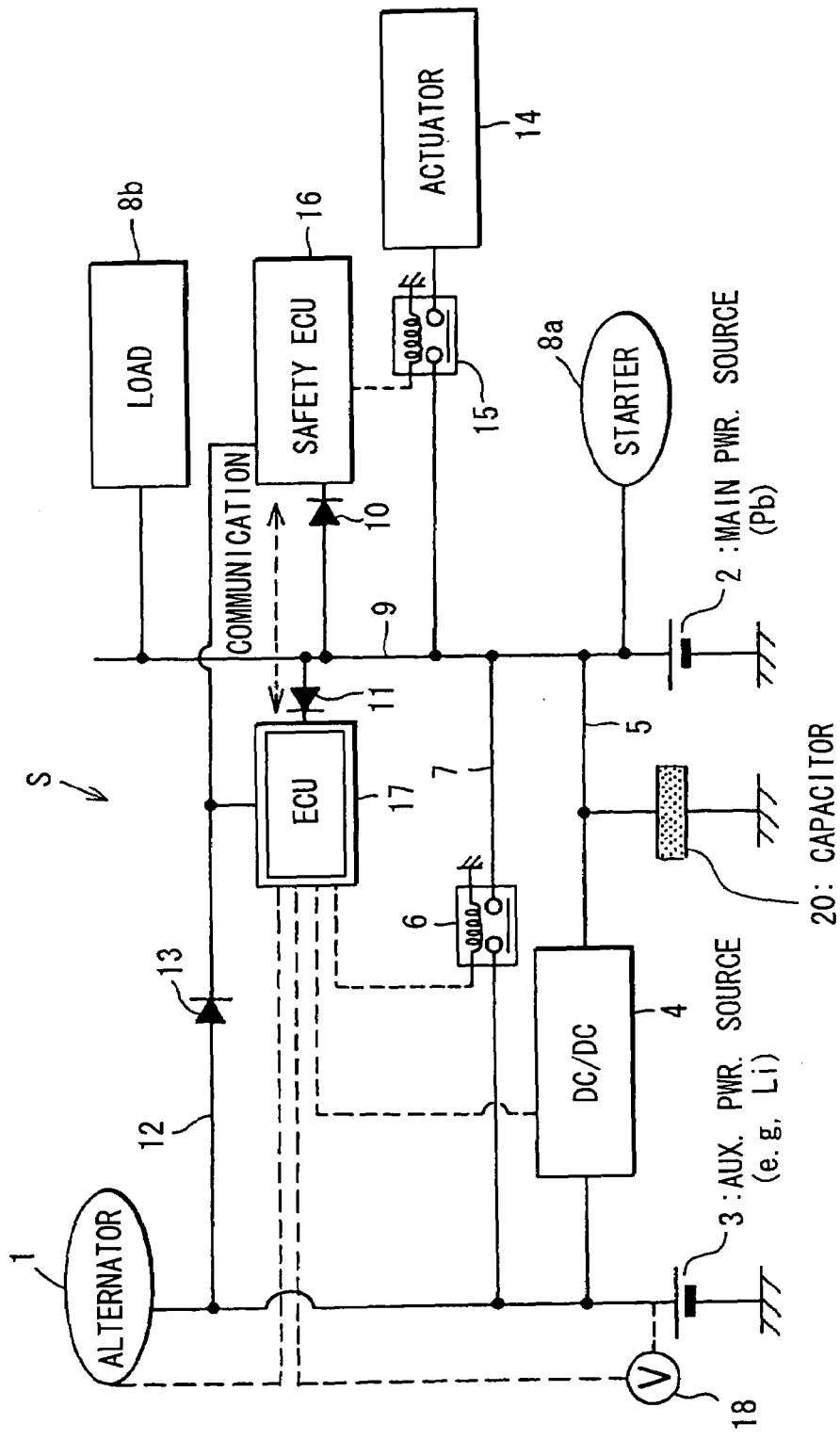
FIG. 14 is an electrical circuit diagram of a power supply system according to an eighth embodiment.

FIG. 14 is an electrical circuit diagram of a power supply system S according to an eighth embodiment. In the power supply system S of the eighth embodiment, as shown in FIG. 14, a capacitor 20 is connected to the output side (the main power source 2 side) of the DC/DC converter 4 of the first supply circuit 5. When a relatively large power is supplied from the DC/DC converter 4 to the main power source 2, the capacitor 20 smoothes the voltage. In this way, it is possible to supply a more stable voltage to the main power source 2 through the DC/DC converter 4.

Ninth Embodiment

Figure 15:
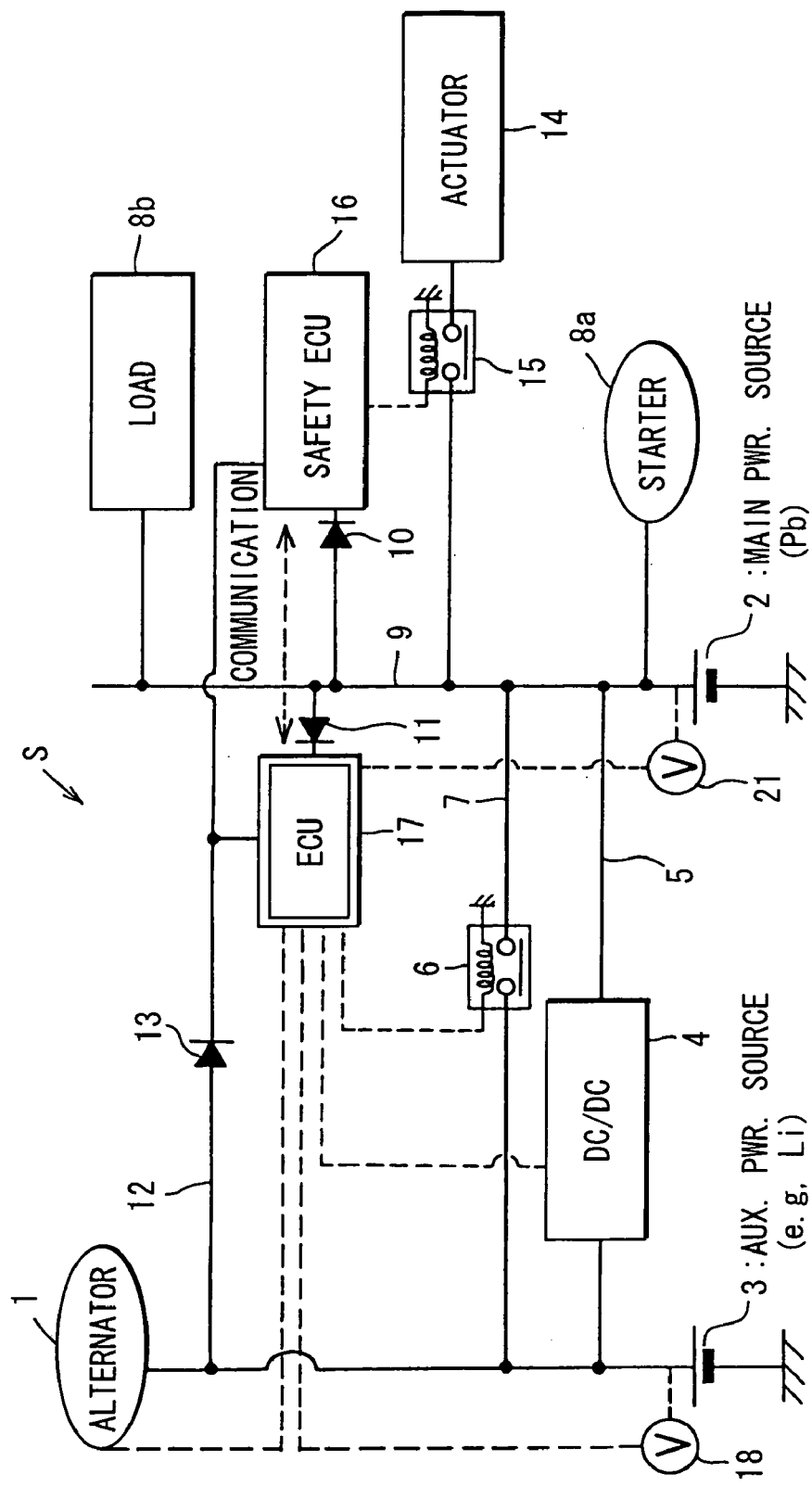
FIG. 15 is an electrical circuit diagram of a power supply system according to a ninth embodiment.

FIG. 15 is an electrical circuit diagram of a power supply system S according to a ninth embodiment. In the power supply system S of the ninth embodiment, as shown in FIG. 15, the charge acceptance capability of the main power source 2 is sensed by monitoring the output voltage of the main power source 2 with a voltmeter 21 or the like. In this way, detecting the charge acceptance capability of the main power source 2 with a sensor (e.g., a sensor for sensing the current, the voltage, or the temperature), so a low-cost system can be realized.

Tenth Embodiment

Figure 16:
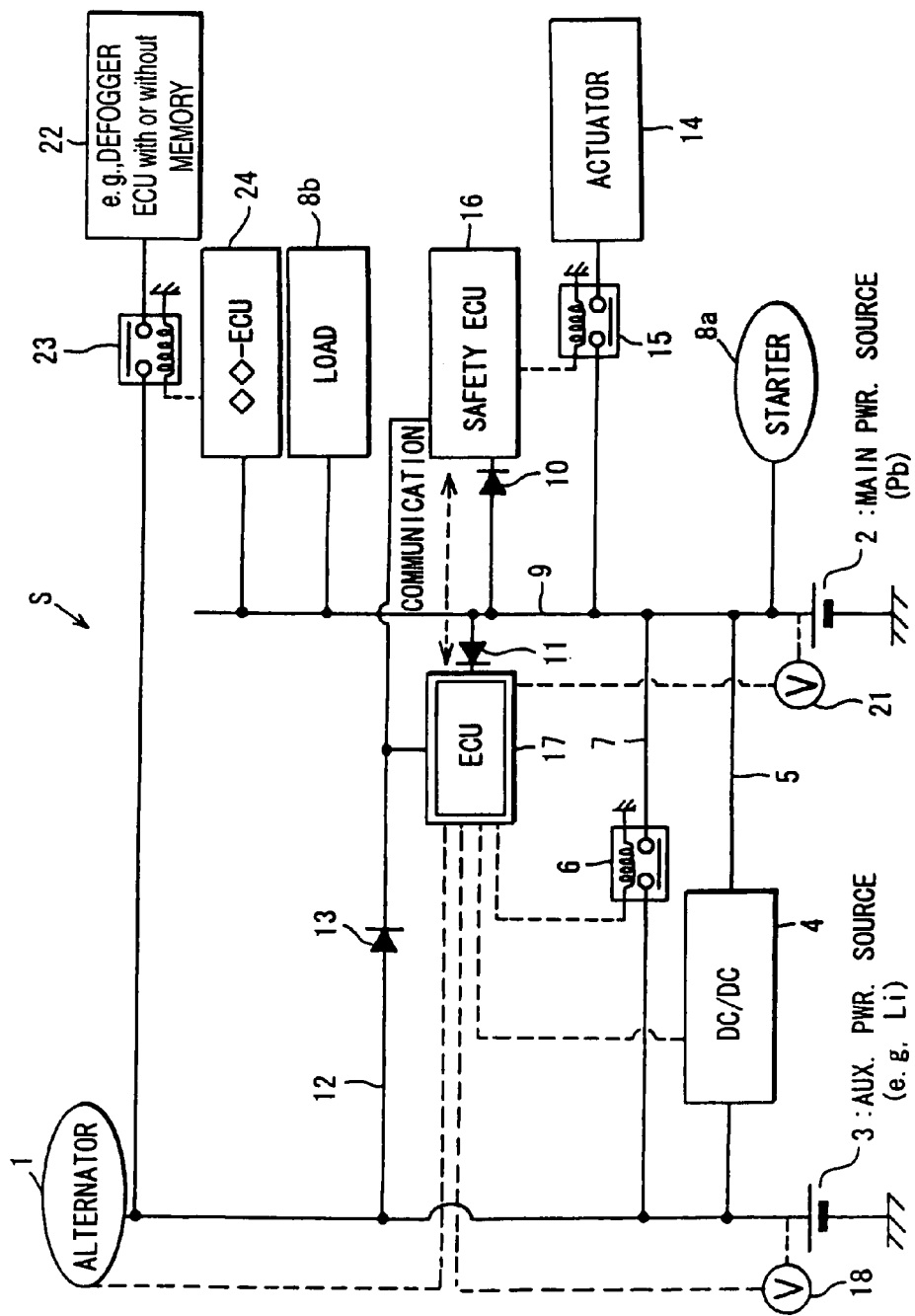
FIG. 16 is an electrical circuit diagram of a power supply system according to a tenth embodiment.

FIG. 16 is an electrical circuit diagram of a power supply system S according to a tenth embodiment. In the power supply system S of the tenth embodiment, as shown in FIG. 16, electrical loads 22 (e.g., a defogger, a seat heater), which tolerate voltage fluctuations and do not require a dark current, are connected to the auxiliary power source 3 and the generator 1 through a relay 23 rather than connecting to the main power source 2. The electrical load, which does not require the dark current, may be one of an electrical load, such as an ECU that does not have an internal memory, and an electrical load, such as an ECU that always uses an initial constant of an internal memory. A controller 24 (an ECU), which opens and closes the relay 23, is connected to the main power source 2 and receives a power supply from the main power source 2.

In this way, the power source (the dark current) only to the resettable loads (i.e., loads that can be properly reset even upon a power interruption) can be cut to limit complete discharging of the battery 2, which occurs, for example, over a time during which the vehicle is parked for an extended period (e.g., weeks, months or years), or over a time of unintentionally leaving the vehicle door open to cause the lamp in the vehicle to be turned and left on for hours or days. Thereby, the deterioration of the lifetime of the main power source 2 and the deterioration of the performance of the main power source 2 can be limited. Furthermore, the electrical loads 22, which do not require the dark current, can receive electric power from the auxiliary power source 3 or the generator 1. The means for cutting off the dark current (dark current blocking means of the present invention) may include the following, i.e., a) a means having a timer function for cutting off a dark current after fixed time; b) a means for sensing the capacity of the auxiliary power source 3; c) a means for receiving an external communication signal; d) a means for sensing termination of signal transmission or signal reception at a radio transmitter; and e) a switch, such as a touch panel switch at an exterior of the vehicle.

Eleventh Embodiment

Figure 17:
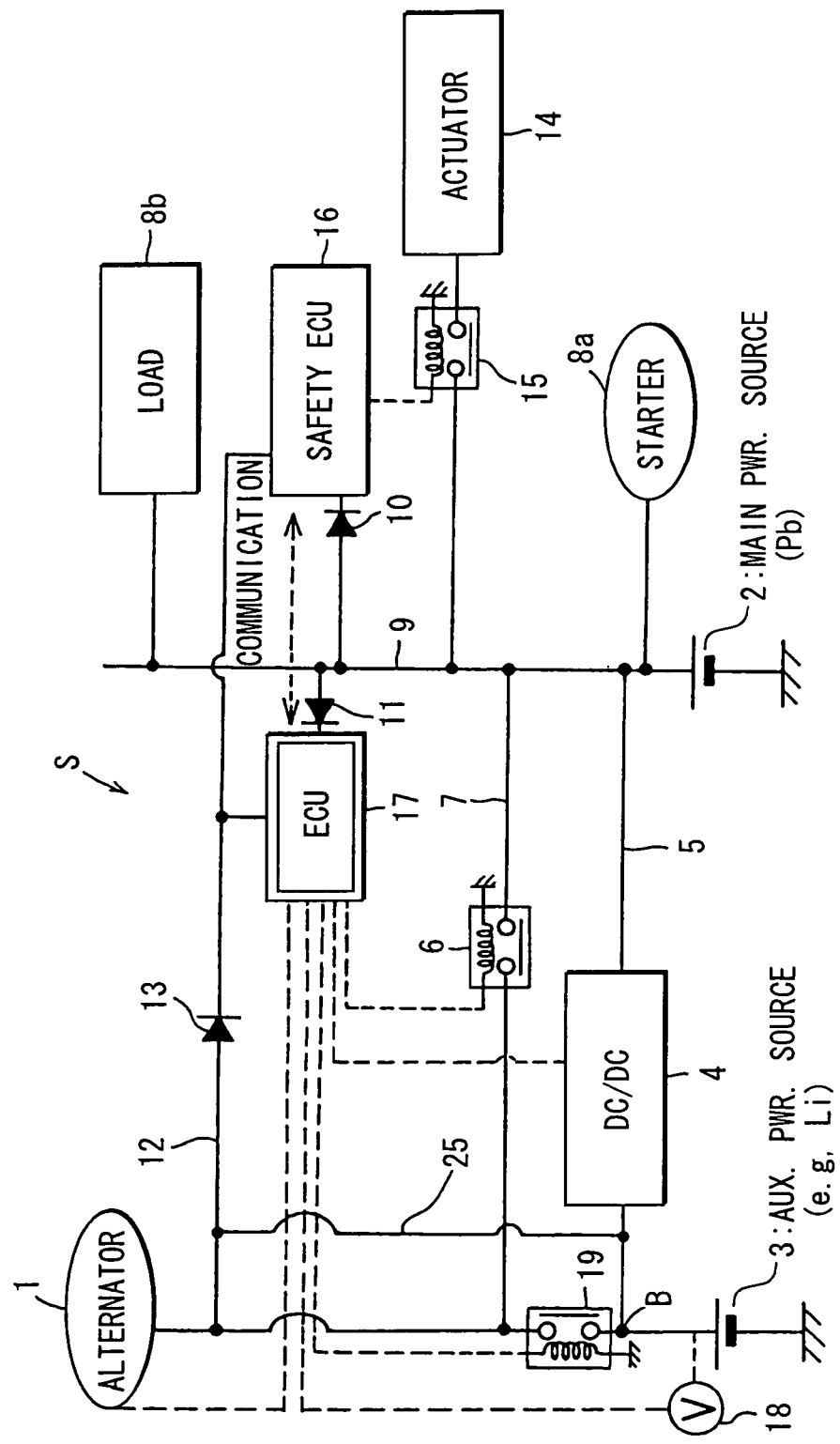
FIG. 17 is an electrical circuit diagram of a power supply system according to an eleventh embodiment.

FIG. 17 is an electrical circuit diagram of a power supply system S according to an eleventh embodiment. In the power supply system S of the eleventh embodiment, a bypass circuit 25, which is connected to the fourth supply circuit 12 while bypassing the auxiliary power source switch 19, is provided to the circuit of FIG. 13, which includes the auxiliary power switch 19.

In this way, even in the case where the auxiliary power source switch 19 is turned off, electric power can be supplied from the main power source 2 or the auxiliary power source 3 to the safety ECU 16. Thus, the redundant system is provided to the safety ECU 16, which is involved in the travel safety.

Twelfth Embodiment

Figure 18:
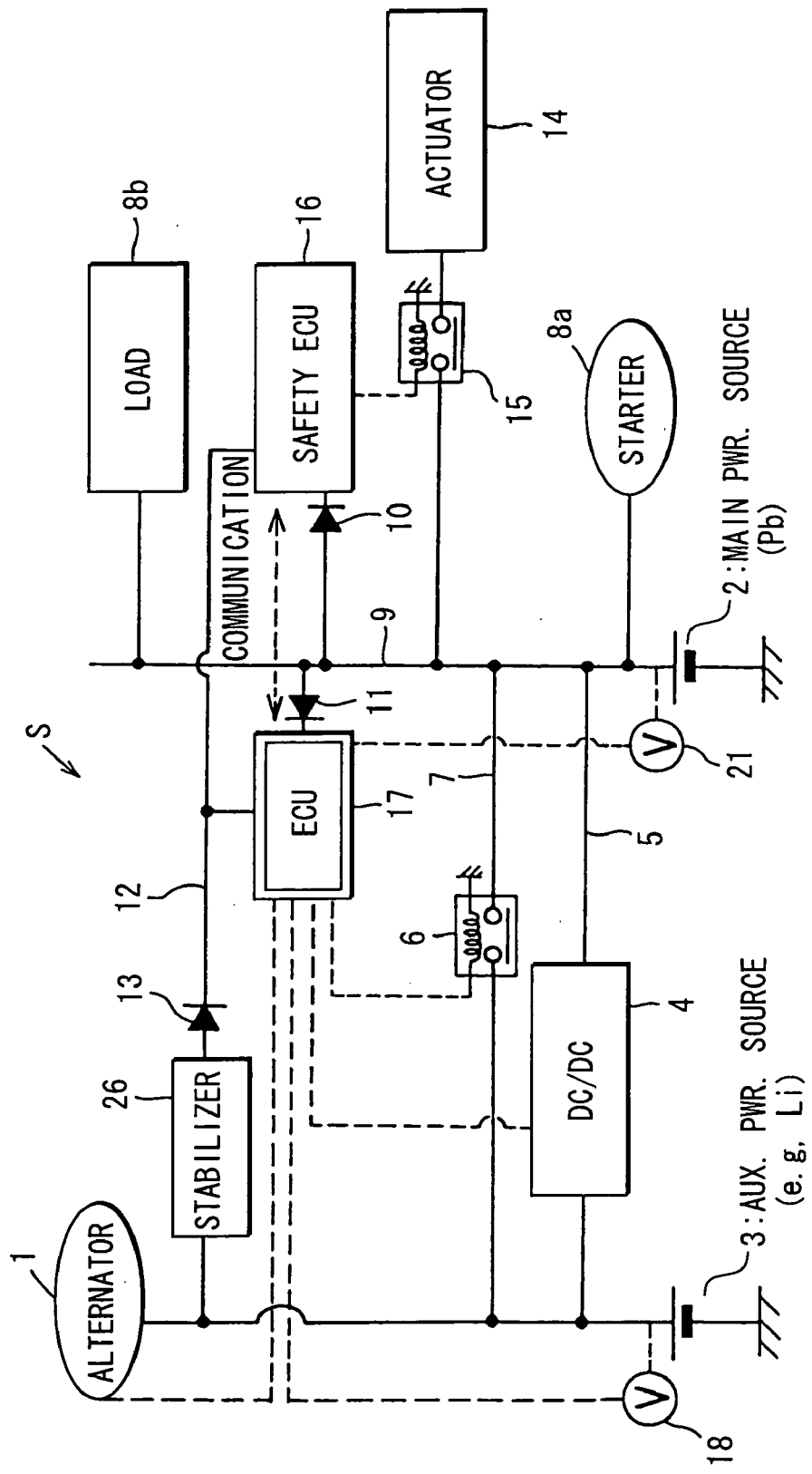
FIG. 18 is an electrical circuit diagram of a power supply system according to a twelfth embodiment.

FIG. 18 is an electrical circuit diagram of a power supply system S according to a twelfth embodiment. The power supply system S of the twelfth embodiment is implemented by modifying, for example, the circuit diagram (see FIG. 15) of the ninth embodiment in such a manner that a voltage stabilizer 26 is provided to the fourth supply circuit 12. In this way, the minimum guaranteed voltage can be reliably supplied to the system ECU 17, which is an important load.

(Variations)

In the first embodiment, the two power sources (the main power source 2 and the auxiliary power source 3), which are used in the power supply system S of the first aspect of the present application, are described such that the nominal voltage (or the nominal capacity) of the main power source 2 is higher than that of the auxiliary power source 3. However, alternative to this construction, the nominal voltage (or the nominal capacity) of the auxiliary power source 3 may be higher than that of the main power source 2. Further alternatively, the main power source 2 and the auxiliary power source 3 may have a common operational range, in which a working voltage of the main power source 2 coincides with a working voltage of the auxiliary power source 3.

In the first embodiment, the Pb battery and the Li ion battery are described as examples of the main power source 2 and the auxiliary power source 3, respectively. However, the present invention is not limited to this. For example, besides the Pb battery, the main power source 2 may be a Li ion battery or a Ni hydrogen battery. Also, besides the Li ion battery, the auxiliary power source 3 may be a Pb battery, a Ni hydrogen battery or an electrical double-layer capacitor.

Furthermore, in the first embodiment, the alternator is used as the generator 1. Alternative to the alternator, a motor generator, which has a power generating function, may be used. Furthermore, the generator 1 does not have to be belt-driven by the engine. For example, the generator 1 may alternatively be connected to a wheel axle or a crankshaft through a transmitting means, such as a gear or a belt. Further alternatively, the generator 1 may be directly connected to the wheel axle or the crankshaft. Further alternatively, a heat-regenerating generator, which is capable of generating electric power by converting thermal energy into kinetic energy, may be used. Also, a thermoelectric device, which is capable of directly converting thermal energy into electrical energy, may be used.

Thirteenth Embodiment

Figure 19:
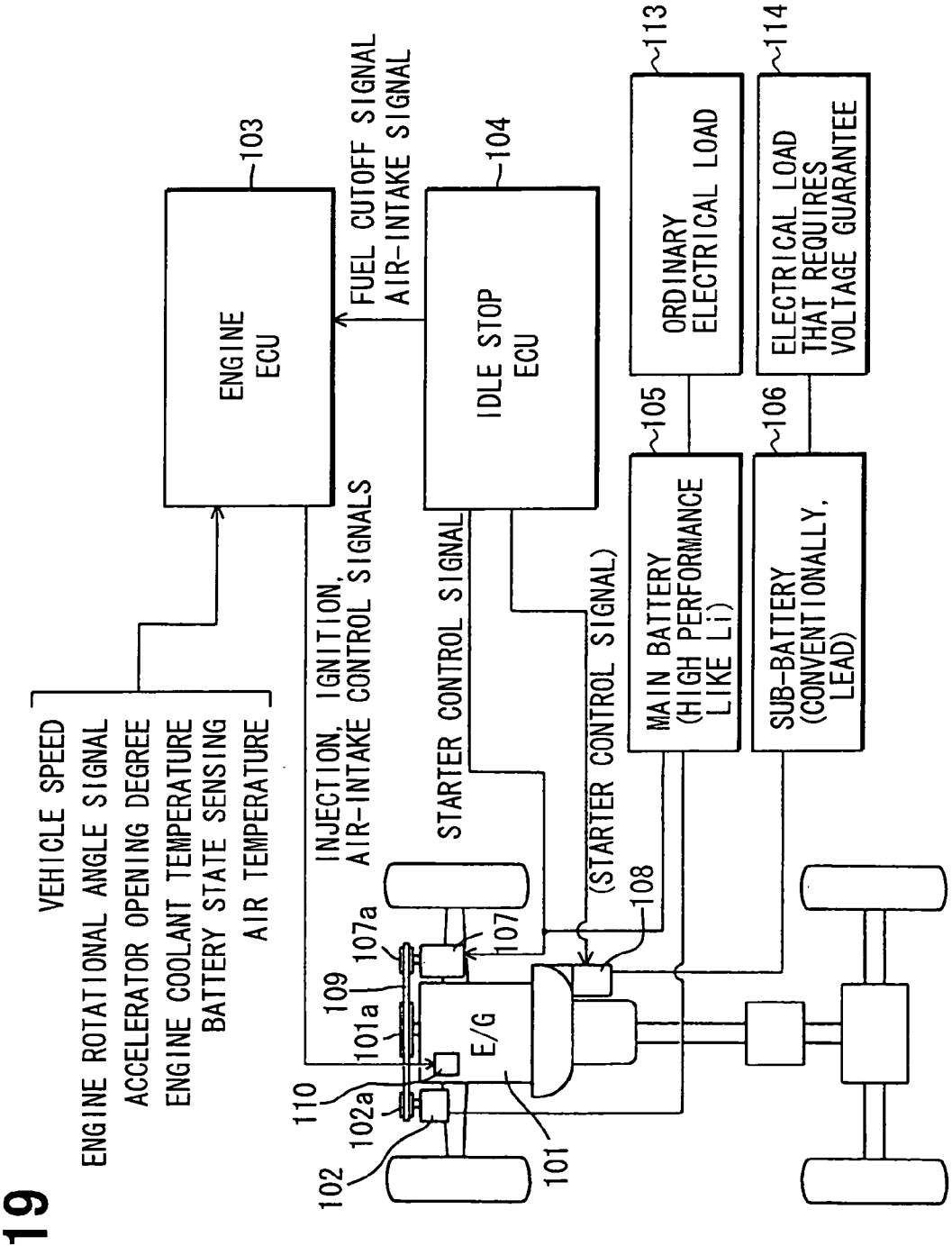
FIG. 19 is an overall view of an engine starting system according to a thirteenth embodiment.
Figure 20:
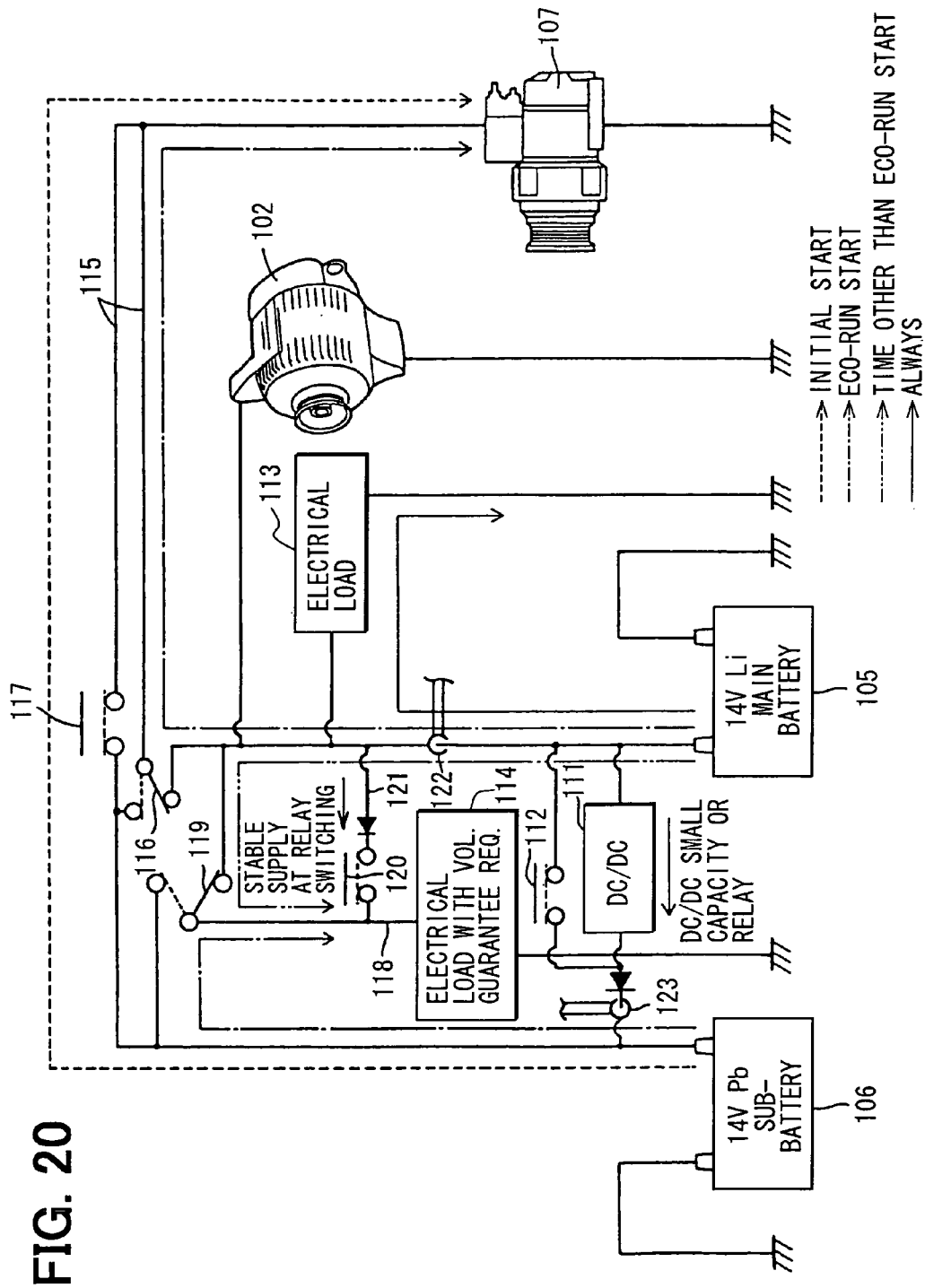
FIG. 20 is a circuit diagram of a power supply system according to the thirteenth embodiment.

Next, a vehicle power supply system of a thirteenth embodiment according to a second aspect of the present application will be described. FIG. 19 is an overall view of an engine starting system (which will be referred to as a main system) to which the vehicle power supply system according to the thirteenth embodiment is applied. FIG. 20 is a circuit diagram of the vehicle power supply system.

The present system is mounted on the vehicle, which has an idle stop function. Furthermore, as shown in FIG. 19, the present system includes a starting device (discussed below), an alternator 102 (a generating means of the present invention), an engine ECU 103, an idle stop ECU 104 and two batteries 105, 106. The starting device starts an engine 101. The alternator 102 (generating means of the invention) is driven by the engine 101 to generation electric power. The engine ECU 103 controls an operational state of the engine 101. The idle stop ECU 104 controls the idle stop function.

The idle stop function is a function for automatically stopping the engine 101, for example, at the time of stopping the vehicle at an intersection and then automatically restarting the engine 101 at the time of satisfying an engine start condition (e.g., at the time of removing a foot of a driver from a brake pedal).

The starting device includes a starter 107 of a belt type and a starter 108 of a gear type. The starter 107 of the belt type is given the higher priority than the starter 108 of the gear type. The starter 108 of the gear type is used in a case where the engine start operation, which is carried out by the starter 107 of the belt type, is out of a predetermined state, for example, at the time of malfunctioning of the starter 107, the engine 101 or the belt.

In the starter 107 of the belt type, a starter pulley 107a, which is attached to the output shaft of the motor, is connected to a crank pulley 101a, which is attached to the crankshaft of the engine 101, through a belt 109, and the rotational force of the motor is conducted to the crank pulley 101a through the belt 109 to start the engine.

In the starter 108 of the gear type, for example, a pinion gear (not shown) is meshed with a ring gear (not shown) of the engine 101, and then the rotational force of the motor is conducted from the pinion gear to the ring gear to start the engine.

Similar to the starter 107 of the belt type, in the alternator 102, a pulley 102a of the alternator 102 and the crank pulley 101a are always connected to each other through the belt 109.

The engine ECU 103 calculates fuel injection quantities and ignition timings to obtain an optimal air/fuel ratio in the engine 101. The engine ECU 103 electronically controls an EFI (Electronic Fuel Injection apparatus) 110 based on the result of the calculations. Various sensors (not shown) for sensing the running state of the engine 101, the battery state and the external air temperature are connected to the engine ECU 103. Information, which is required to control the engine, is inputted from these sensors. The information include, for example, the vehicle speed, the engine rotational angle signal, the accelerator opening degree, the engine coolant temperature, the battery states, the voltages, the currents, the temperatures, and the external air temperature.

When a predetermined engine stop condition is satisfied (e.g., the vehicle speed is 0 km/h and the brake pedal is pressed), the idle stop ECU 104 outputs an engine stop signal (a fuel cutoff signal and an ignition cutoff signal) to the engine ECU 103. When the above-mentioned engine start condition is satisfied, the idle stop ECU 104 outputs an engine start signal (a fuel injection signal and an ignition signal) to the engine ECU 103. Furthermore, when an abnormality is sensed in the engine start operation performed by the starter 107 of the belt type, the starter 107 of the belt type is switched to the starter 108 of the gear type.

The two batteries 105, 106 include a high-performance main battery 105 (e.g., a Li ion battery, a nickel type battery or an electrical double-layer capacitor) and a sub-battery 106 having better discharge characteristics at low temperatures over the main battery 105 (e.g., a lead battery). The term "High-performance" means superior with respect to some of the following points (1) to (6). These points (1) to (6) include (1) energy density, (2) output density, (3) cycle life, (4) battery state detectability (SOC, HOC etc.), (5) discharge depth and (6) charge acceptance capability.

Next, the circuit construction of the vehicle power supply system and a method of using the batteries 105, 106 will be described with reference to FIG. 20.

In the vehicle power supply system of the thirteenth embodiment, regenerative energy, which is generated by the alternator 102 during deceleration of the vehicle, is recovered to the main battery 105. Then, the sub-battery 106 is charged with a micro current from this main battery 105 through, for example, a DC/DC converter 111. This charging of the sub-battery 106 from the main battery 105 is carried out when the voltage difference between the main battery 105 and the sub-battery 106 is smaller than a predetermined value, or when the power generation of the alternator 102 is stopped. In place of the DC/DC converter 111, a relay switch 112 shown in FIG. 20 may be provided. Charging may be started when this relay switch 112 is turned on.

The main battery 105 is used mainly for the following purposes (a) to (d), i.e., (a) supplying power to ordinary electrical loads 13 mounted on the vehicle; (b) supplying power to the starter 107 when the engine temperature (or a battery temperature) during the engine start operation is in a normal range (discussed below); (c) supplying power to electrical loads 114, which require a voltage guarantee (e.g., a braking system, a steering system, a navigation system), at the time of supplying power from the sub-battery 106 to the starter 107; and (d) supplying power (supplying dark currents) to the ordinary electrical loads 113 after the engine is stopped by turning off of the IG key.

The sub-battery 106 is mainly used for the following purposes (e) and (f), i.e., (e) supplying power to the starter 107 when the engine temperature during the engine start operation is in an extremely low temperature range, a low temperature range or a high temperature range (discussed below); and (b) supplying power to the electrical loads 114, which require a guaranteed voltage, at the time of supplying power from the main battery 105 to the starter 107.

A starter power supply circuit 115, which is connected to the starter 107, includes a starter power supply shift switch 116 and a relay switch 117. The starter power supply shift switch 116 switches between the main battery 105 and the sub-battery 105 to connect it to the starter 107. The relay switch 117 is turned on at the time of using both the sub-battery 106 and the main battery 105.

A power supply circuit 118, which is connected to the electrical loads 114 that require a guaranteed voltage, include a power supply shift switch 119, which switches between the main battery 105 and the sub-battery 106.

A short circuit 121, which includes a relay switch 120, is arranged between the main battery 105 and the electrical loads 114 to provide stable supply of power to the electrical loads 114, which require the guaranteed voltage, at the time of switching between the main battery 105 and the sub-battery 106.

Figure 21:
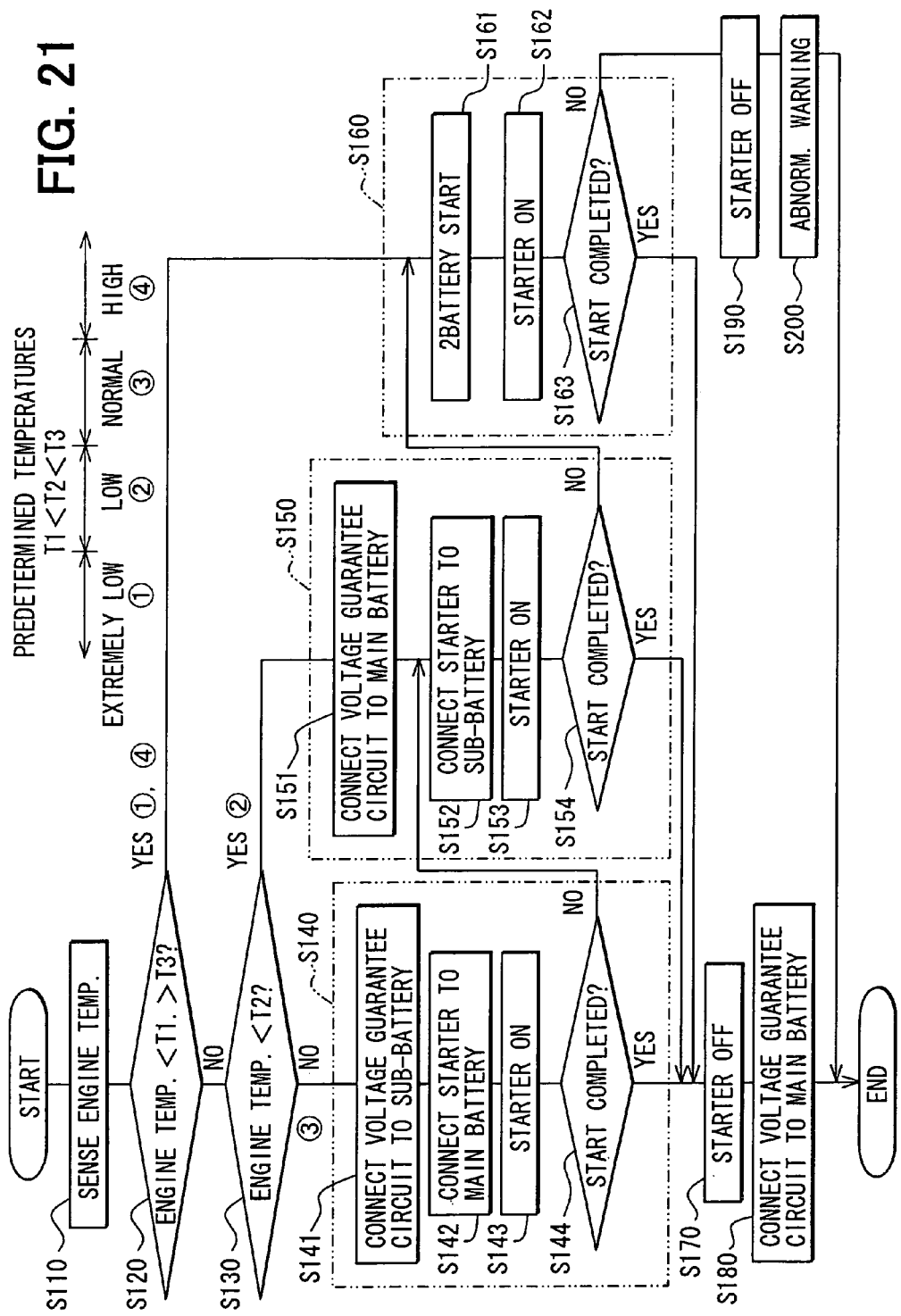
FIG. 21 is a flowchart showing battery switching control on engine starting according to the thirteenth embodiment.

Now, the battery switching control operation carried out during the engine start operation will be described. FIG. 21 is a flowchart showing a battery switching control procedure.

At step 110, the engine temperature is sensed. Here, it should be noted that an engine temperature related temperature (e.g., a battery temperature), which correlates with the engine temperature, can be sensed in place of the engine temperature.

At step 120 and step 130, the sensed engine temperature is compared with predetermined temperatures. Here, temperature ranges of predetermined temperatures T1, T2 and T3 (where T1<T2<T3) are defined as follows. That is, the temperature range below T1 is an extremely low temperature range. The temperature range between T1 and T2 is a low temperature range. The temperature range between T2 and T3 is a normal temperature range. The temperature range above T3 is a high temperature range.

Specifically, at step 120, it is determined whether the sensed engine temperature is below the predetermined temperature T1 (i.e., in the extremely low temperature range) or above the predetermined temperature T3 (i.e. in the high temperature range). When this determination result is YES, control proceeds to step 160. Alternatively, when the determination result is NO, control proceeds to step 130. At step 130, it is determined whether the sensed engine temperature is lower than the predetermined temperature T2 (i.e., in the low temperature range). When this determination result is YES, control proceeds to step 150. Alternatively, when the determination result is NO, control proceeds to step 140.

At step 140 (in the case where it is determined that the engine temperature is in the normal temperature range), the following steps 141 to 144 are executed. First, at step 141, the power supply shift switch 119 is switched to the sub-battery 106 side (the position shown with a dotted line in FIG. 20), and power is supplied from the sub-battery 106 to the electrical loads 114, which require a guaranteed voltage.

Then, at step 142, the starter power supply shift switch 116 is switched to the main battery 105 side (the position shown with a solid line in FIG. 20), and start-up electric power is supplied from the main battery 105 to the starter 107. At this time, the relay switch 117 is in its OFF state.

At step 143, the starter 107 is turned on. At step 144, it is determined whether the engine start operation has completed. When the result of this determination is YES (the engine start operation has completed), control proceeds to step 170. In contrast, when the determination result is NO, control proceeds to step 152.

At step 150 (in the case where it is determined that the engine temperature is in the low temperature range), the following steps 151 to 154 are executed. First, at step 151, the power supply shift switch 119 is switched to the main battery 105 side (the position shown with the solid line in FIG. 20), and power is supplied from the main battery 105 to the electrical loads 114, which require the guaranteed voltage.

Then, at step 152, the starter power supply shift switch 116 is switched to the sub-battery 106 side (the position shown with the dotted line in FIG. 20), and start-up electric power is supplied from the sub-battery 106 to the starter 107. At this time, the relay switch 117 is in its OFF state.

Then, at step 153, the starter 107 is turned on. At step 154, it is determined whether the engine start operation has completed. When the result of this determination is YES, control proceeds to step 170. In contrast, when the determination result is NO, control proceeds to step 160.

At step 160 (in the case where it is determined that the engine temperature is in the extremely low temperature range or the high temperature range), the following steps 161 to 163 are executed. First, at step 161, the starter power supply shift switch 116 is switched to the main battery 105 side, and the relay switch 117 is turned on. As a result, start-up electric power is supplied from both the main battery 105 and the sub-battery 106 to the starter 107.

At step 162, the starter 107 is turned on. At step 163, it is determined whether the engine start operation has completed. When the determination result is YES (the engine start operation has completed), control proceeds to step 170. In contrast, when the determination result is NO, control proceeds to step 190.

At step 170, the electric power to the starter 107 is turned off. At step 180, the power supply shift switch 119 is switched to the main battery 105 side, and power is supplied from the main battery 105 to the electrical loads 114, which require a guaranteed voltage. Then, the present operation is terminated. At step 190, the electric power to the starter 107 is turned off. At step 200, an abnormality warning is outputted, and the present control operation is terminated.

With the battery switching control operation described above, in correspondence with the engine temperature at the time of starting the engine, one of the main battery 105 and the sub-battery 106 is selected, or alternatively both the batteries 105, 106 are used together to supply power to the starter 107. Thus, the main battery 105 and the sub-battery 106 can be used effectively in accordance with their respective characteristics.

The circuit diagram shown in FIG. 20 is constructed in such a manner that the main battery 105 and the sub-battery 106 are connected to the starter 107 in parallel at the time of supplying electric power from both the main battery 105 and the sub-battery 106 to the starter 107. Alternatively, the circuit may be constructed in such a manner that the main battery 105 and the sub-battery 106 are connected in series.

When start-up electric power is supplied from the main battery 105 to the starter 107, electric power is supplied from the sub-battery 106 to the electrical loads 114, which require the guaranteed voltage. When start-up electric power is supplied from the sub-battery 106 to the starter 107, electric power is supplied from the main battery 105 to the electrical loads 114, which require the guaranteed voltage. Consequently, the required voltage can be supplied in a stable manner to the electrical loads 114, which require the guaranteed voltage, without being influenced by voltage drop of each battery 105, 106, which occurs at the time of supplying electric power to the starter 107.

Figure 22:
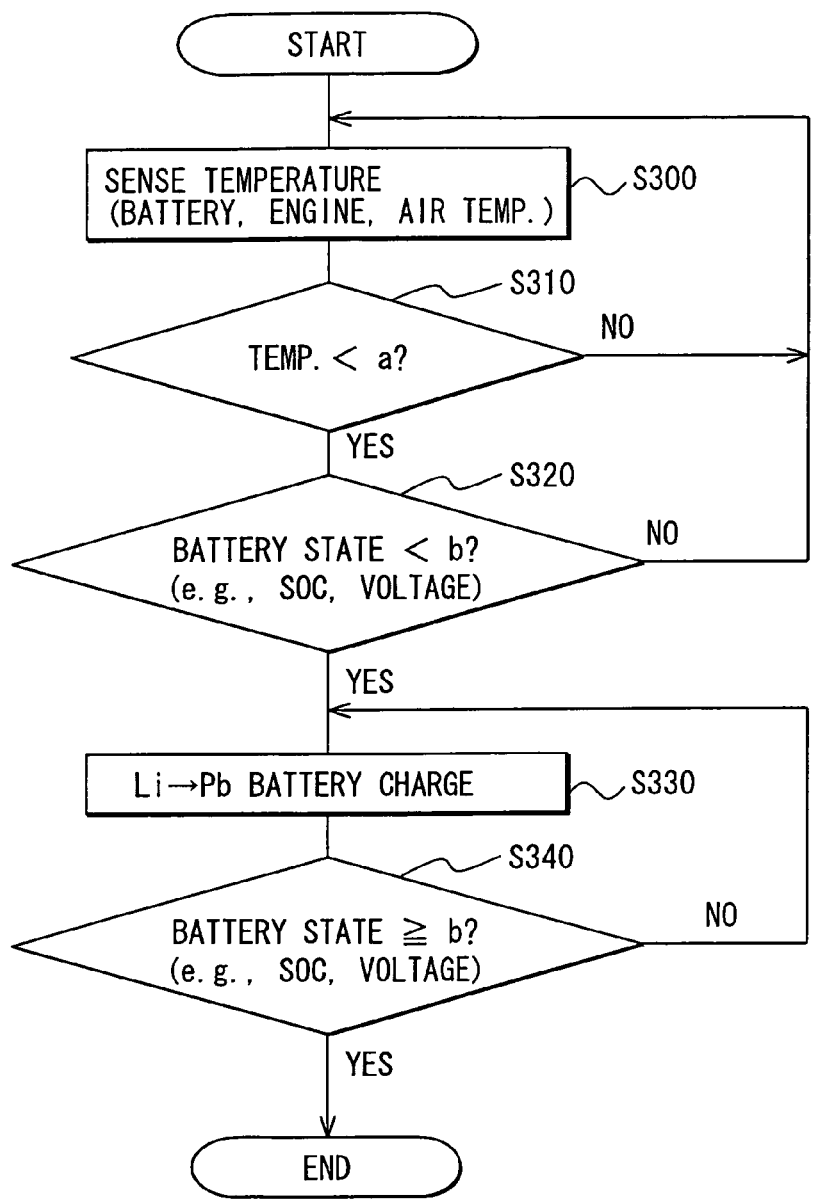
FIG. 22 is a flowchart showing a method of charging a sub-battery according to the thirteenth embodiment.

Next, a control method for charging the sub-battery 106 from the main battery 105 will be described with reference to a flowchart shown in FIG. 22. Charging of the sub-battery 106 from the main battery 105 is executed in the state where the engine is stopped.

At step 300, the temperature, which is used to determine whether the charging needs to be initiated, is sensed. Here, a battery temperature, the engine temperature, or an external air temperature can be used as this temperature. At step 310, it is determined whether the sensed temperature is smaller than a predetermined value "a". When the result of this determination is YES, control proceeds to step 320. In contrast, when the determination result is NO, control returns to step 300.

At step 320, it is determined whether the charge state of the main battery 105 and the charge state of the sub-battery 106 are below a predetermined state "b". here, the charge state of the main battery 105 is determined based on measuring of SOC, a state of health (SOH), and the charge state of the sub-battery 106 is determined based on a voltage value. When the determination result is YES, control proceeds to step 330. In contrast, when the determination result is NO, control return to step 300.

At step 330, charging from the main battery 105 to the sub-battery 106 is started. At step 340, it is determined whether the charge state of the main battery 105 and the charge state of the sub-battery 106 are higher than the predetermined state "b". When the result of this determination is YES, the present control operation is terminated. In contrast, when the result of this determination is NO, control returns to step 330.

An additional operational sequence may be inserted in the above-described flowchart. That is, in the additional operational sequence, a temperature gradient may be monitored, and the charging current may be determined based on the temperature gradient.

Furthermore, as shown in FIG. 20, a current sensor 122 may be inserted in the power supply line, which supplies electric power from the main battery 105 to the starter 107 and the electrical loads 113, 114. In addition, a current sensor 123 may be inserted in the power supply line, which supplies electric power from the main battery 105 to the sub-battery 106. Also, a voltage sensing means for sensing a voltage of the main battery 105 may be provided. Sensed values of the current sensors 122, 123 and of the voltage sensing means are compared with the value of the charge state of the main battery 105. In this way, the power consumption level and the charge level of the sub-battery 106 may be sensed with a higher accuracy. Furthermore, the sensed power consumption may be corrected by using the more accurate sensed value of the charge state of the main battery 105. This allows easy management of electrical energy.

Furthermore, even if the detection accuracy of the charge state of the sub-battery 106 itself is poor (the detection precision of lead batteries is poor), the more accurate detection of the power consumption of the electrical loads 113, 114 allows more precise detection of the charge state of the sub-battery 106 by obtaining a difference between the value of the power consumption of the electrical loads 113, 114 and the discharge amount of the main battery 105.

In the vehicle power supply system according to the thirteenth embodiment, the regenerative energy produced in the alternator 102 during vehicle deceleration is recovered directly to the high-performance main battery 105 without passing through a DC/DC converter 111 or the like. In this way, the regenerative energy can be recovered efficiently. Furthermore, electric power is supplied from the main battery 105 to the ordinary electrical loads 113 without passing through the DC/DC converter 111 or the like. Thus, the power supply can be performed efficiently.

Furthermore, one of or both of the main battery 105 and the sub-battery 106 is used as the power source of the starter 107 based on the engine temperature. Thus, the batteries 105, 106 can be effectively used according to the characteristics of the batteries.

Fourteenth Embodiment

Figure 23:
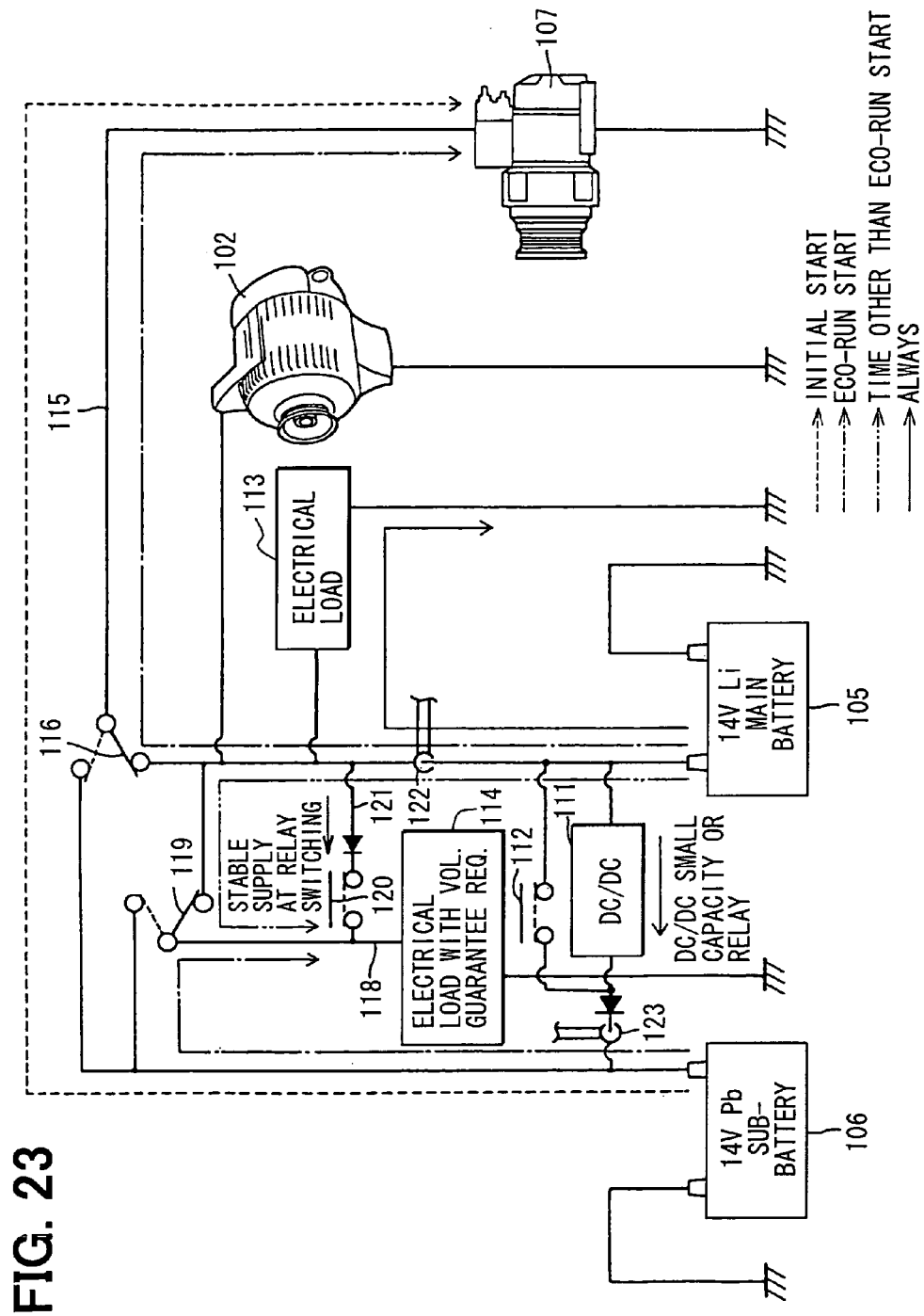
FIG. 23 is a circuit diagram of a power supply system according to a fourteenth embodiment.

Next, a vehicle power supply system according to a fourteenth embodiment will be described. FIG. 23 is a circuit diagram of the vehicle power supply system according to the fourteenth embodiment.

In the fourteenth embodiment, power supply to the starter 107 is effected with one of the main battery 105 and the sub-battery 106. In this case, similar to the thirteenth embodiment, the batteries 105, 106 are switched by the starter power supply shift switch 116 to supply electric power to the starter 107 in the extremely low temperature range, the low temperature range and the normal temperature range. However, in this embodiment, the main battery 105 and the sub-battery 106 are not used simultaneously to supply electric power to the stator 107. Thus, in the high temperature range (T3 or higher) described in the thirteenth embodiment, the sub-battery 106 is used alone to supply electric power to the starter 107.

(Variations)

In the thirteenth embodiment according to the second aspect of the present invention, there is described the case where the main battery 105 and the sub-battery 106 are switched based on the engine temperature. Alternatively, in place of the above case where the engine temperature is used to switch between the main battery 105 and the sub-battery 106, the following modification is possible. That is, the batteries 105, 106 may be switched at the time of initial starting of the engine and at the time of restarting the engine after automatic engine stop. More specifically, at the time of initial starting of the engine (i.e., the engine start by turning on of the IG key), it is assumed that the engine temperature is relatively low, so that electric power is supplied from the sub-battery 106 to the starter 107, and electric power is supplied from the main battery 105 to the electrical loads 114, which requires the voltage guarantee. In contrast, at the time of restarting the engine after the automatic engine stop, it is assumed that the engine temperature is relatively high, so that electric power is supplied from the main battery 105 to the starter 107, and electric power is supplied from the sub-battery 106 to the electrical loads 114.

Furthermore, in the thirteenth embodiment, there is described the exemplary case where the engine start operation is carried out using the starter 107 of the belt type, which is given the higher priority than the starter 108 of the gear type. Alternatively, the engine start operation may be carried out using the starter 108 of the gear type by providing a higher priority to the starter 108 of the gear type than the starter 107 of the belt type. Further alternatively, the starter 108 of the gear type may be used only at the time of initially starting the engine, and the starter 107 of the belt type may be used only at the time of restarting the engine after the automatic engine stop.

Furthermore, there is described the case where the two starters 107, 108 are provided as the starting devices. Alternatively, there may be similarly used an arrangement where only one of the starter 107 of the belt type and the starter 108 of the gear type is provided.

In the thirteenth embodiment, there is described the alternator 102, which generates regenerative energy during deceleration of the vehicle. Alternatively, in place of the alternator 102, there may be used a motor generator, which has an electric power generating function.

Fifteenth Embodiment

Figure 24:
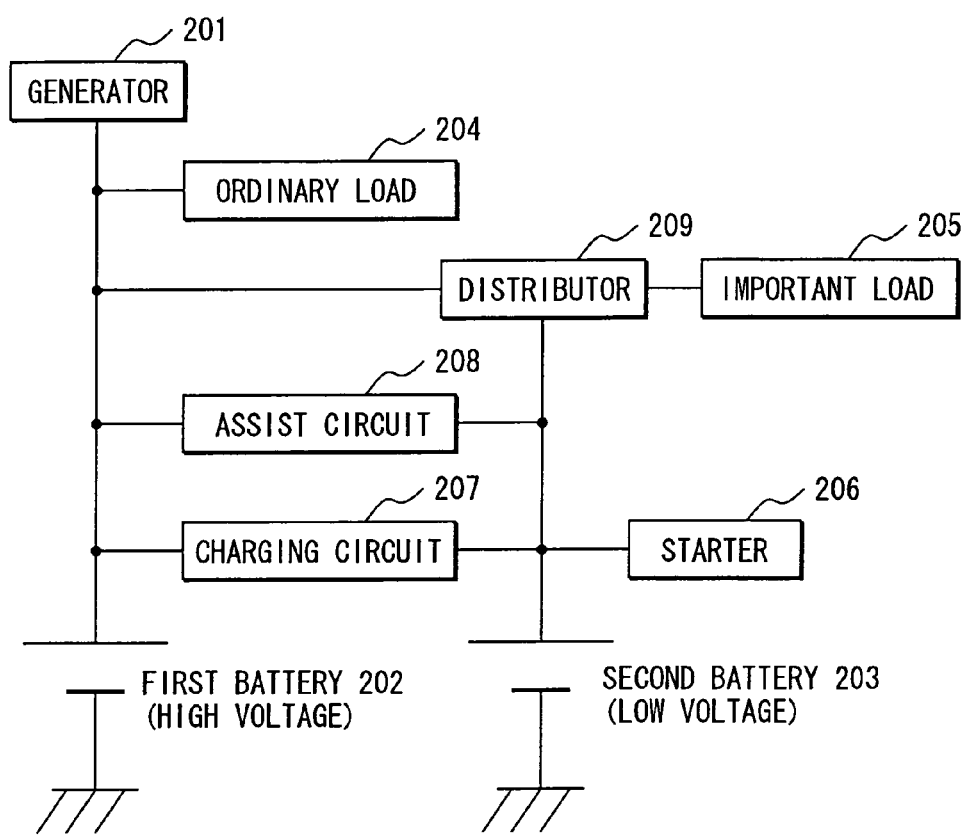
FIG. 24 is an overall view of a power supply system for a vehicle according to a fifteenth embodiment.
Figure 25:
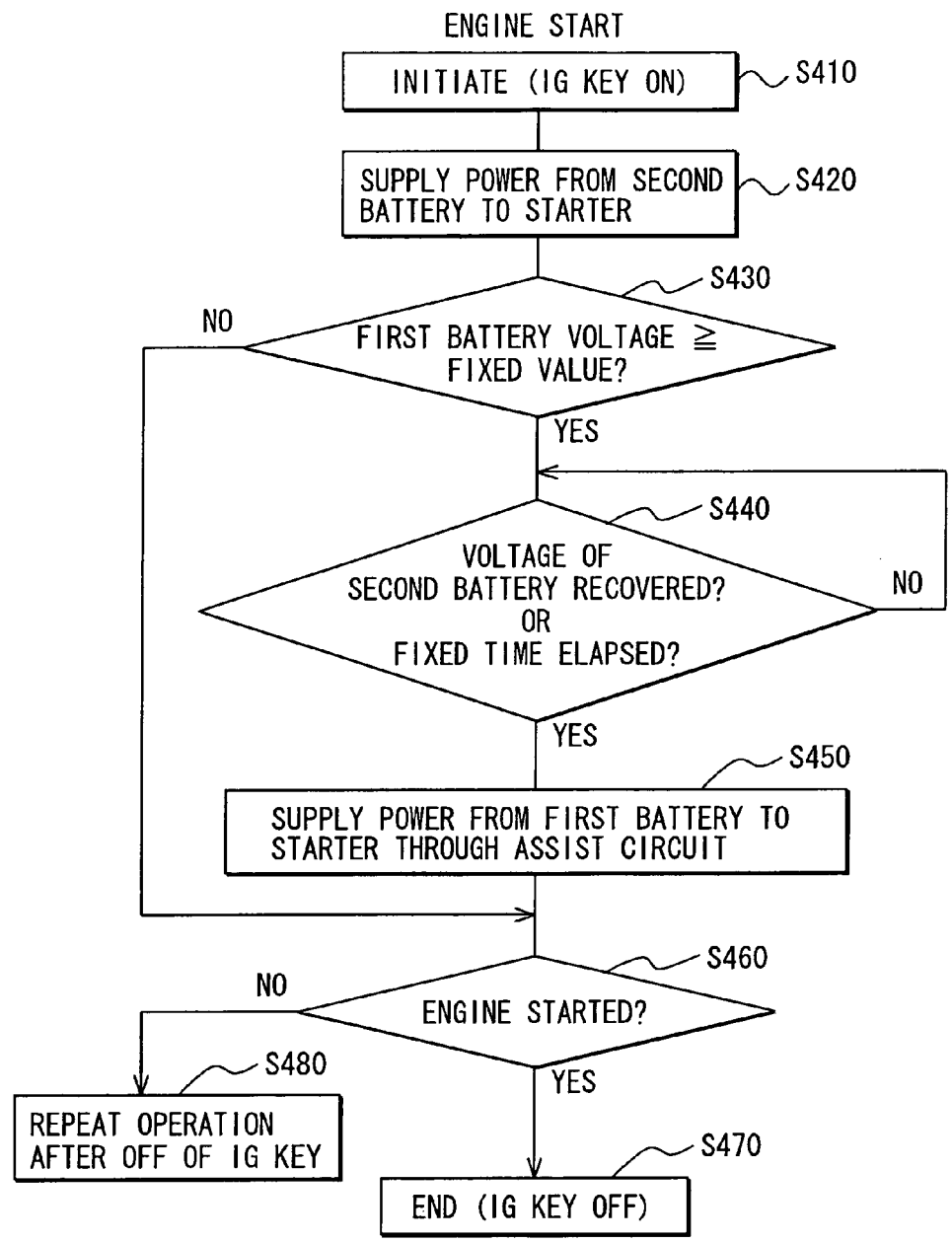
FIG. 25 is a flowchart showing a control procedure for engine starting according to the fifteenth embodiment.

Next, a vehicle power supply system of a fifteenth embodiment according to a third aspect of the present application will be described. FIG. 24 is an overall construction view of the vehicle power supply system according to the fifteenth embodiment (hereinafter, referred to as a system S), and FIG. 25 is a control flowchart for the engine start operation.

The system S includes a generator 201, a first battery 202 and a second battery 203 and supply electric power to ordinary electrical loads (also referred to as an ordinary loads 204), important electrical loads (also referred to as an important loads 205) and a starter 206, which are all mounted on the vehicle. The generator 201 is driven by the engine (not shown) to generate electric power. The first battery 202 is charged by the generator 201. The second battery 203 generates electric power, which has a voltage lower than that of the first battery 202.

The generator 201 is, for example, an alternator, which has an IC regulator and is drive by the engine through a belt. In a good charge state of the first battery 202, the generator 201 generates electric power only at the time of decelerating the vehicle (deceleration regeneration) to charge the first battery 202. In other operational states of the vehicle (the time of traveling at a steady speed, the time of acceleration, the time of idling), the power generation by the generator 201 is stopped.

The first battery 202 can produce a voltage of, for example, 16 V. Also, the first battery 202 has an internal resistance per unit capacity smaller than that of the second battery 203, so that the first battery 202 is superior in terms of discharge depth and charge acceptance capability over the second battery 203. The second battery 203 can produce a voltage of, for example, 12 V and has better low-temperature discharge characteristics than the first battery 202.

The first battery 202 and the second battery 203 are connected with each other through a charging circuit 207 and an assist circuit 208, which will be discussed below. The charging circuit 207 is a circuit for supplying a charging current from the first battery 202 or the generator 201 to the second battery 203. This charging circuit 207 is provided with ON-OFF means (not shown), and the charging current is controlled in accordance with an ON-OFF cycle of the ON-OFF means.

The assist circuit 208 is a circuit for supplying power from the first battery 202 to the starter 206 in addition to the power supply from the second battery 203 to the starter 206. The assist circuit 208 is connected in parallel with the charging circuit 207 between the first battery 202 and the second battery 203. The assist circuit 208 is provided with an ON-OFF switch (not shown). When the ON-OFF switch is turned on, power is supplied from the first battery 202 to the starter 206.

The ON-OFF means provided in the charging circuit 207 and the ON-OFF switch provided in the assist circuit 208 are controlled by an undepicted ECU (Electronic Control Unit).

The ordinary electrical loads (the ordinary electrical loads 204) mounted on the vehicle are connected to the first battery 202 and receive electric power from the first battery 202. The important loads 205, which are involved in a basic running operation or a safety operation of the vehicle, are connected to both of the first battery 202 and the second battery 203 through a distributor 209, which can control an output voltage. The important loads 205 can receive electric power from both of the first battery 202 and the second battery 203.

The starter 206 is connected to the second battery 203 and is also connected to the first battery 202 through the charging circuit 207. The power supply to the starter 206 will be discussed in detail below.

Next, a control procedure of the system S (at the time of starting the engine) will be described based on a flowchart shown in FIG. 25. First, at step 410, an IG key is turned on (ON). At step 420, electric power is supplied from the second battery 203 to the starter 206.

At step 430, it is determined whether the voltage of the first battery 202 is equal to or above a fixed value. When the result of this determination is YES, control proceeds to step 440. In contrast, when the determination result is NO, control jumps to step 460 where the power assistance by the first battery 202 is stopped.

At step 440, a timing for performing the power assistance by the first battery 202 is determined. Specifically, it is determined whether the voltage across the terminals of the second battery 203 has recovered to a predetermined value, or whether fixed time has elapsed from the start of the power supply to the starter 206.

In the same way as discussed above with reference to FIG. 3, the voltage across the terminals of the second battery 203 drops sharply due to a large current, which flows through the starter 206 at the time of initiating the power supply. Then, the voltage across the terminals of the second battery 203 gradually recovers while dipping slightly each time a piston passes a top dead center. Accordingly, it is possible to determine the timing of power assistance from the first battery 202 by monitoring the voltage across the terminals of the second battery 203.

At step 450, electric power (power assistance) is supplied to the starter 206 from the first battery 202 through the assist circuit 208. At step 460, it is determined whether the engine has started. This determination may be made alternatively based on, for example, the engine speed or the voltage across the terminals of the second battery 203. When the determination result is YES, control proceeds to step 470. In contrast, when the determination result is NO, control proceeds to step 480.

At step 470, the IG key is turned from the start position to the OFF position, and the present operation is terminated. In contrast, at step 480, after the shifting of the IG key from the start position to the OFF position, the present control operation is repeated once again.

According to the power supply system S of the fifteenth embodiment, when the power assistance from the first battery 202 is performed at the predetermined timing after the initiation of the power supply from the second battery 203 to the starter 206, the output of the starter 206 is increased. Thus, the engine can be started more quickly. Particularly, in a vehicle, which has an engine automatic stopping/restarting device (an eco-run system), the engine can be started within a short period of time at the time of restarting the engine after the automatic stop of the engine. Thus, an excellent advantage can be provided.

Figure 26:
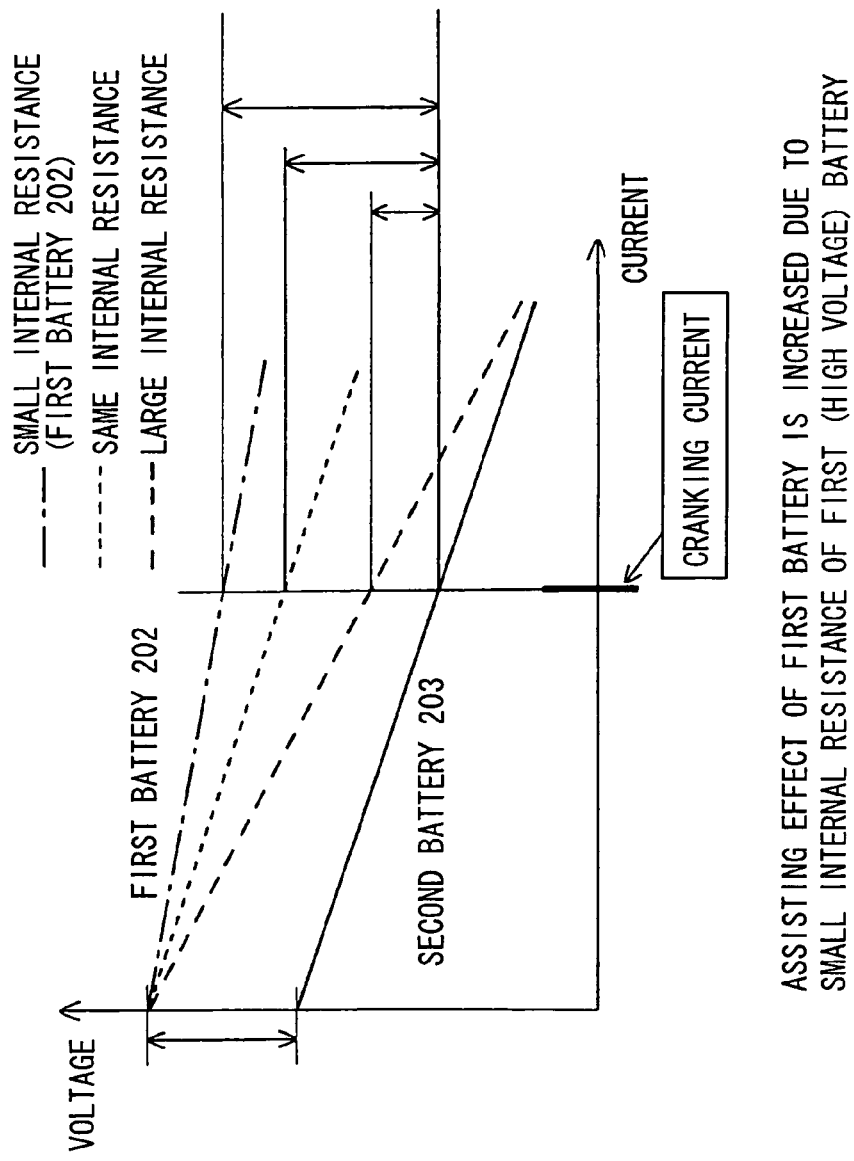
FIG. 26 is a view showing voltage changes of a first battery and a second battery having different internal resistances per unit capacity.

The first battery 202 has the smaller internal resistance than the second battery 203. Thus, as shown in FIG. 26, the voltage drop at the time of discharging can be limited. As a result, a higher voltage can be applied to the starter 206. Therefore, the advantage of the power assist by the first battery 202 is further enhanced.

At the initial stage of the engine start operation, electric power is supplied to the starter 206 only from the second battery 203, which provides the electric power having the lower voltage. Thus, the load, which is applied to the starter 206, can be reduced in comparison to the case where the power assistance from the first battery 202, which provides the electric power having the higher voltage, is carried out from the beginning.

The second battery 203 has better low-temperature discharge characteristics over the first battery 202. Thus, the startability of the engine at the low temperatures can be improved by using the second battery 203 in the first half of the engine start operation where the relatively large current flows in the starter 206. Furthermore, the second battery 203 is only used for limited purposes (power supply to the starter 206 and to the important loads 205). Thus, the lifetime of the second battery 203 can be extended, and the reliability of the system can be improved.

In the power supply system S of the fifteenth embodiment, the generator 201 is connected directly to the first battery 202, which has the superior charge acceptance capability due to its internal resistance being low. Thus, regenerative energy, which is generated by the generator 201 during deceleration of the vehicle, can be efficiently recovered to the first battery 202. Furthermore, the generator 201 generates electric power and charges the first battery 202 only during the deceleration of the vehicle. When the charge state of the first battery 202 is good, the generator 201 stops its power generation at other time other than the time of the vehicle deceleration. Thus, the engine load is alleviated, and the fuel consumption is improved.

Also, in the power supply system S of the fifteenth embodiment, electric power can be supplied to the important loads 205 from both of the first battery 202 and the second battery 203 through the distributor 209. Thus, the voltage needed by the important loads 205 can be effectively supplied, and the reliability and redundancy of the system are improved.

Furthermore, the assist circuit 208 is provided separately from the charging circuit 207. Thus, the output characteristics of the starter 206 may be switched through use of, for example, simple ON-OFF switch, which is provided on the assist circuit. Therefore, the circuit construction and control logic can be simplified to reduce the costs.

In the fifteenth embodiment, there is described the exemplary case where the charging current is supplied to the second battery 203 from the first battery 202 or the generator 201 through the charging circuit 207. Alternatively, the charging current may be supplied to the second battery 203 through the assist circuit 208.

Sixteenth Embodiment

Figure 27:
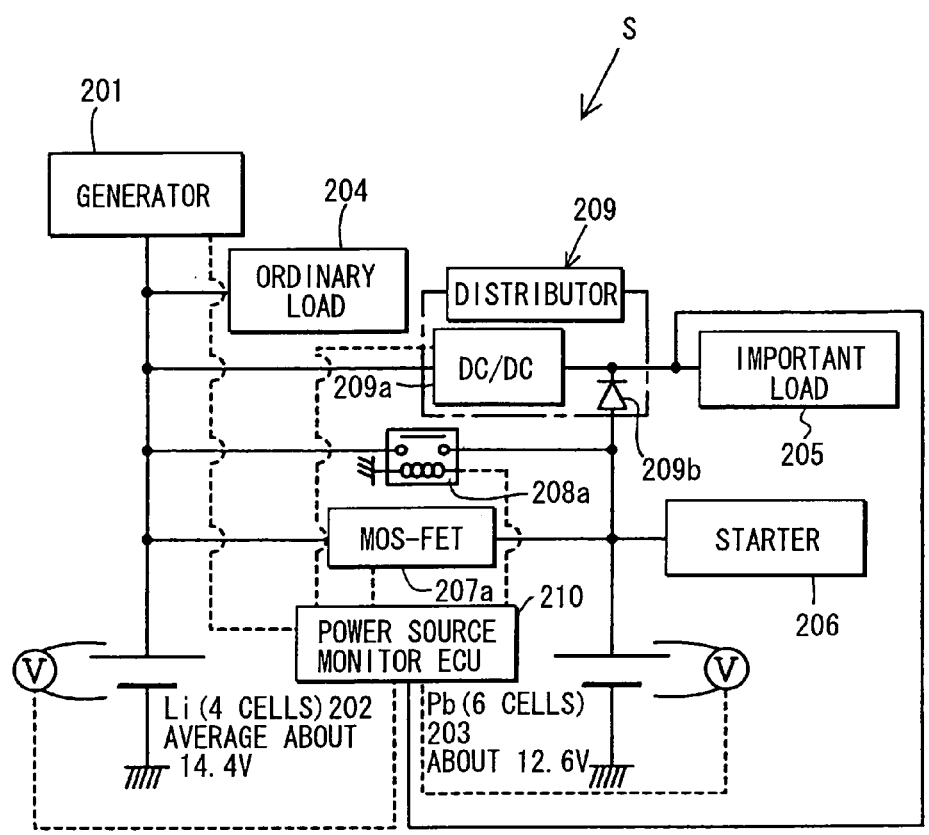
FIG. 27 is an overall view of a vehicle power supply system in a sixteenth embodiment.
Figure 28:
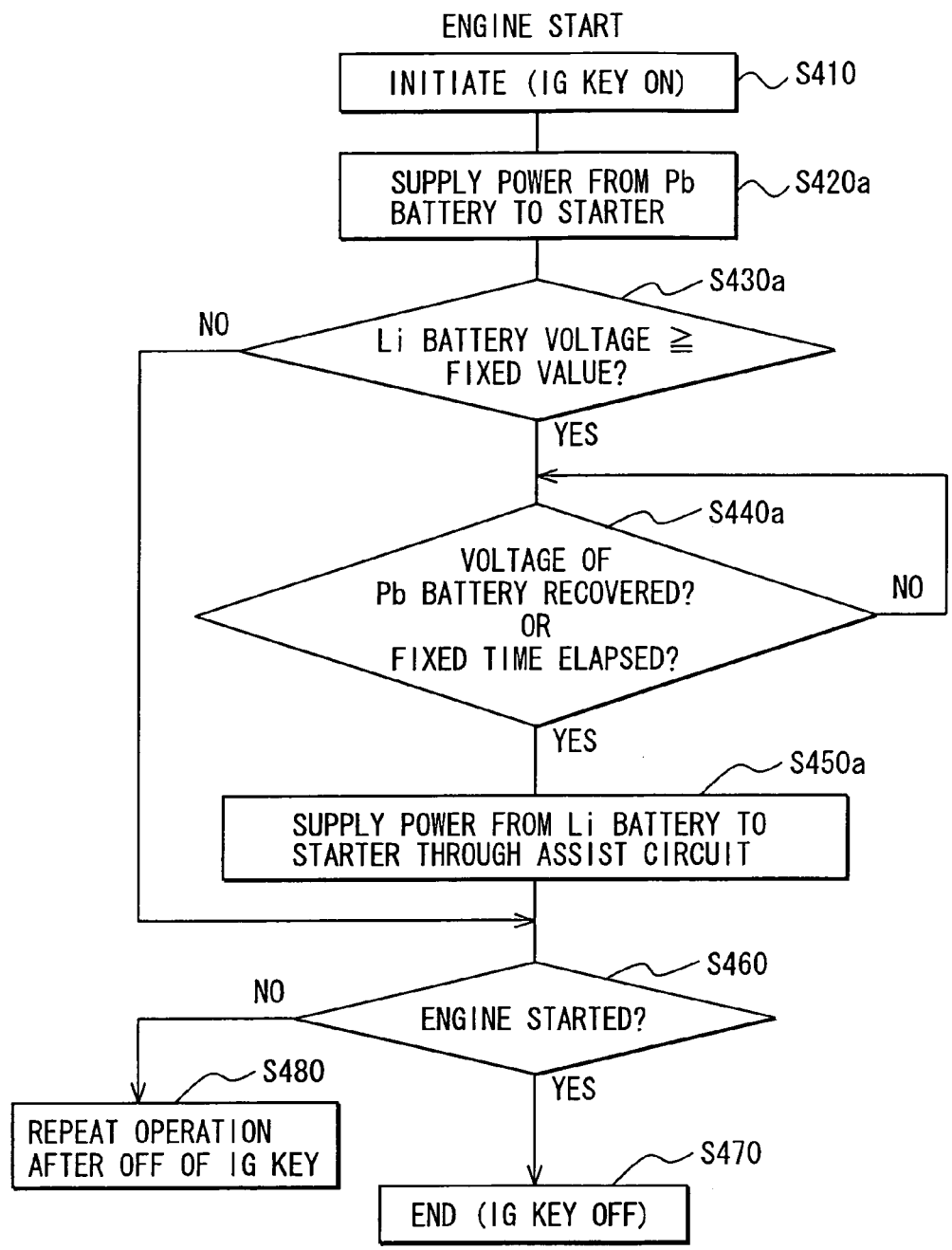
FIG. 28 is a flowchart showing a control procedure for engine starting in the sixteenth embodiment.

FIG. 27 is an overall construction view of a vehicle power supply system (the system S) according to a sixteenth embodiment, and FIG. 28 is a control flowchart for the engine start operation.

The power supply system S has the same basic construction as that of the fifteenth embodiment but shows a more specific example of the first battery 202, the second battery 203, the charging circuit 207, the assist circuit 208 and the distributor 209.

The first battery 202 is a Li ion battery, and the second battery 203 is an ordinary Pb battery. Similar to the fifteenth embodiment, the first battery 202 has a higher output voltage than the second battery 203 (see FIG. 27). Also, the first battery 202 has a smaller internal resistance per unit capacity over the second battery 203.

The charging circuit 207 is provided with a MOSFET 207a, which serves as an ON-OFF means. Turning on and off of the MOSFET 207a is controlled at a certain time rate by a power source monitor ECU 210. A relay 208a, which serves as an ON-OFF switch, is arranged in the assist circuit 208. At the time of performing the power assistance from the first battery 202, the relay 208a is turned on by the power source monitor ECU 210.

The distributor 209 includes a DC/DC converter 209a and a diode 209b. The DC/DC converter 209a is provided between the first battery 202 and the important loads 205. The diode 209b is provided between the second battery 203 and the important loads 205. The DC/DC converter 209a is controlled by the power source monitor ECU 210. Particularly, at the time of stopping the engine, operation of the DC/DC converter 209a is stopped by the power source monitor ECU 210 to limit flow of a dark current from the first battery 202 to the important loads 205. Thus, at the time of stopping the engine, the dark current is provided to the important loads from the second battery 203.

The power source monitor ECU 210 monitors the voltage across the terminals of the first battery 202 and the voltage across the terminals of the second battery 203. Based on the charge state of the first battery 202 and the charge state of the second battery 203, the power source monitor ECU 210 controls the MOSFET 207a, the relay 208a and the DC/DC converter 209a.

A control procedure (shown in the flowchart of FIG. 28) at the time of starting the engine through use of the power source monitor ECU 210 is the same as that of the fifteenth embodiment, and thus will not be described here for the sake of simplicity.

In the present embodiment, the MOSFET 207a is provided in the charging circuit 207. Thus, through the ON-OFF control operation of the MOSFET 207a, the charging current, which is supplied from the first battery 202 to the second battery 203, can be easily controlled.

Furthermore, the assist circuit 208 is provided only with the simple relay 208a. The power assistance from the first battery 202 to the starter 206 can be controlled based on the ON-OFF state of the relay 208a. Thus, the output characteristics of the starter 206 can be easily switched.

The distributor 209 includes the combination of the DC/DC converter 209a and the diode 209b. Thus, at the time of engine stop, the DC/DC converter 209a may be turned off to limit supply of the dark current from the first battery 202 to the important load 205 at the time of engine stop. Therefore, the load on the first battery 202 can be alleviated. As a result, downsizing (cost reduction) of the first battery 202, which uses the expensive Li ion battery, can be achieved.

Seventeenth Embodiment

Figure 29:
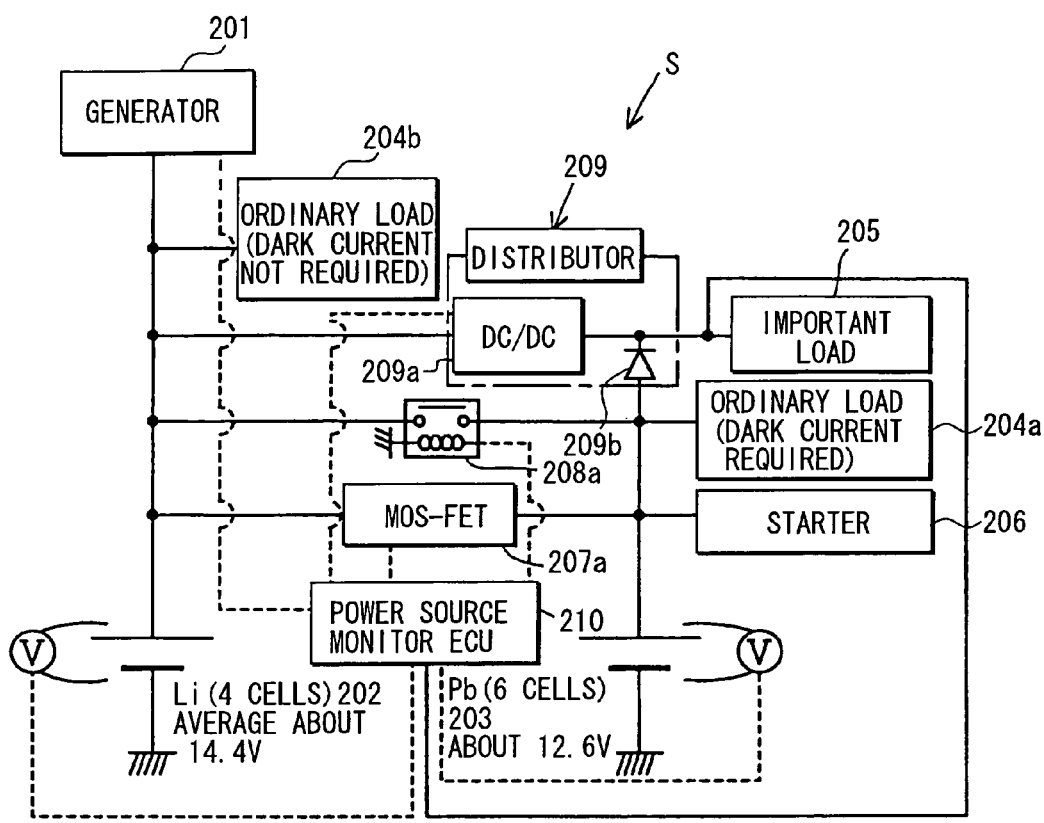
FIG. 29 is an overall view of a vehicle power supply system in a seventeenth embodiment.

FIG. 29 is an overall construction view of a vehicle power supply system (the system S) according to a seventeenth embodiment. The seventeenth embodiment is an exemplary case, which indicates power supply to ordinary loads 204a, which require a dark current, and power supply to ordinary loads 204b, which do not require a dark current, among the ordinary electrical loads.

Similar to the fifteenth and sixteenth embodiments, the ordinary loads 204b, which do not require the dark current, are connected to the first battery 202 and receive electric power from the first battery 202. In contrast, the ordinary loads 204a, which require the dark current, is connected to the second battery 203 and receive the dark current from the second battery 203.

As discussed above, the ordinary loads 204 are divided to the high voltage side and the low voltage side based on the need of the dark current. Thus, when the engine is stopped, the first battery 202 will not be used. As a result, the first battery 202 with a smaller capacity can be reduced to limit or reduce the costs of the first battery 202.

Eighteenth Embodiment

Figure 30:
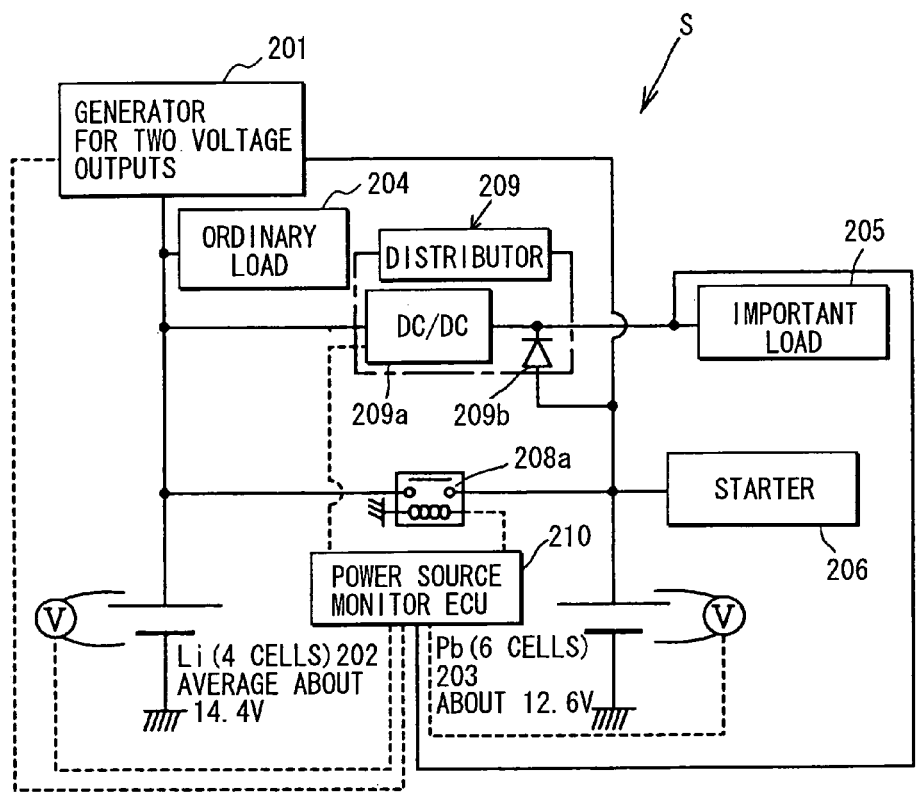
FIG. 30 is an overall view of a vehicle power supply system according to an eighteenth embodiment.

FIG. 30 is an overall construction view of a vehicle power supply system (the system S) according to an eighteenth embodiment. The system S has a generator 201, which has a power converter (e.g., a DC/DC converter). The output voltage of the generator 201 is variable by the power converter of the generator 201.

With this construction, a charging current can be supplied to the second battery 203 from the first battery 202 or from the generator 201 through the power converter. Thus, the charging circuit 207, which is recited in the fifteenth to seventeenth embodiments, can be eliminated. As a result, the circuit construction of the overall system can be simplified.

(Variations)

In the sixteenth embodiment, the MOSFET 207a is used as the ON-OFF means provided in the charging circuit 207. Alternatively, it is also possible to use a relay in place of the MOSFET 207a. Similarly, in the sixteenth embodiment, the relay 208a is used as the ON-OFF switch provided in the assist circuit 208. Alternatively, a semiconductor switch may be used in place of the relay 208a.

The first battery 202 and the second battery 203 are described as the Li ion battery and the Pb battery, respectively. However, the invention is not limited to this construction.

Furthermore, in the fifteenth embodiment, the alternator is used as the generator 201. Alternatively, a motor generator, which has a power generating function, may be used in place of the alternator.

What is claimed is:

1. A vehicle power supply system comprising:
   a generator, which is mounted on a vehicle;
   a main power source, to which an ordinary load is connected;
   an auxiliary power source, which is connected to the generator, wherein the auxiliary power source recovers regenerative electric power, which is generated by the generator using kinetic energy or thermal energy, and the auxiliary power source stores electric power that is generated by the generator;
   a first supply circuit, which connects the auxiliary power source to the main power source and the ordinary load through a DC/DC converter;
   a second supply circuit, which is in parallel with the first supply circuit and which connects the auxiliary power source to the main power source and the ordinary load through a switch; and
   a control means for controlling operation of the DC/DC converter and operation of the switch, wherein the control means is enabled to select one of:
   a first control state, in which the DC/DC converter is driven, and the switch is opened; and
   a second control state, in which the DC/DC converter is stopped, and the switch is closed.

2. A vehicle power supply system comprising:
   a generator, which is driven by an engine to generate electric power;
   a main power source, to which an ordinary load, such as a lamp or an audio device, is connected;
   an auxiliary power source, which is connected to the generator, wherein the auxiliary power source recovers regenerative electric power, which is generated by the generator at time of deceleration of a vehicle, and the auxiliary power source stores electric power that is generated by the generator through driving of the generator by the engine;
   a first supply circuit, which connects the auxiliary power source to the main power source and the ordinary load through a DC/DC converter;

a second supply circuit, which is in parallel with the first supply circuit and which connects the auxiliary power source to the main power source and the ordinary load through a switch; and a control means for controlling operation of the DC/DC converter and operation of the switch, wherein the control means is enabled to select one of:

a first control state, in which the DC/DC converter is driven, and the switch is opened; and a second control state, in which the DC/DC converter is stopped, and the switch is closed.

3. The vehicle power supply system according to claim 1, wherein the control means is also enabled to select a third control state, in which the DC/DC converter is driven, and the switch is closed.

4. The vehicle power supply system according to claim 1, wherein the main power source has a greater nominal voltage or nominal capacity over the auxiliary power source.

5. The vehicle power supply system according to claim 1, wherein the main power source has a smaller nominal voltage or nominal capacity over the auxiliary power source.

6. The vehicle power supply system according to claim 1, wherein the main power source and the auxiliary power source have a common operational range, in which a working voltage of the main power source generally coincides with a working voltage of the auxiliary power source.

7. The vehicle power supply system according to claim 1, wherein the main power source has greater low-temperature discharge characteristics than the auxiliary power source.

8. The vehicle power supply system according to claim 1, wherein the auxiliary power source has a greater charge acceptance capability and a greater state detectability than the main power source.

9. The vehicle power supply system according to claim 1, wherein:

the main power source is one of a lead battery, a Li ion battery and a Ni hydrogen battery; and the auxiliary power source is one of a lead battery, a Li ion battery, a Ni hydrogen battery and an electrical double-layer capacitor.

10. The vehicle power supply system according to claim 1, wherein at time of supplying power from the auxiliary power source to the main power source and the ordinary load, the control means selects the second control state when the voltage of the auxiliary power source has fallen to or below an allowable rated voltage of the ordinary load.

11. The vehicle power supply system according to claim 1, wherein the control means selects one of the first control state and the second control state in accordance with the power supply level, and the power supply level is a level of power supplied from the auxiliary power source to the main power source and the ordinary load, or a level of power supplied from the main power source to the auxiliary power source and the ordinary load.

12. The vehicle power supply system according to claim 11, wherein:

the control means selects the first control state when the power supply level is equal to or below a predetermined value; and the control means selects the second control state when the power supply level is above the predetermined value.

13. The vehicle power supply system according to claim 1, wherein the control means selects one of the first control state and the second control state in accordance with a voltage difference between the main power source and the auxiliary power source.

14. The vehicle power supply system according to claim 13, wherein:

the control means selects the second control state when the voltage difference between the main power source and the auxiliary power source is equal to or below a predetermined value; and the control means selects the first control state when the voltage difference between the main power source and the auxiliary power source is above the predetermined value.

15. The vehicle power supply system according to claim 1, wherein the control means selects one of the first control state and the second control state in accordance with:

a voltage difference between the main power source and the auxiliary power source; and a level of power supplied from the auxiliary power source to the main power source and the ordinary load, or a level of power supplied from the main power source to the auxiliary power source and the ordinary load.

16. The vehicle power supply system according to claim 15, wherein:

the control means first selects the first control state when the voltage of the auxiliary power source is higher than that of the main power source and also the power level supplied from the auxiliary power source to the main power source and the ordinary load is greater than a predetermined value; and the control means then shifts from the first control state to the second control state after the voltage of the auxiliary power source falls to or below the allowable rated voltage of the ordinary load.

17. The vehicle power supply system according to claim 1, further comprising:

a third supply circuit, which supplies electric power from the auxiliary power source to an important load, which is involved in a basic running operation or a safety operation of the vehicle; and a fourth supply circuit, which supplies electric power from the main power source to the important load, wherein each of the third supply circuit and the fourth supply circuit has a diode, which limits a reverse flow of an electric current therethrough.

18. The vehicle power supply system according to claim 1, further comprising:

a third supply circuit, which supplies electric power from the auxiliary power source to an important load, which is involved in a basic running operation or a safety operation of the vehicle; and a fourth supply circuit, which supplies electric power from the main power source to the important load, wherein the third supply circuit has a diode, which limits a reverse flow of an electric current therethrough, in a case where the main power source has a higher nominal voltage or nominal capacity over the auxiliary power source.

19. The vehicle power supply system according to claim 1, further comprising:

a third supply circuit, which supplies electric power from the auxiliary power source to an important load, which is involved in a basic running operation or a safety operation of the vehicle; and a fourth supply circuit, which supplies electric power from the main power source to the important load, wherein the fourth supply circuit has a diode, which limits a reverse flow of an electric current therethrough, in a case the main power source has a lower nominal voltage or nominal capacity over the auxiliary power source.

20. The vehicle power supply system according to claim 17, wherein the control means opens the switch when one of the main power source and the auxiliary power source fails in a state where the second control state is selected by the control means.

21. The vehicle power supply system according to claim 20, wherein the control means opens the switch when short-circuiting occurs between a cathode and an anode of one of the main power source and the auxiliary power source.

22. The vehicle power supply system according to claim 17, wherein the control means opens the switch when performance of the main power source falls.

23. The vehicle power supply system according to claim 17, wherein the control means opens the switch when performance of the auxiliary power source falls.

24. The vehicle power supply system according to claim 20, wherein the control means stops the DC/DC converter when one of the main power source and the auxiliary power source fails in a state where the first control state is selected by the control means.

25. The vehicle power supply system according to claim 3, wherein the control means switches from the second control state to the third control state when a temperature of the switch is increased beyond a predetermined value in a state where the second control state is selected by the control means.

26. The vehicle power supply system according to claim 1, wherein the ordinary load, which is connected to the main power source, includes an electrical load, which requires a dark current after stopping of the engine.

27. The vehicle power supply system according to claim 1, wherein at time of shifting from the first control state to the second control state or at time of shifting from the second control state to the first control state, the control means increases an output voltage of the DC/DC converter to a higher one of a voltage of the main power source and a voltage of the auxiliary power source or decreases the output voltage of the DC/DC converter to a lower one of the voltage of the main power source and the voltage of the auxiliary power source, and then the control means shifts from the first control state to the second control state or shifts from the second control state to the first control state.

28. The vehicle power supply system according to claim 1, wherein:
the control means senses a working parameter, such as a temperature or a voltage, of the DC/DC converter in a state where the first control state is selected by the control means; and
the control means shifts from the first control state to the second control state when the sensed working parameter of the DC/DC converter exceeds a predefined value.

29. The vehicle power supply system according to claim 1, wherein the control means controls an output voltage of the DC/DC converter such that the output voltage of the DC/DC converter substantially coincides with an output voltage of the generator when the first control state is selected by the control means.

30. The vehicle power supply system according to claim 1, wherein the control means controls an output voltage of the generator such that the output voltage of the generator substantially coincides with an output voltage of the DC/DC converter when the first control state is selected by the control means.

31. The vehicle power supply system according to claim 1, wherein the control means senses a charge acceptance capability of the main power source based on an output state of the DC/DC converter when the first control state is selected by the control means.

32. The vehicle power supply system according to claim 1, wherein:
the control means senses a voltage of the auxiliary power source and an output voltage of the DC/DC converter based on a running state of the vehicle; and
the control means controls an output of the generator based on a sensed result of the voltage of the auxiliary power source and of the output voltage of the DC/DC converter.

33. The vehicle power supply system according to claim 1, wherein the auxiliary power source supplies electric power to an electrical load, which does not require a dark current.

34. The vehicle power supply system according to claim 33, wherein the electrical load, which does not require the dark current, is one of:
a first electrical load that does not have an internal memory; and
a second electrical load that always uses an initial constant of an internal memory.

35. The vehicle power supply system according to claim 1, further comprising a dark current blocking means for blocking the dark current, wherein the auxiliary power source supplies electric power to an electrical load, which does not require the dark current.

36. The vehicle power supply system according to claim 1, wherein an auxiliary power source switch is connected in series with the auxiliary power source.

37. The vehicle power supply system according to claim 36, wherein the auxiliary power source switch is disposed between the generator and the auxiliary power source in such a manner that the auxiliary power source switch is positioned on a generator side of an input side connection of the DC/DC converter.

38. The vehicle power supply system according to claim 1, wherein the DC/DC converter includes a series regulator.

39. The vehicle power supply system according to claim 1, wherein in a case where a fully charged state of the auxiliary power source is sensed at time of performing regenerative power generation of the generator, the generator carries out the regenerative power generation at a voltage that is lower than a voltage of the auxiliary power source measured in the fully charged state of the auxiliary power source and supplies electric power to the ordinary load in one of the first control state and the second control state.

40. The vehicle power supply system according to claim 3, wherein in a case where a fully charged state of the auxiliary power source is sensed at time of performing regenerative power generation of the generator, the generator carries out the regenerative power generation at a voltage that is lower than a voltage of the auxiliary power source measured in the fully charged state of the auxiliary power source and supplies electric power to the ordinary load in one of the first control state, the second control state and the third control state.

41. The vehicle power supply system according to claim 1, wherein the main power source is maintained in a fully charged state in the first control state.

42. A vehicle power supply system comprising:
a generating means for generating regenerative energy at time of decelerating a vehicle;
a high-performance main power storage means for directly storing the regenerative energy, which is generated by the generating means, and for supplying electric power to an electrical load, which is mounted on the vehicle;
an auxiliary power storage means for receiving and storing the electric power supplied from the main power storage means, wherein the auxiliary power storage means has a greater discharge characteristics at a low temperature than the main power storage means; and
a starting device power source switching means for selecting one or both of the main power storage means and the auxiliary power storage means as a power source based on an engine starting temperature to supply electric power to a starting device for starting an engine at time of starting the engine, wherein the engine starting temperature is an engine temperature or an engine related temperature, which is measured at the time of starting the engine.

43. The vehicle power supply system according to claim 42, wherein:
a temperature range below a predetermined temperature T1 is an extremely low temperature range;
a temperature range between the predetermined temperature T1 and a predetermined temperature T2 (T1<T2) is a low temperature range;
a temperature range between the predetermined temperature T2 and a predetermined temperature T3 (T2<T3) is a normal temperature range;
a temperature range above the predetermined temperature T3 is a high temperature range;
the starting device power source switching means selects the main power storage means when the engine starting temperature is in the normal temperature range; and
the starting device power source switching means switches to use both the main power storage means and the auxiliary power storage means when the engine starting temperature is in one of the extremely low temperature range and the high temperature range.

44. The vehicle power supply system according to claim 42, wherein the auxiliary power storage means supplies electric power to the starting device at the time of starting the engine when the engine starting temperature is in the low temperature range.

45. The vehicle power supply system according to claim 43, wherein:
the auxiliary power storage means supplies electric power to the electrical load, which requires a guaranteed voltage, when the main power storage means supplies electric power to the starting device at the time of starting the engine; and
the main power storage means supplies electric power to the electrical load, which requires the guaranteed voltage, when the auxiliary power storage means supplies electric power to the starting device at the time of starting the engine.

46. A vehicle power supply system comprising:
a generating means for generating regenerative energy at time of decelerating a vehicle;
a high-performance main power storage means for directly storing the regenerative energy, which is generated by the generating means, and for supplying electric power to an electrical load, which is mounted on the vehicle;
an auxiliary power storage means for receiving and storing the electric power supplied from the main power storage means, so that the auxiliary power storage means is charged, wherein the auxiliary power storage means has superior discharge characteristics at a low temperature over the main power storage means;
an automatic engine stopping/starting control device, which automatically controls stopping and restarting of an engine; and
a starting device power source switching means for selecting one of the auxiliary power storage means and the main power storage means as a power source to supply electric power to a starting device for starting the engine, wherein the starting device power source switching means selects the auxiliary power storage means at time of starting the engine first time and selects the main power storage means at time of restarting the engine through use of the automatic engine stopping/starting control device.

47. The vehicle power supply system according to claim 46, wherein:
the main power storage means provides electric power to the electrical load, which requires a guaranteed voltage, at the time of starting the engine first time; and
the auxiliary power storage means provides electric power to the electrical load, which requires the guaranteed voltage, at the time of restarting the engine through use of the automatic engine stopping/starting control device.

48. The vehicle power supply system according to claim 46, wherein the main power storage means provides electric power to the electrical load while the engine is automatically stopped.

49. The vehicle power supply system according to claim 48, further comprising a state sensing means for sensing a charge state of the main power storage means, wherein when it is determined that the main power storage means alone is not enough to supply start-up electric power to the starting device based on a sensed result of the state sensing means, the start-up electric power is supplied to the starting device from the auxiliary power storage means alone or from both the auxiliary power storage means and the main power storage means.

50. The vehicle power supply system according to claim 42, further comprising a charging circuit, which supplies electric power from the main power storage means to the auxiliary power storage means, wherein:
the charging circuit includes a DC/DC converter; and
the auxiliary power storage means is charged with a micro current, which is supplied from the main power storage means to the auxiliary power storage means through the DC/DC converter.

51. The vehicle power supply system according to claim 42, further comprising a charging circuit, which supplies electric power from the main power storage means to the auxiliary power storage means, wherein:
the charging circuit includes a relay switch; and
the auxiliary power storage means is charged with electric power supplied from the main power storage means when the relay switch is turned on.

52. The vehicle power supply system according to claim 50, wherein when a voltage difference between the main power storage means and the auxiliary power storage means is smaller than a predetermined value, the DC/DC converter is operated, so that the auxiliary power storage means is charged with electric power supplied from the main power storage means.

53. The vehicle power supply system according to claim 50, wherein the auxiliary power storage means is charged with electric power supplied from the main power storage means when the generating means stops its power generating operation.

54. The vehicle power supply system according to claim 42, further comprising:
- a current sensing means that is provided in a conductor portion, which supplies electric power from the main power storage means to the starting device and the electrical load;
- a current sensing means that is provided in a conductor portion, which supplies electric power from the main power storage means to the auxiliary power storage means; and
- a voltage sensing means for sensing a voltage of the main power storage means, wherein a measured value of each current sensing means and a measured value of the voltage sensing means are compared with a measured value of the charge state of the main power storage means obtained through the state sensing means, so that a power consumption level and a charge level of the auxiliary power storage means are sensed with relatively high accuracy.

55. The vehicle power supply system according to claim 42, wherein when the charge level of the main power storage means deviates from a predetermined level the main power storage means is switched to the auxiliary power storage means to supply electric power to the electrical load, which requires a guaranteed voltage.

56. The vehicle power supply system according to claim 42, wherein supply of a dark current is performed from the main power storage means after the engine is stopped through operation of a key by a driver.

57. A vehicle power supply system comprising:
- a generator, which is driven by an engine to generate electric power;
- a first battery, which is charged with electric power generated by the generator;
- a second battery, which has an output voltage lower than that of the first battery, wherein the second battery supplies electric power to a starter at time of starting the engine;
- a charging circuit, which supplies electric power from one of the generator and the first battery to the second battery; and
- an assist circuit, which provides power assistance from the first battery to the starter in addition to power supply from the second battery to the starter.

58. The vehicle power supply system according to claim 57, wherein the power assistance from the first battery is executed at a predetermined time after initiation of the power supply from the second battery to the starter.

59. The vehicle power supply system according to claim 58, wherein the predetermined time at which the power assistance from the first battery is executed, is determined based on elapsed time since the time of starting the engine or based on transition of a voltage value of the second battery.

60. The vehicle power supply system according to claim 57, wherein an internal resistance per unit capacity of the first battery is smaller than that of the second battery.

61. The vehicle power supply system according to claim 58, wherein the power assistance from the first battery is stopped when the voltage of the first battery is lower than a predetermined value.

62. The vehicle power supply system according to claim 57, wherein the second battery has greater low-temperature discharge characteristics than the first battery.

63. The vehicle power supply system according to claim 57, wherein:
- the charging circuit includes an ON-OFF means for turning on and turning off supply of the electric power to the second battery at a certain time ratio between an ON time period and an OFF time period; and
- the assist circuit includes one of a relay and a semiconductor switch.

64. The vehicle power supply system according to claim 63, wherein the ON-OFF means, which is provided in the charging circuit, is an electronic switching device that uses a semiconductor.

65. The vehicle power supply system according to claim 63, wherein the ON-OFF means, which is provided in the charging circuit, is a DC/DC converter.

66. The vehicle power supply system according to claim 65, wherein the DC/DC converter is provided in the generator.

67. The vehicle power supply system according to claim 57, further comprising a distributor, which is connected to the first battery and the second battery to control an output voltage of the first battery and an output voltage of the second battery, wherein supply of electric power to an important load, which is involved in a basic running operation or a safety operation of a vehicle, is carried out through the distributor.

68. The vehicle power supply system according to claim 57, wherein the first battery stores regenerative energy, which is generated by the generator at time of decelerating a vehicle.

69. The vehicle power supply system according to claim 57, wherein the second battery provides dark current to an electrical load after the engine is stopped through operation of a key by a driver.

70. The vehicle power supply system according to claim 57, wherein the vehicle power supply system is applied to a vehicle that has an automatic engine stopping/starting control device, which automatically controls stopping and restarting of the engine.

71. The vehicle power supply system according to claim 51, wherein when a voltage difference between the main power storage means and the auxiliary power storage means is smaller than a predetermined value, the relay switch is turned on, so that the auxiliary power storage means is charged with electric power supplied from the main power storage means.

72. The vehicle power supply system according to claim 1, wherein
- the ordinary load includes a lamp or an audio device;
- the kinetic energy includes kinetic energy of deceleration; and
- the thermal energy includes thermal energy of exhaust heat.

* * * * *